May 29, 1956  A. A. KOTTMANN  2,747,349
WRAPPING MACHINE
Filed Oct. 6, 1950  28 Sheets-Sheet 1
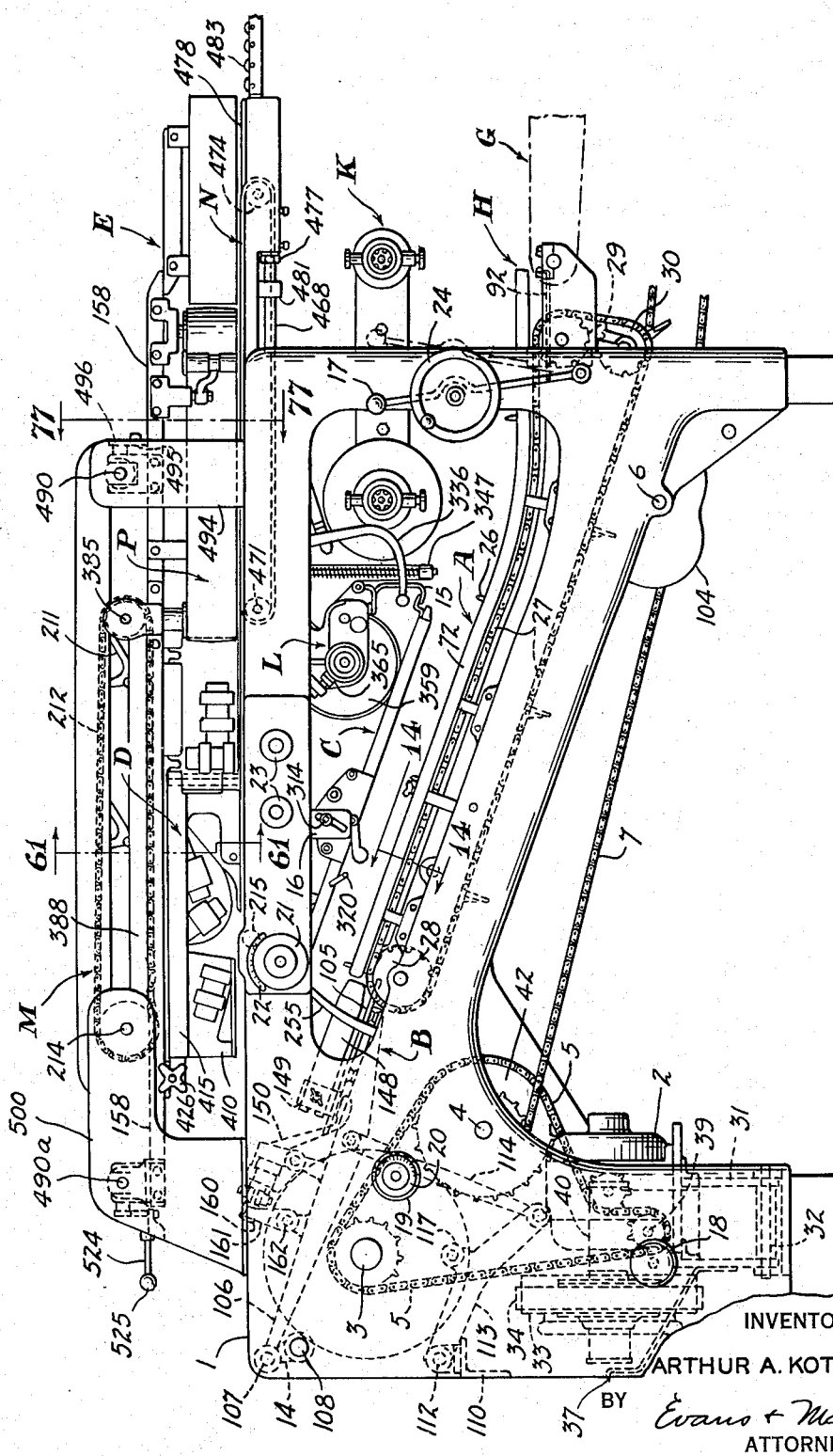
INVENTOR
ARTHUR A. KOTTMANN
BY Evans + McCoy
ATTORNEYS

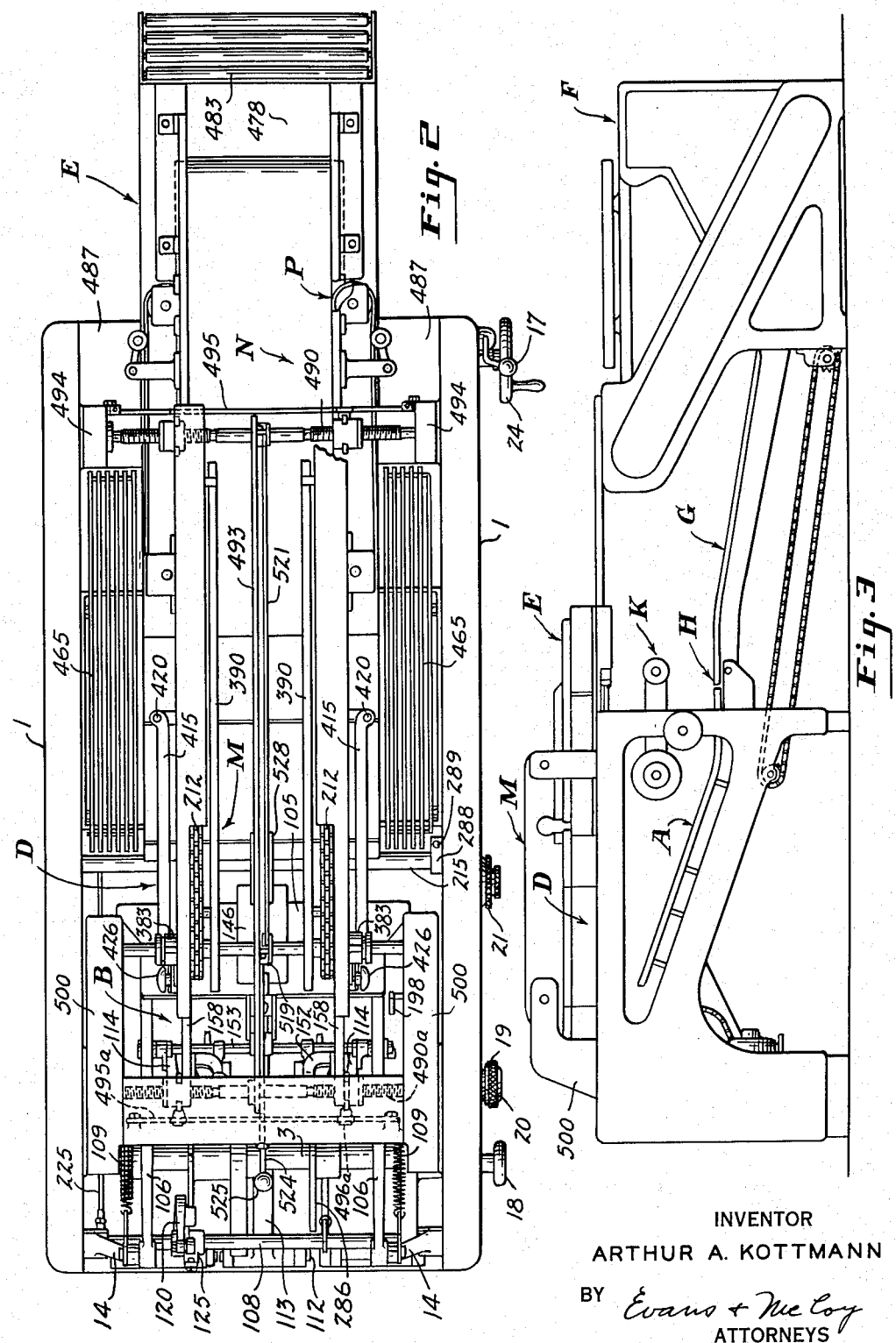

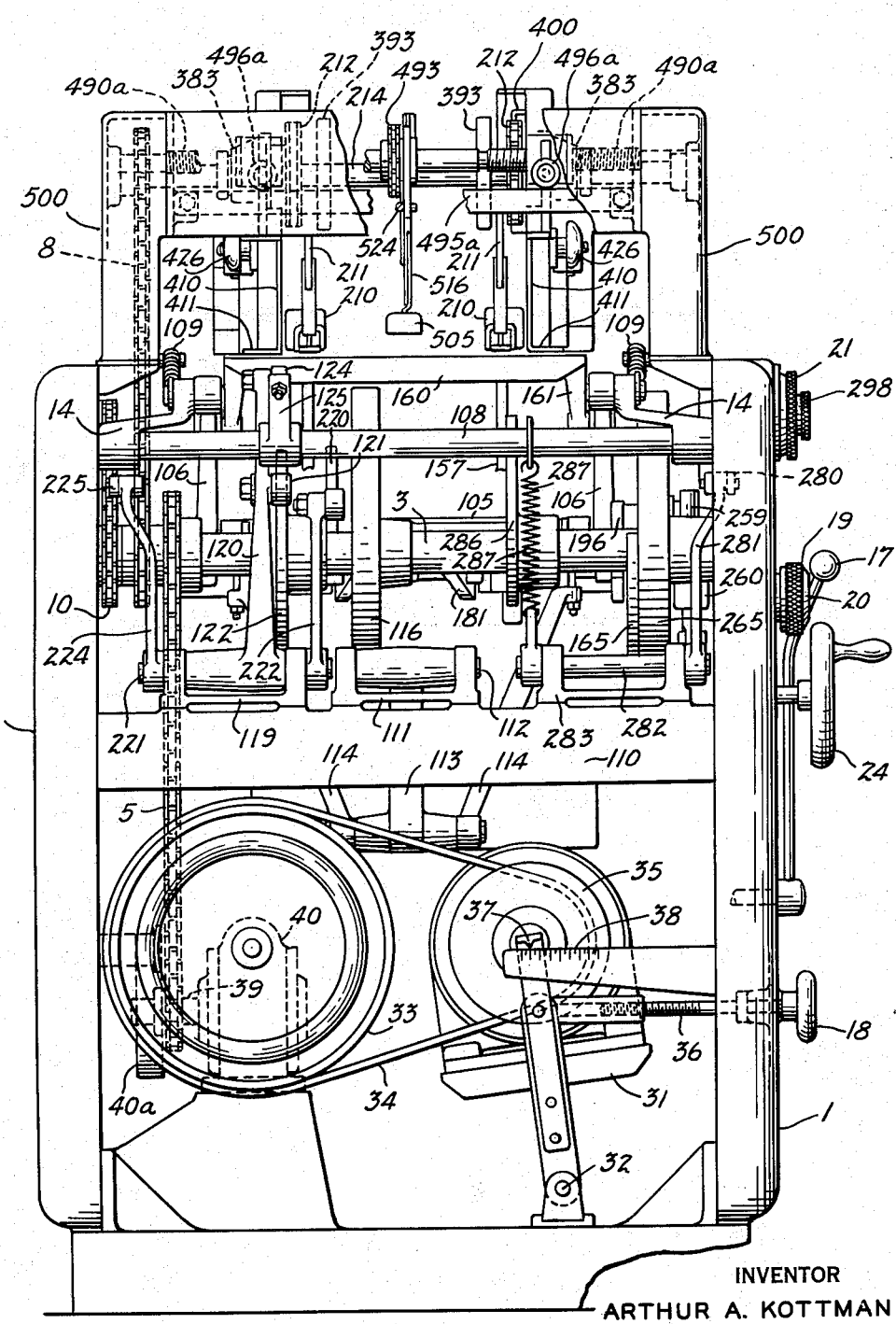

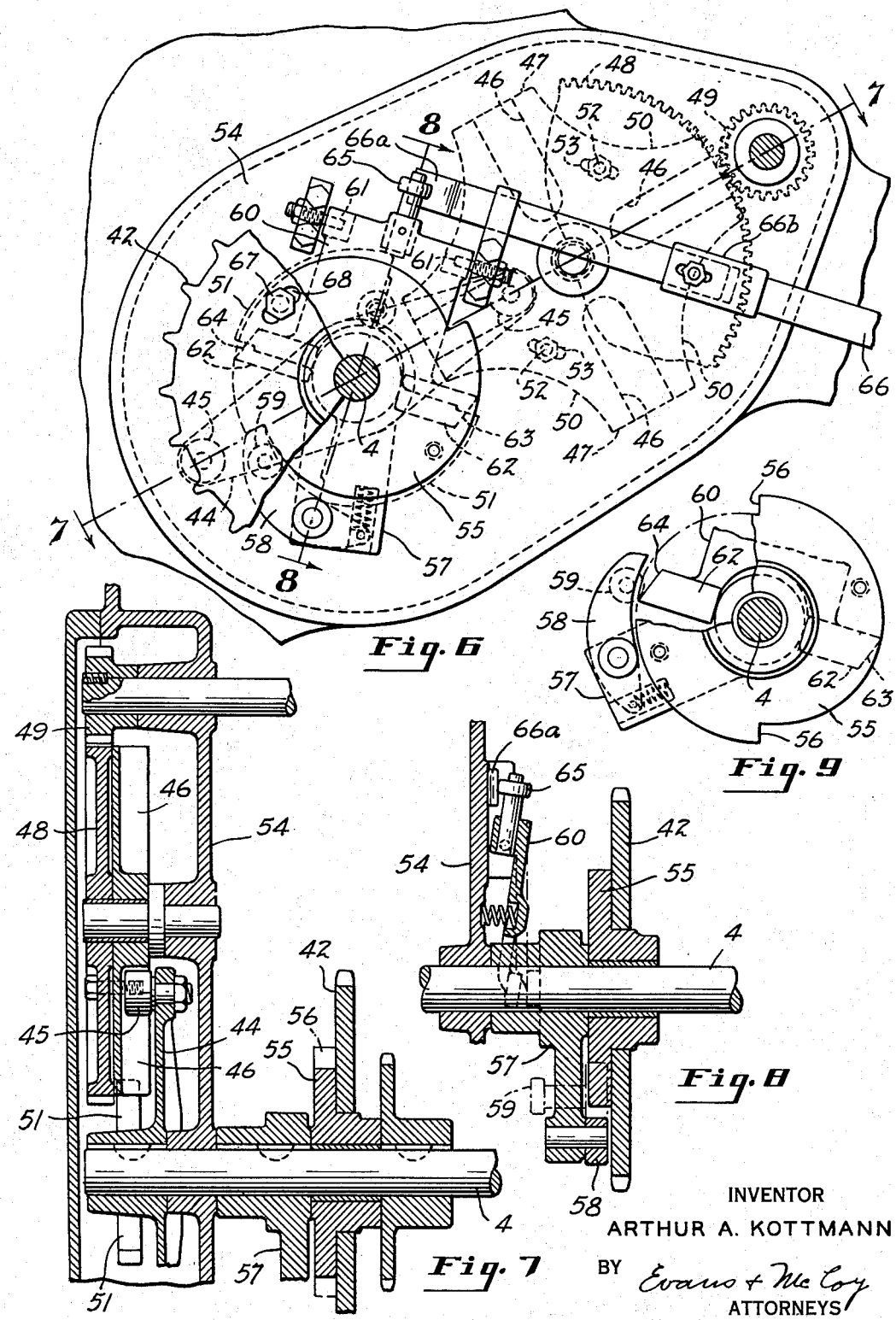

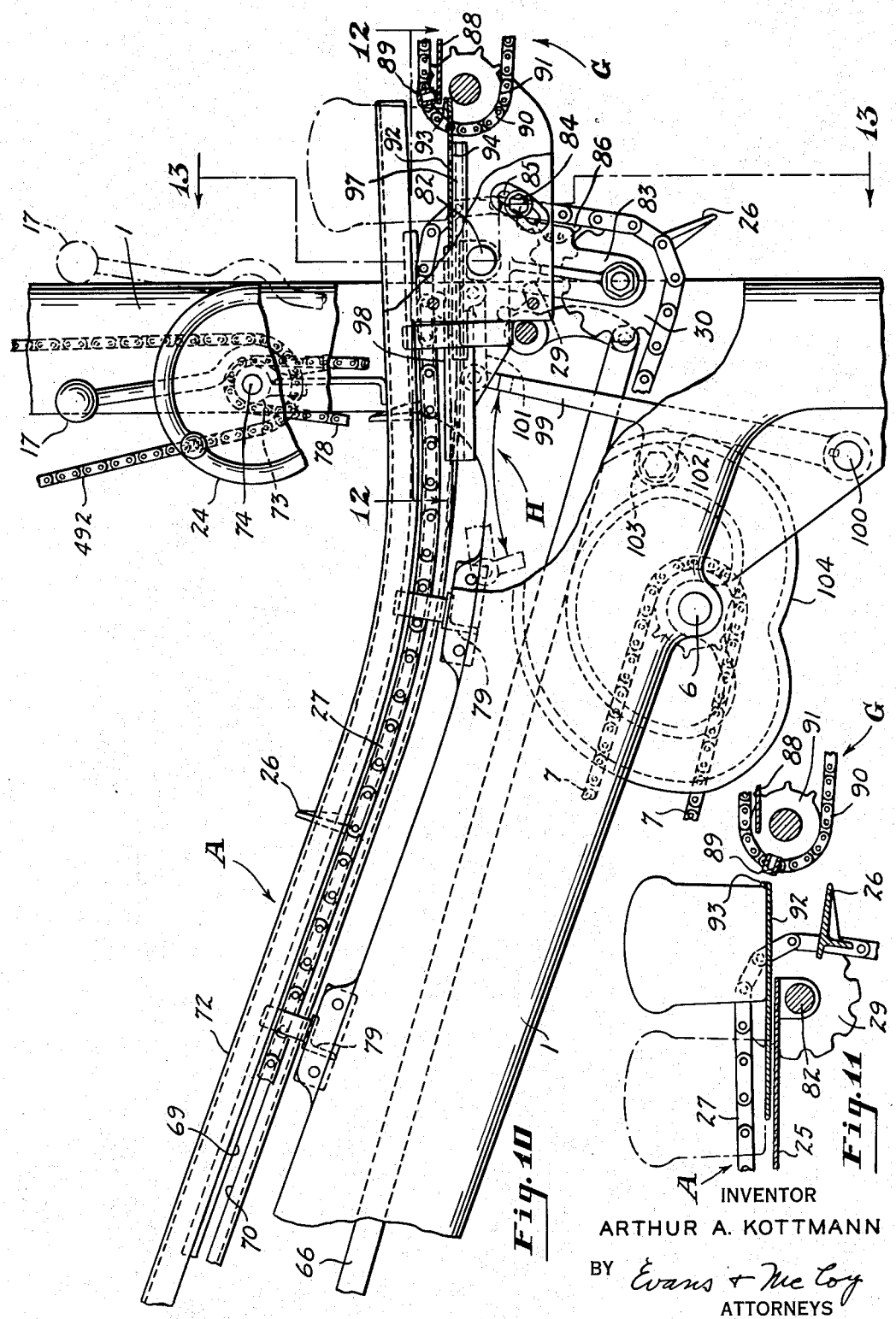

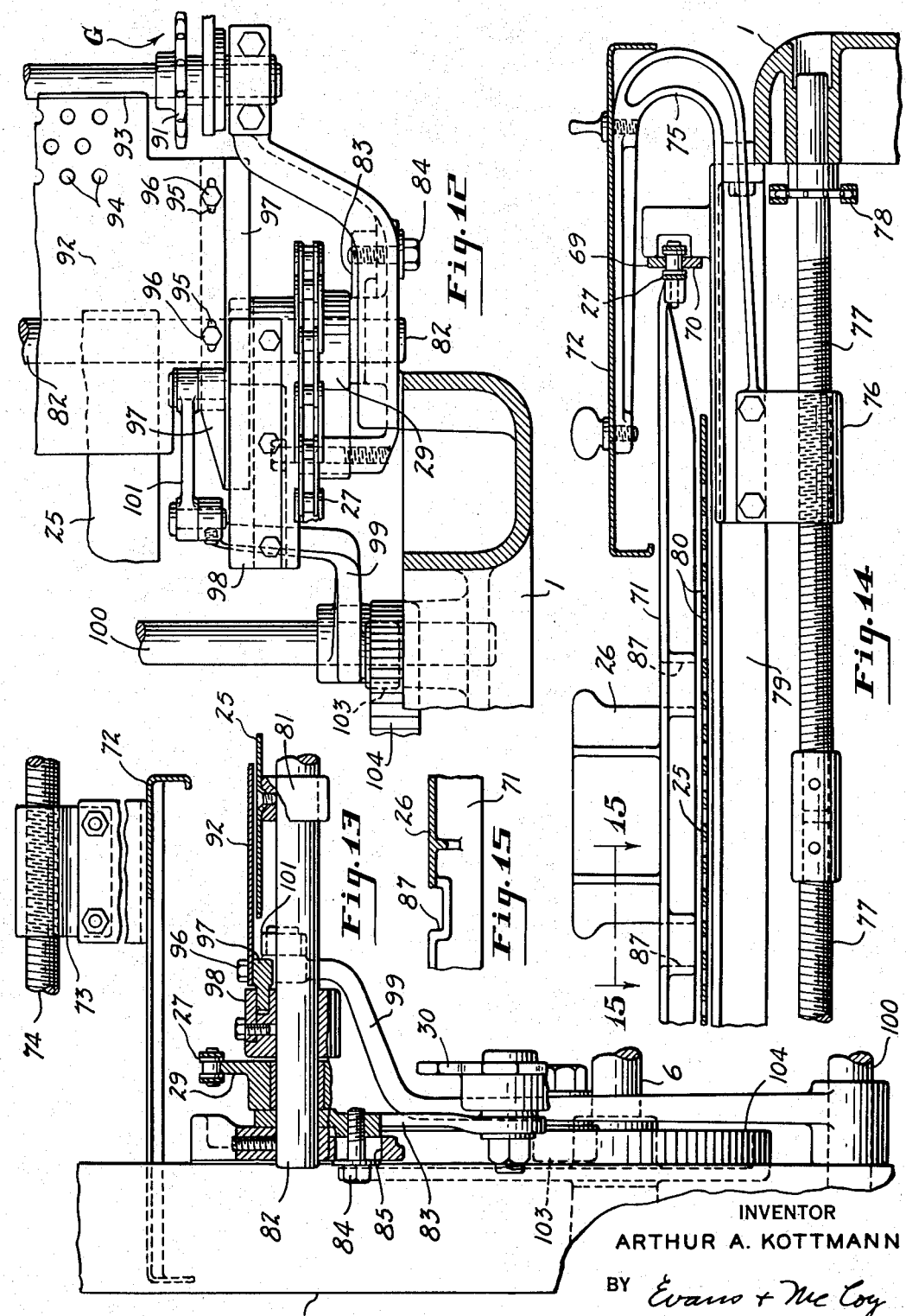

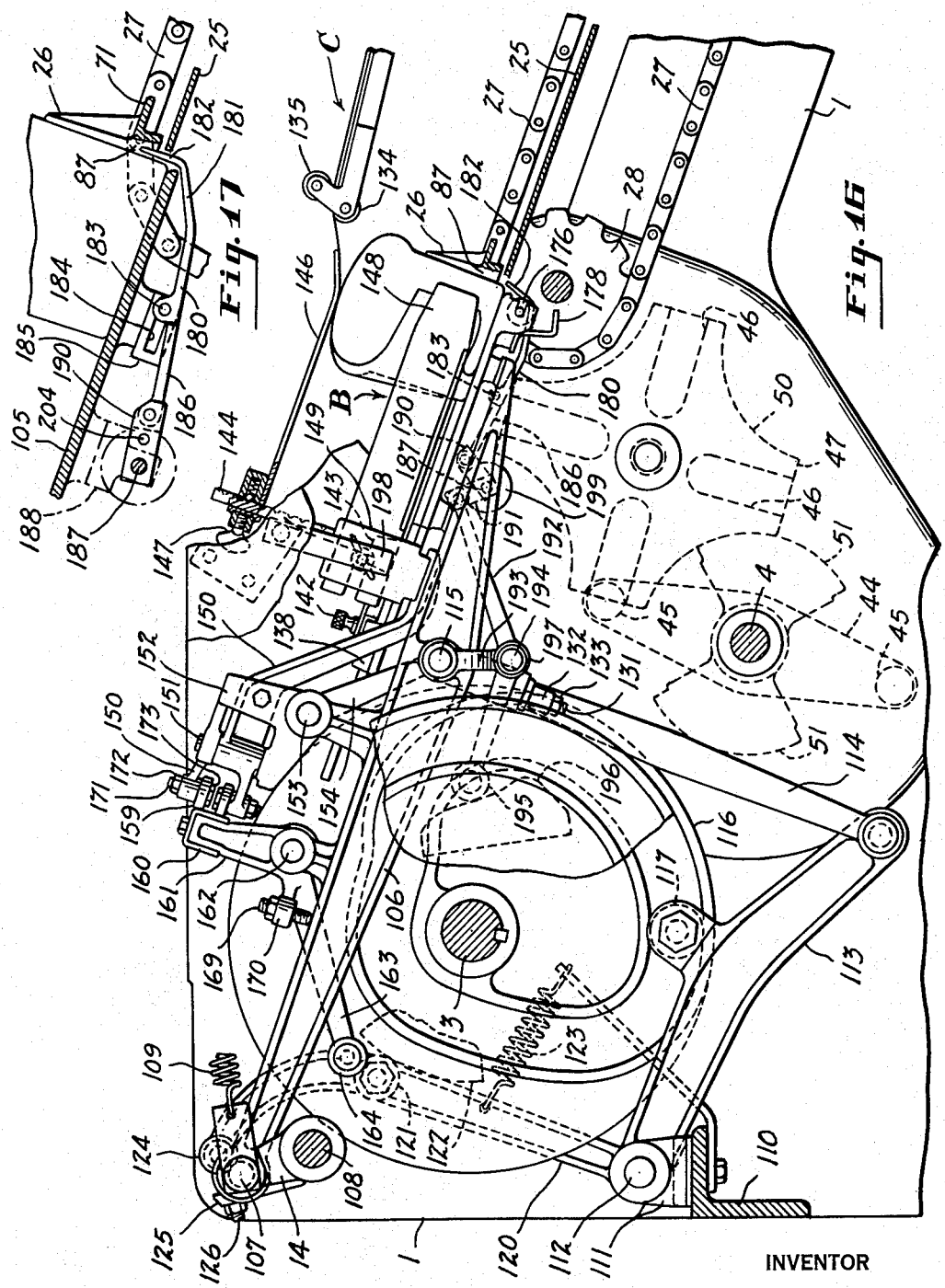
INVENTOR
ARTHUR A. KOTTMANN
BY Evans & McCoy
ATTORNEYS

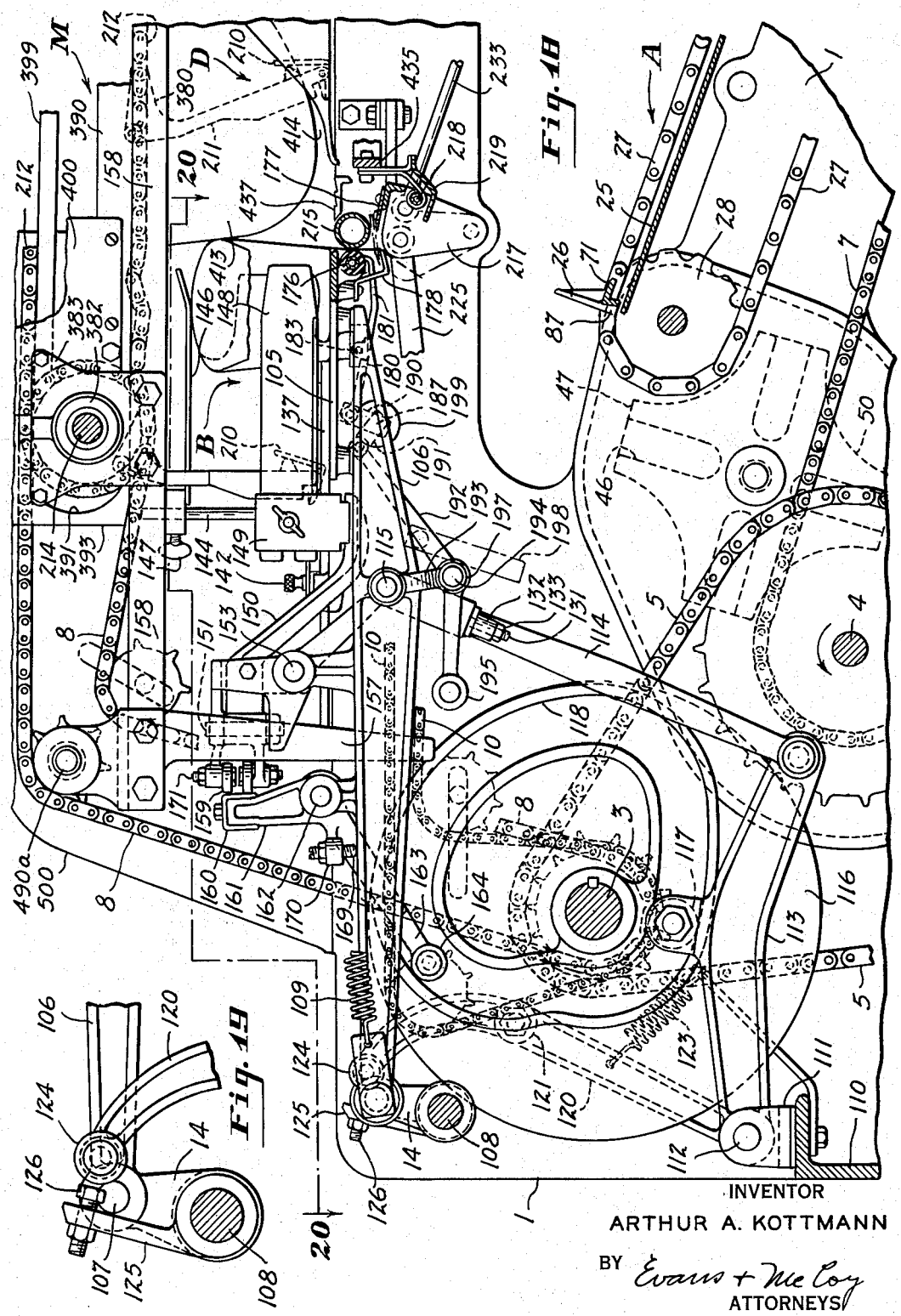

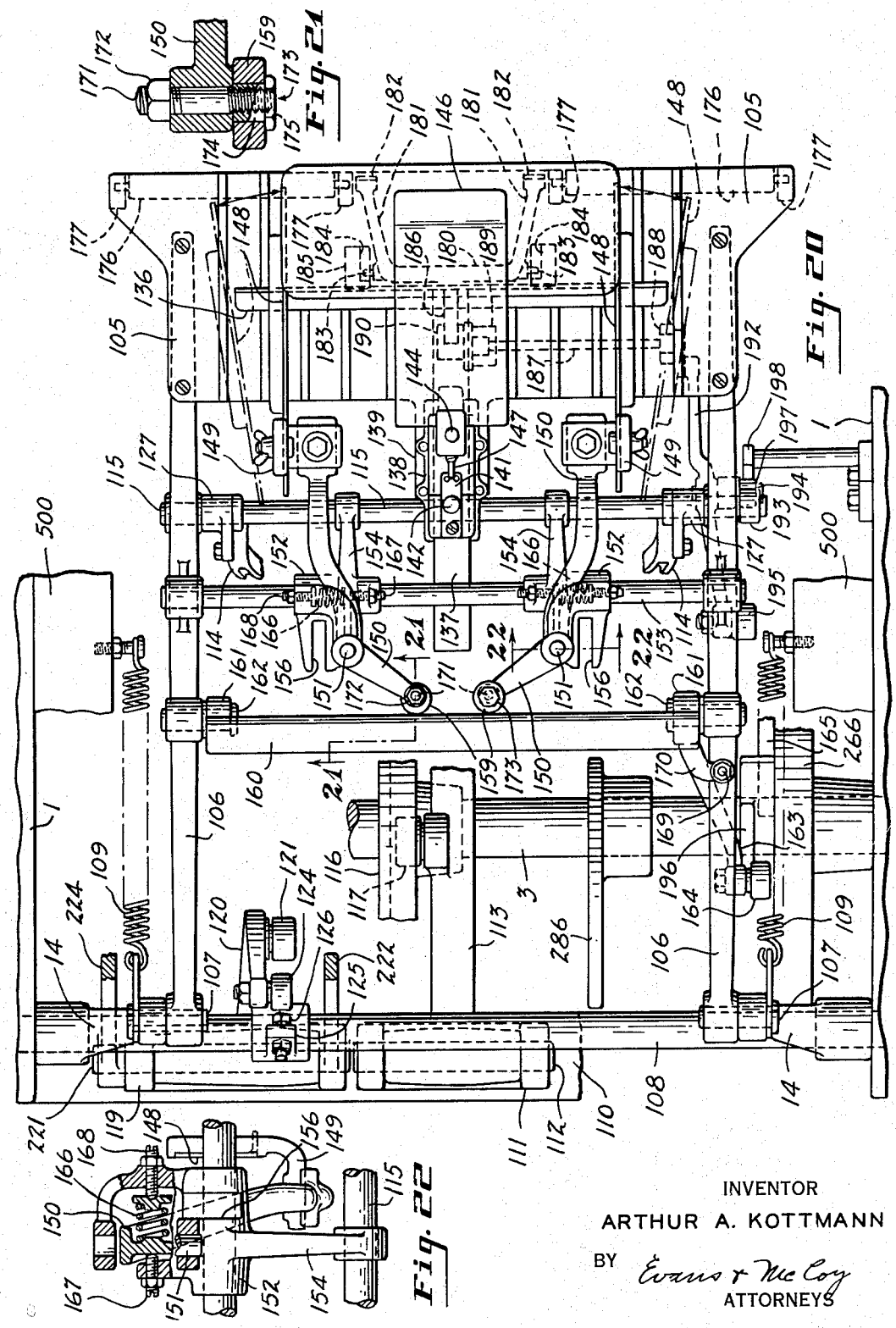

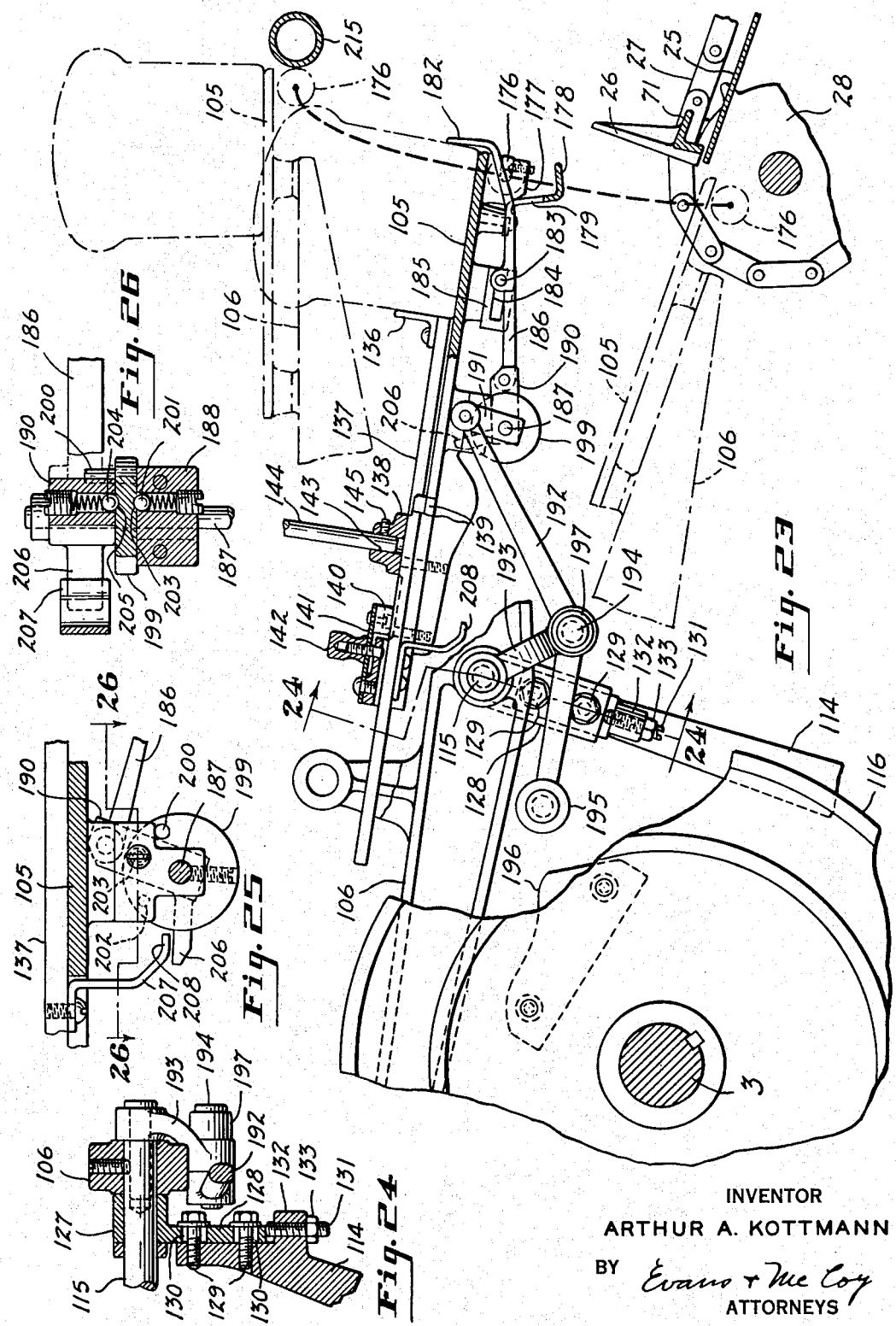

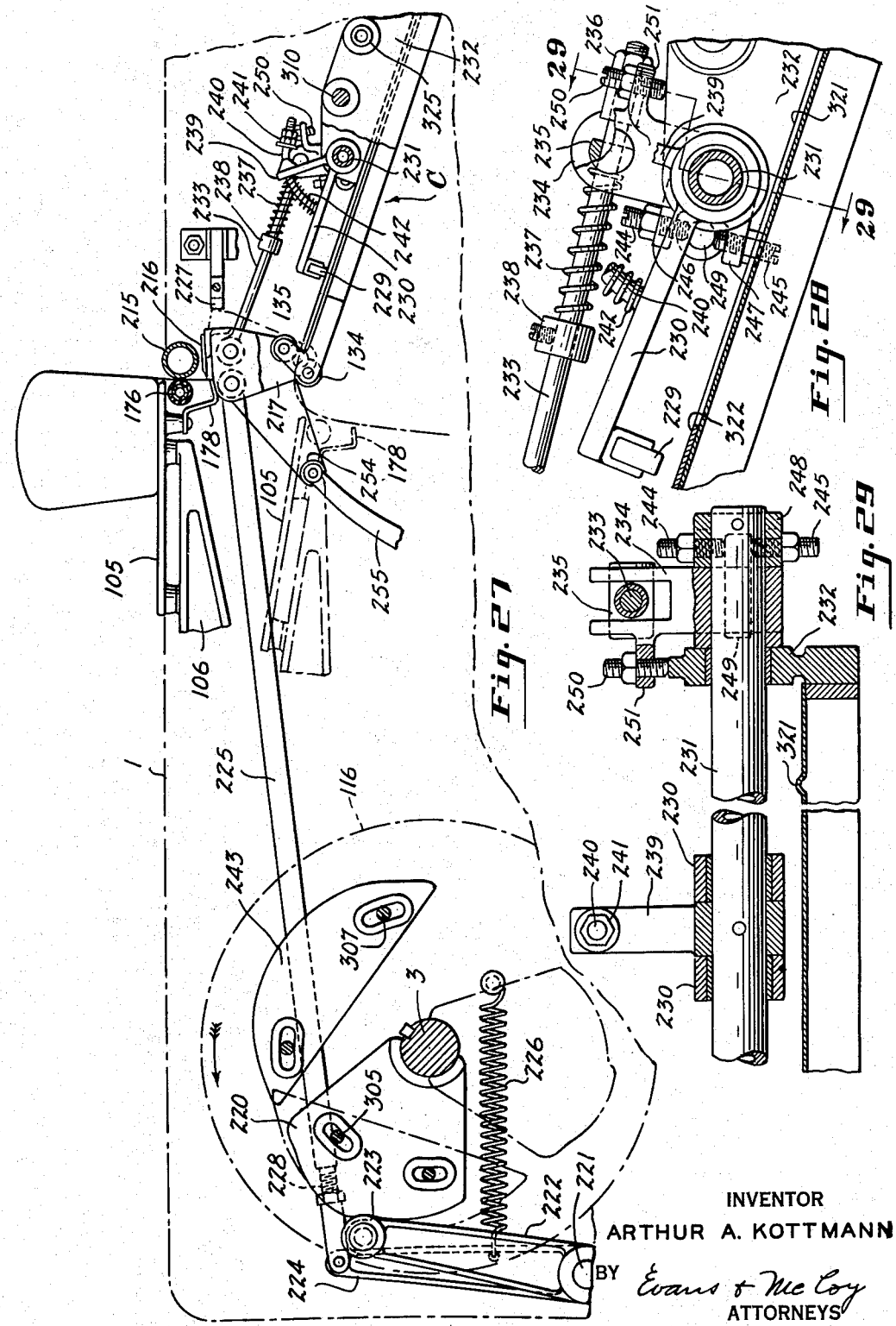

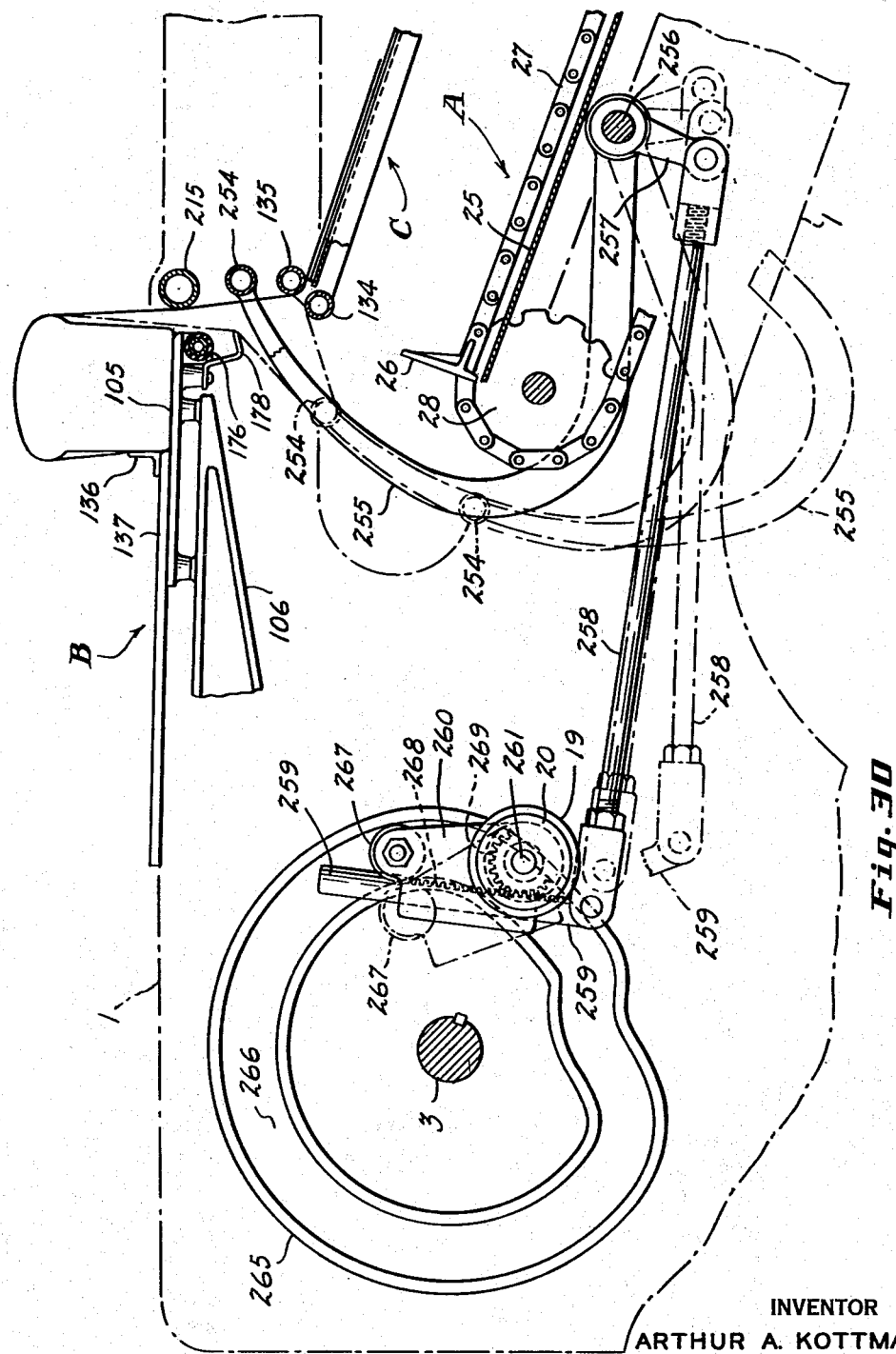

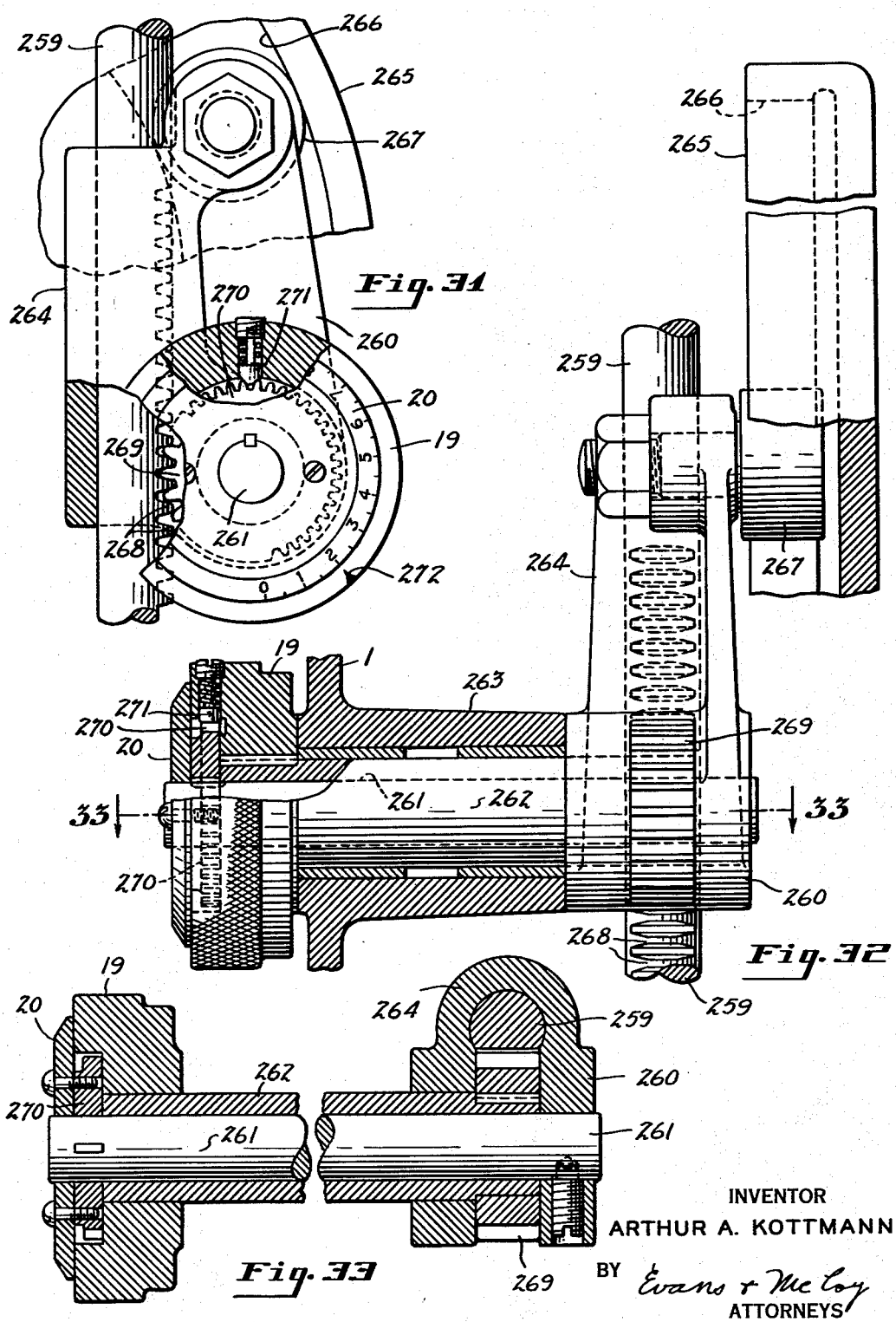

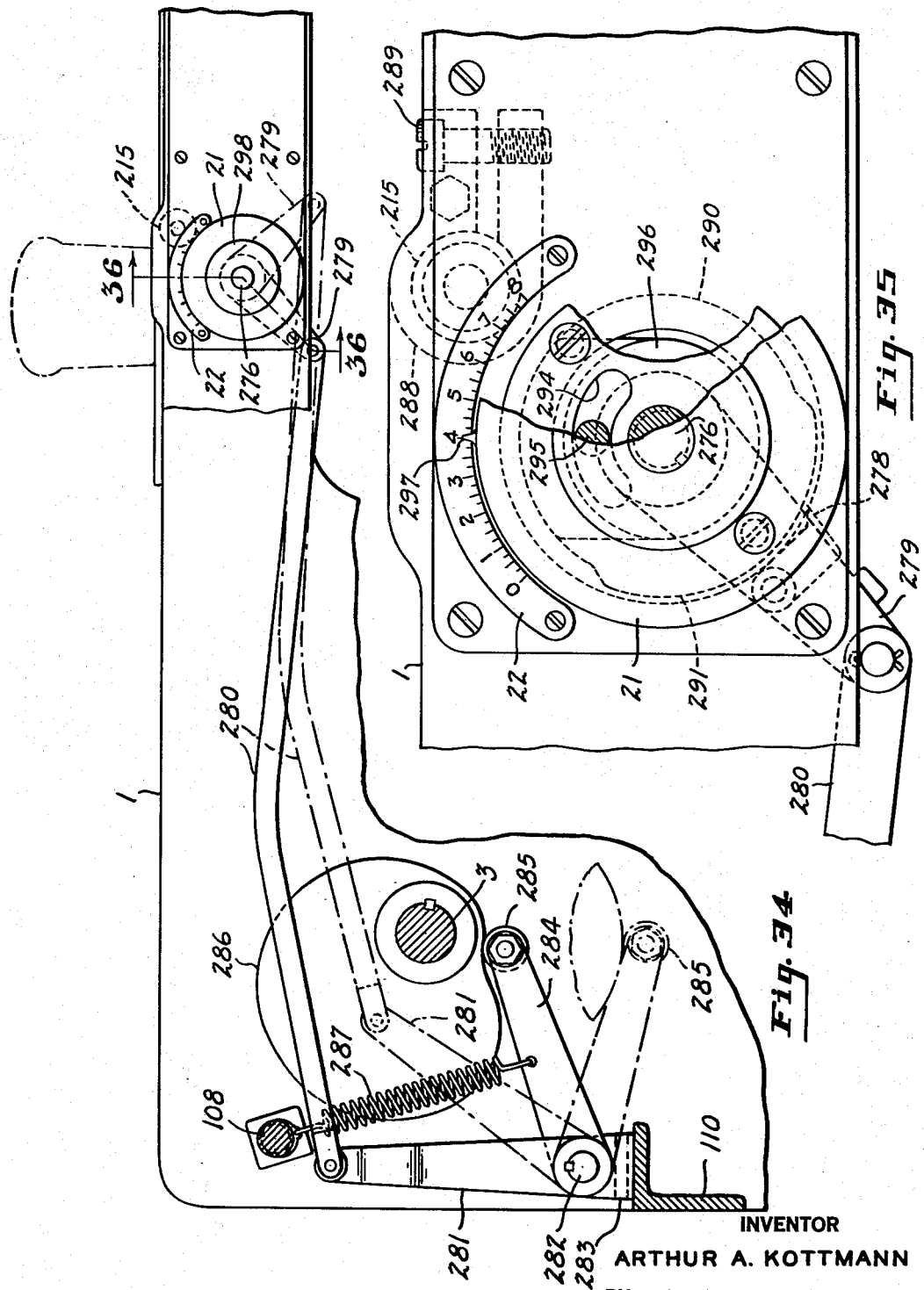

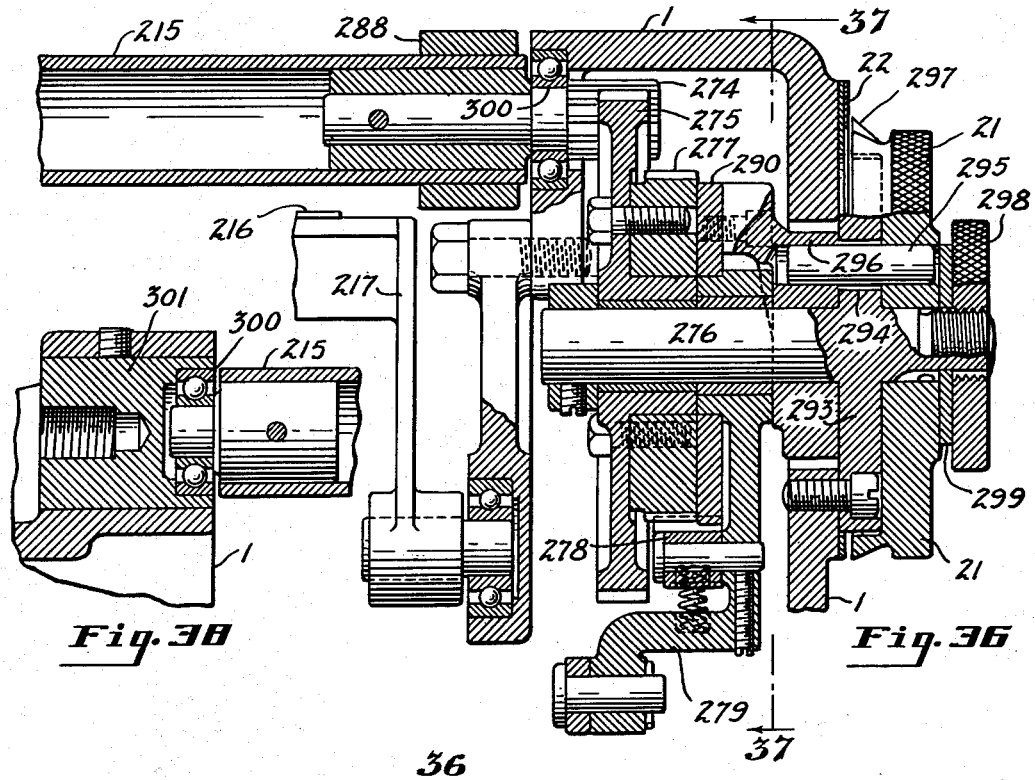
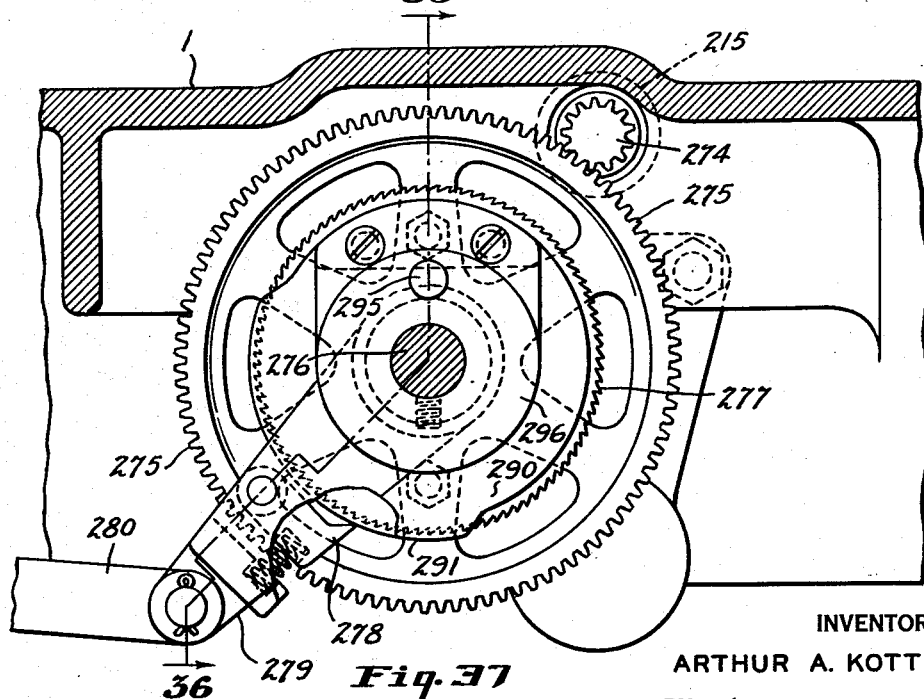

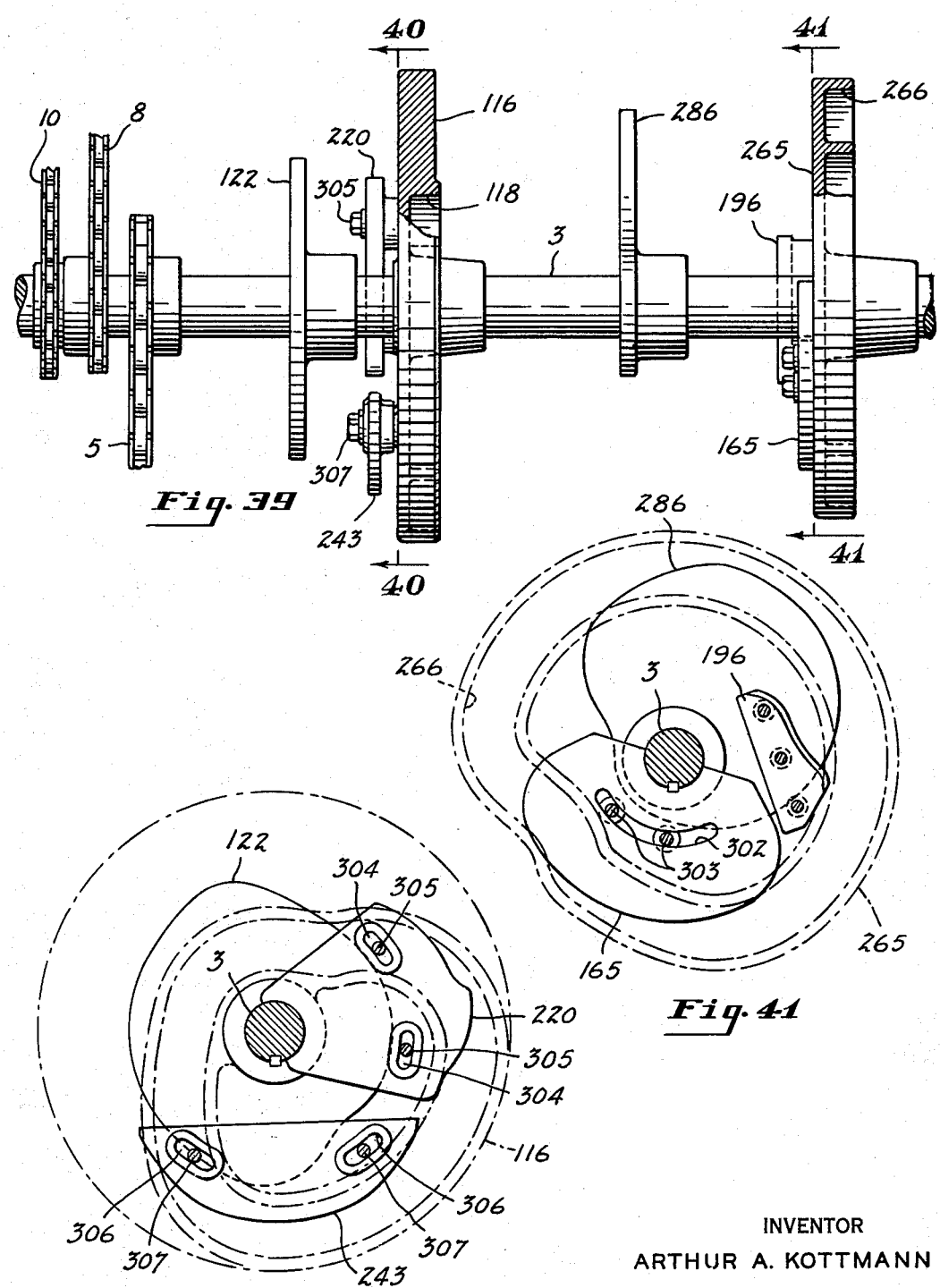

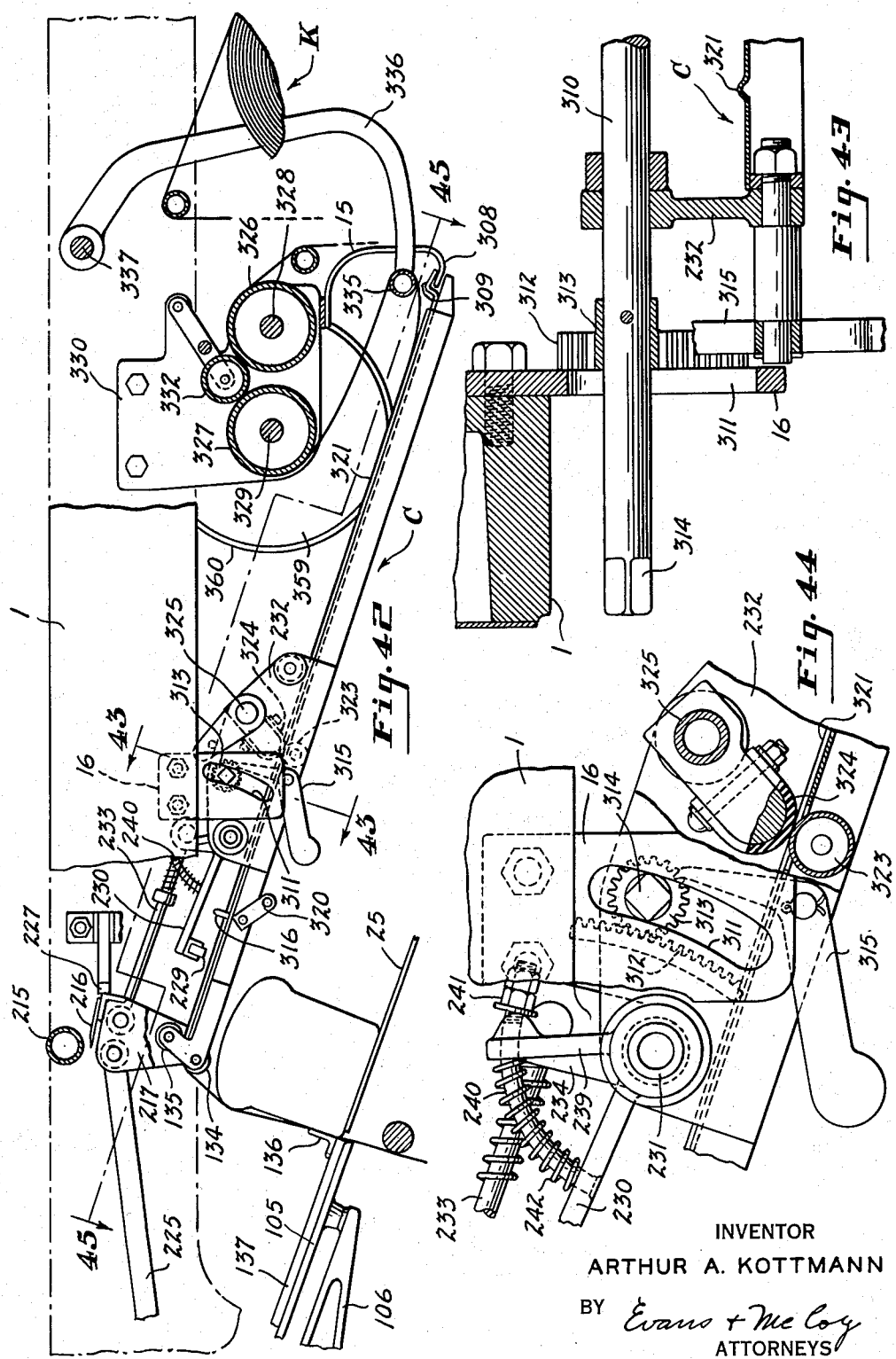

May 29, 1956  A. A. KOTTMANN  2,747,349
WRAPPING MACHINE
Filed Oct. 6, 1950  28 Sheets-Sheet 19

INVENTOR
ARTHUR A. KOTTMANN
BY Evans + McCoy
ATTORNEYS

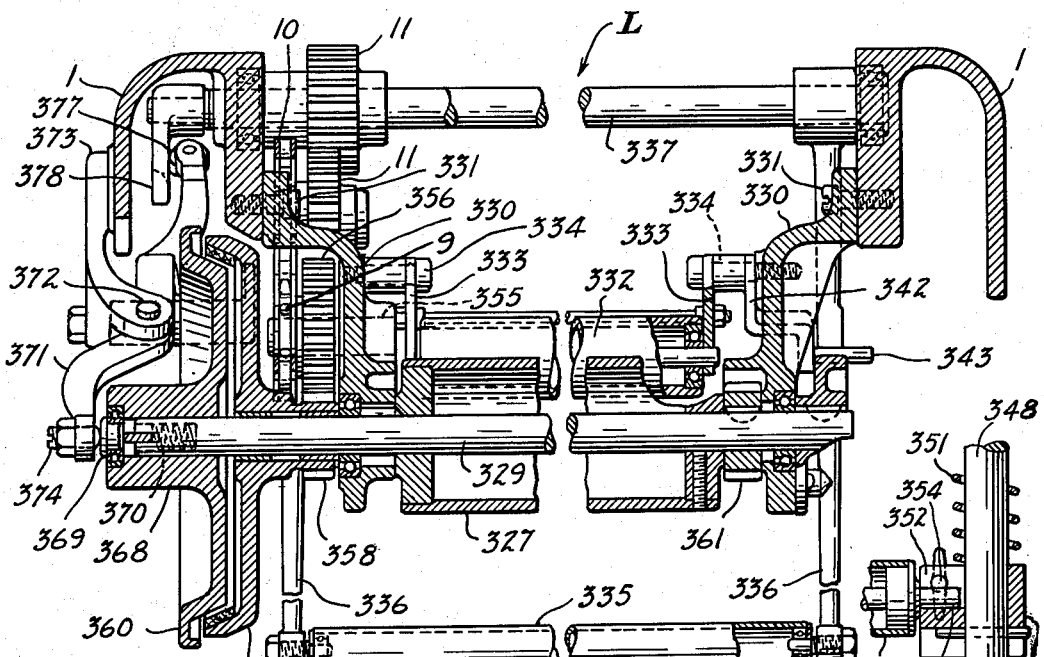
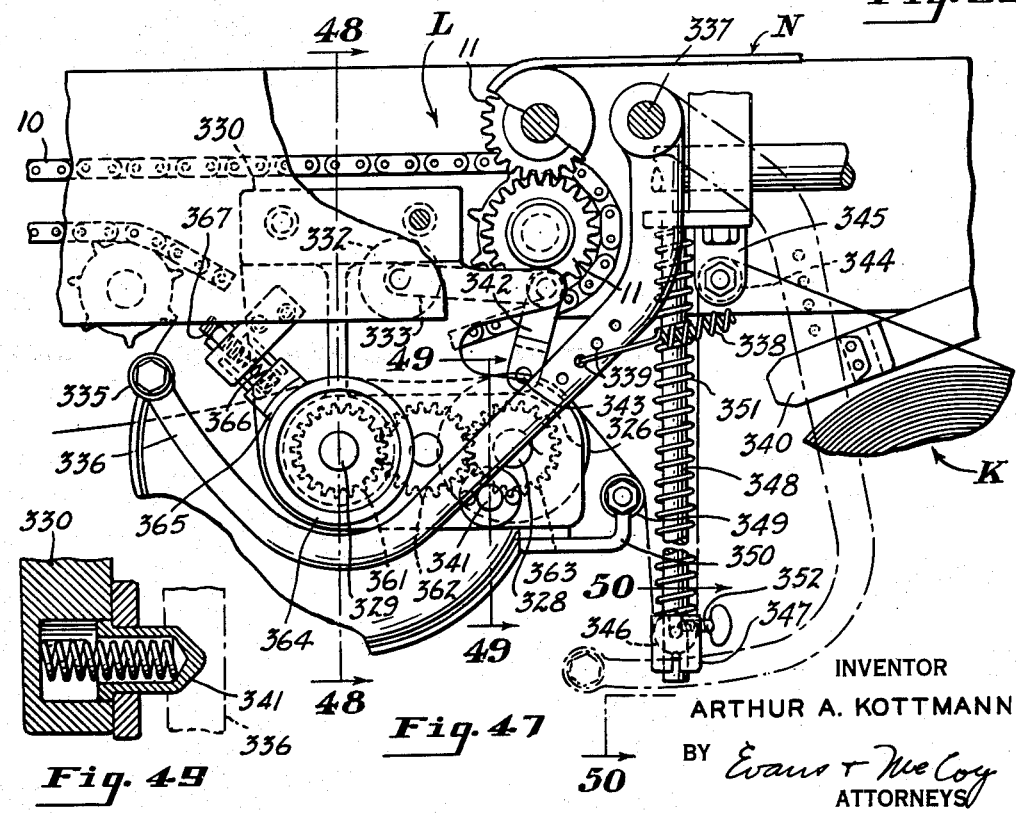

May 29, 1956  A. A. KOTTMANN  2,747,349
WRAPPING MACHINE
Filed Oct. 6, 1950  28 Sheets-Sheet 21
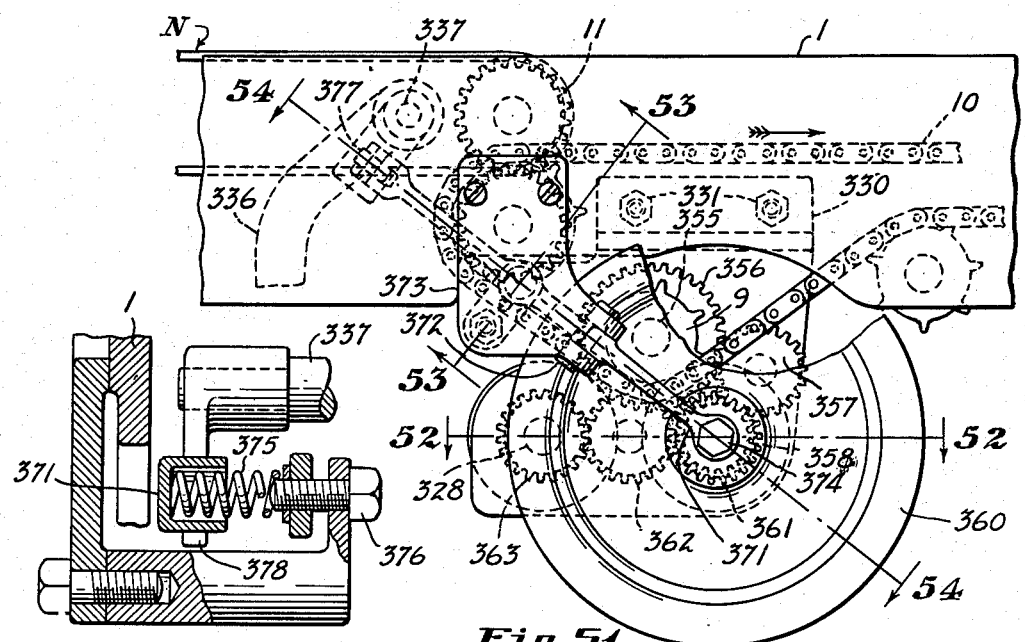
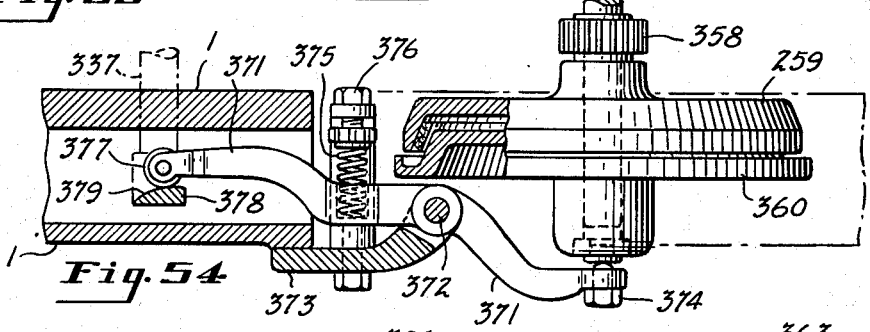
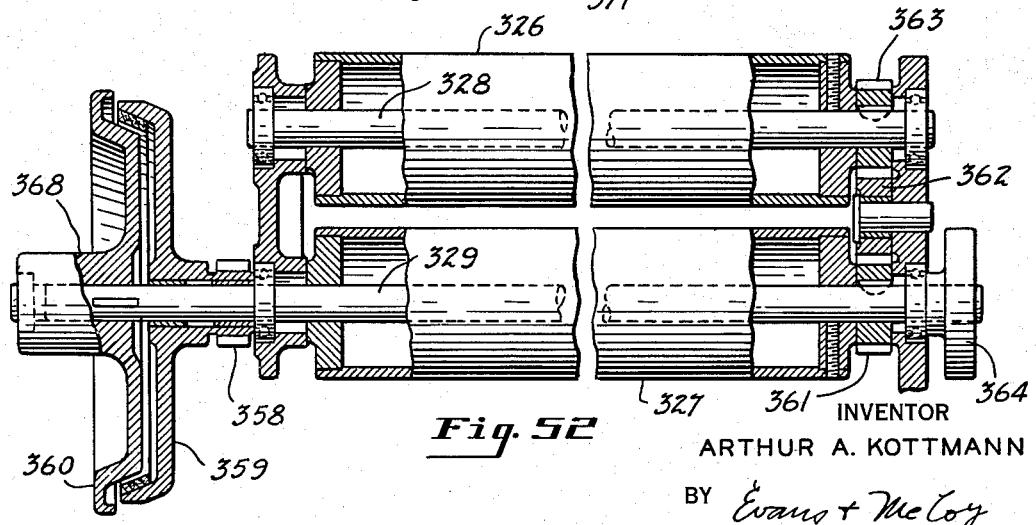
INVENTOR
ARTHUR A. KOTTMANN
BY Evans + McCoy
ATTORNEYS

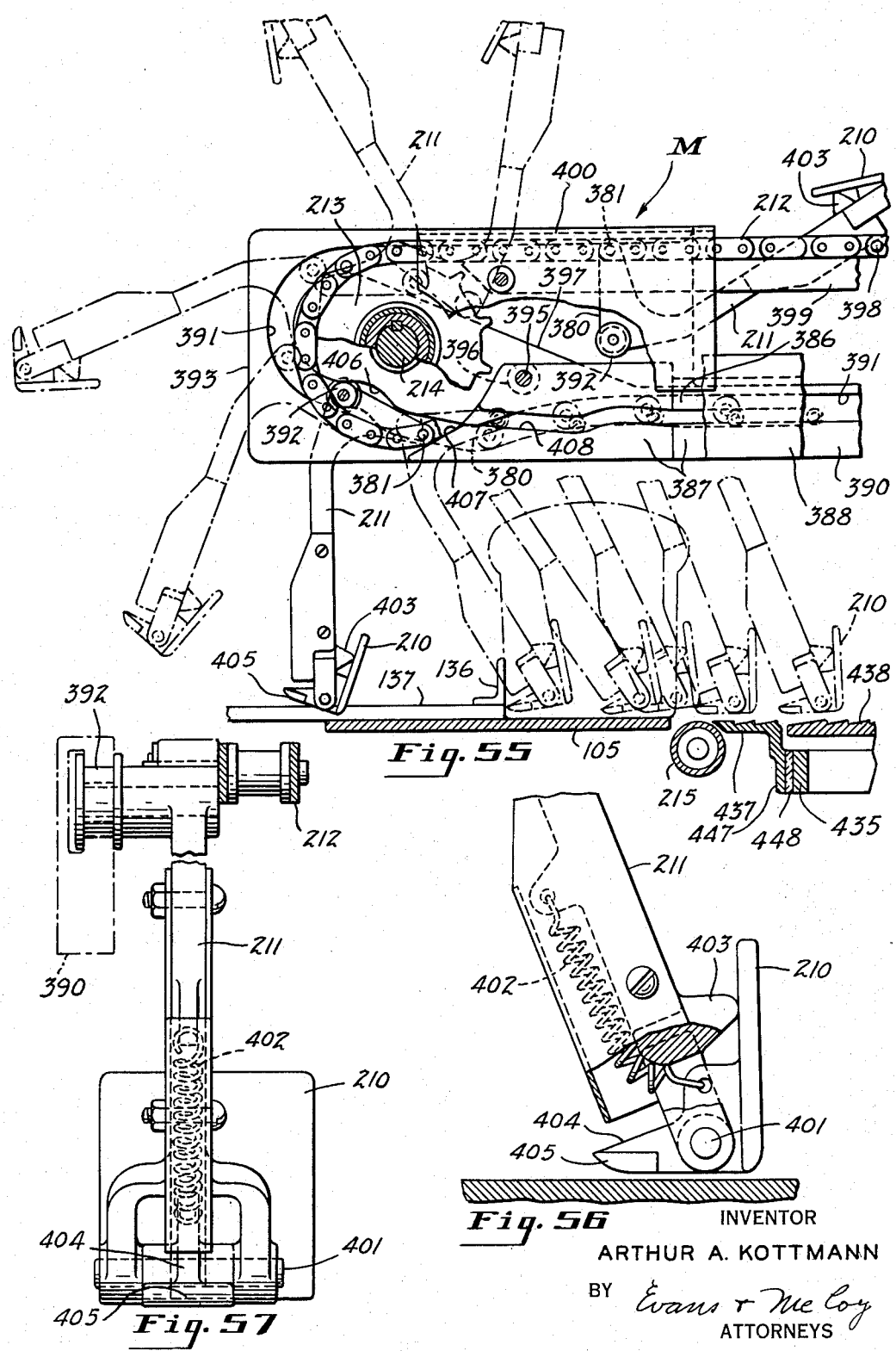

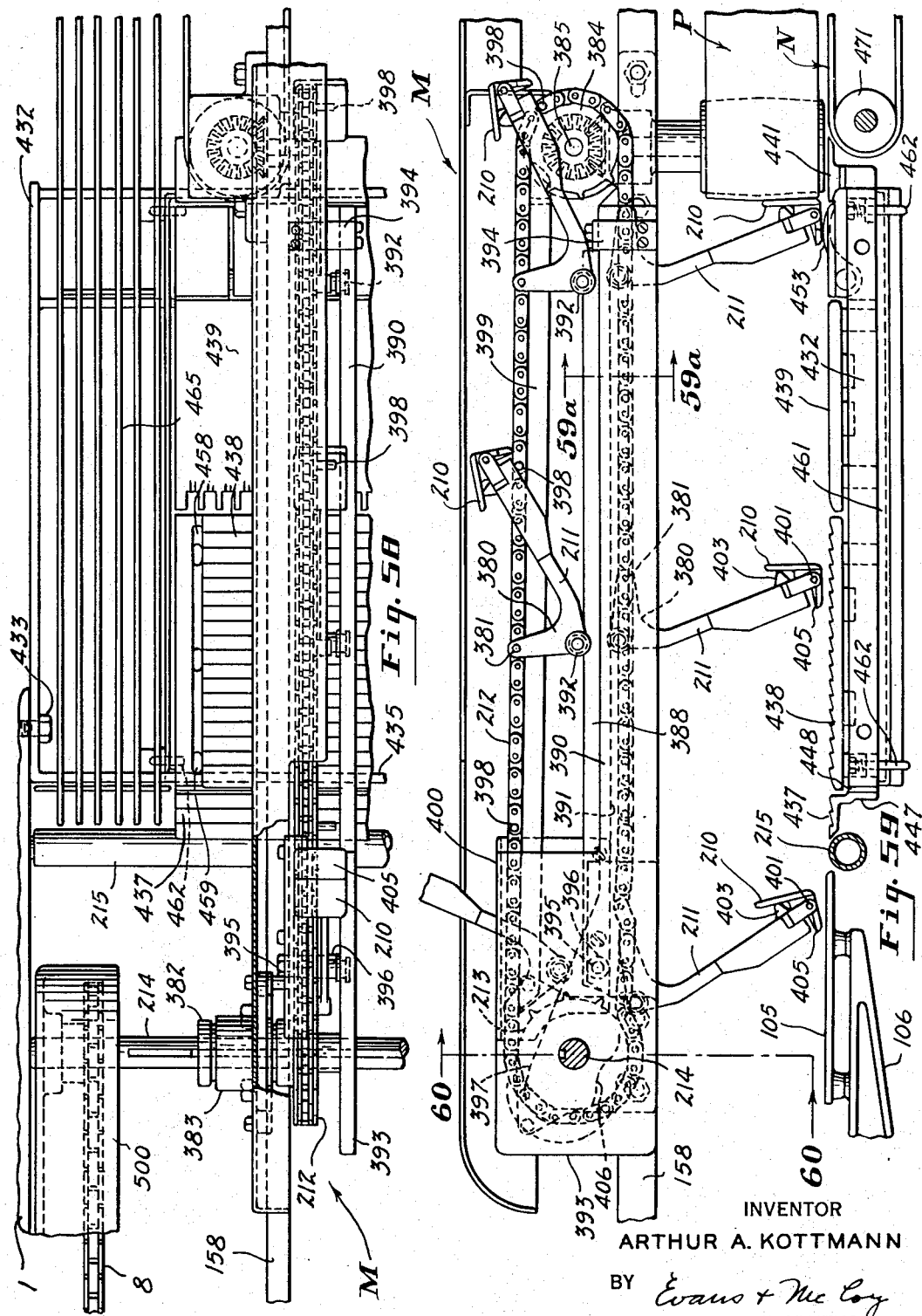

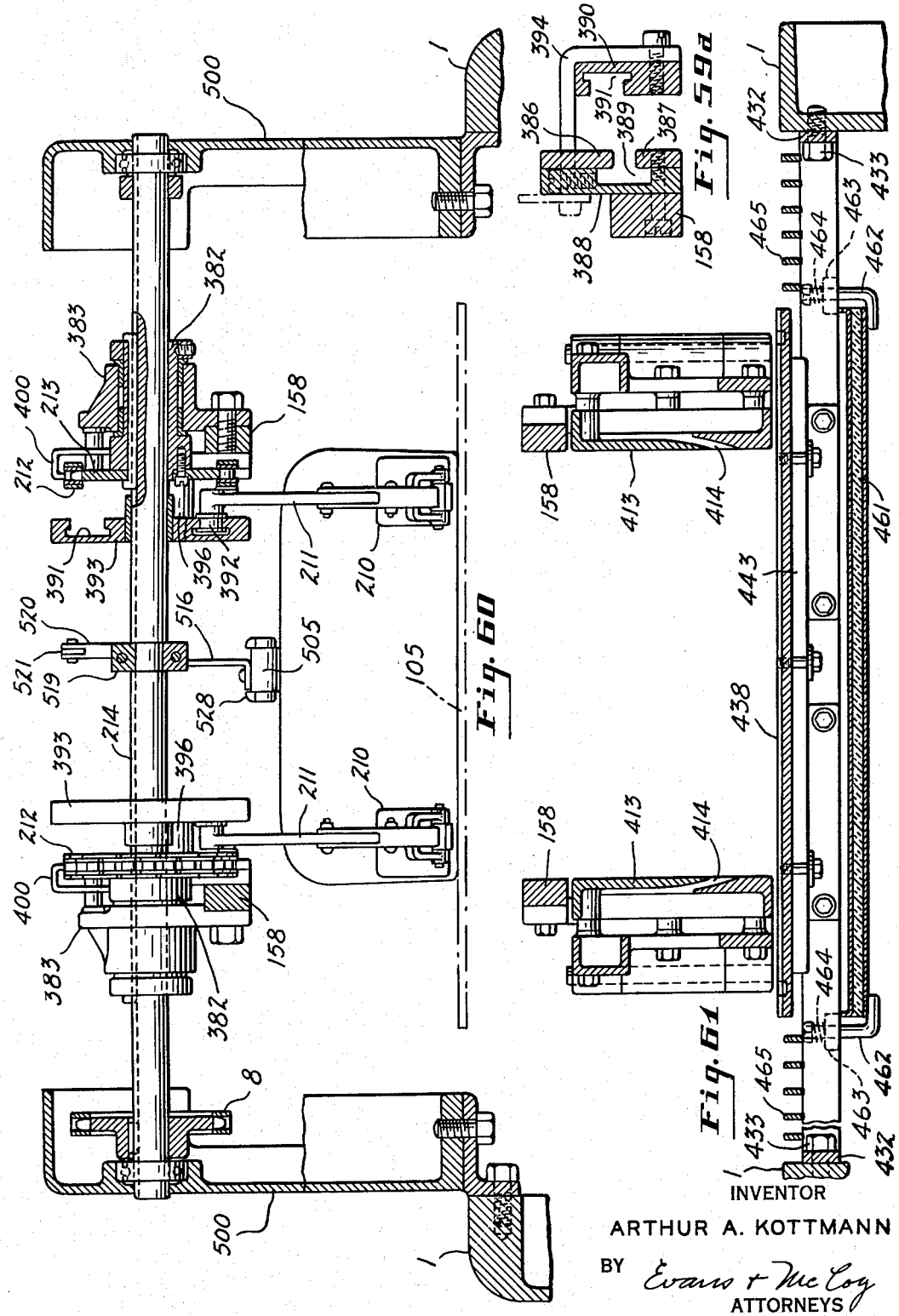

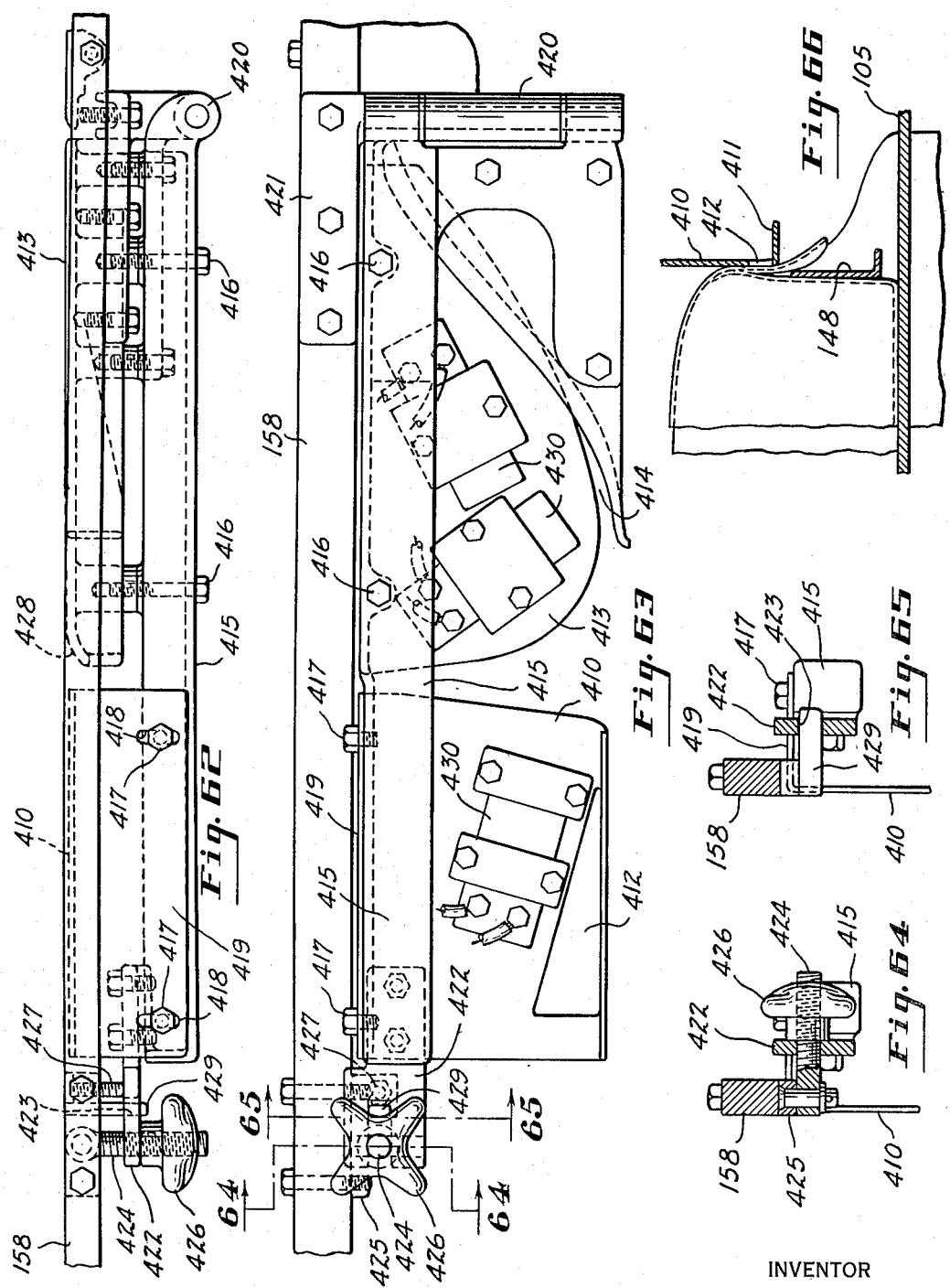

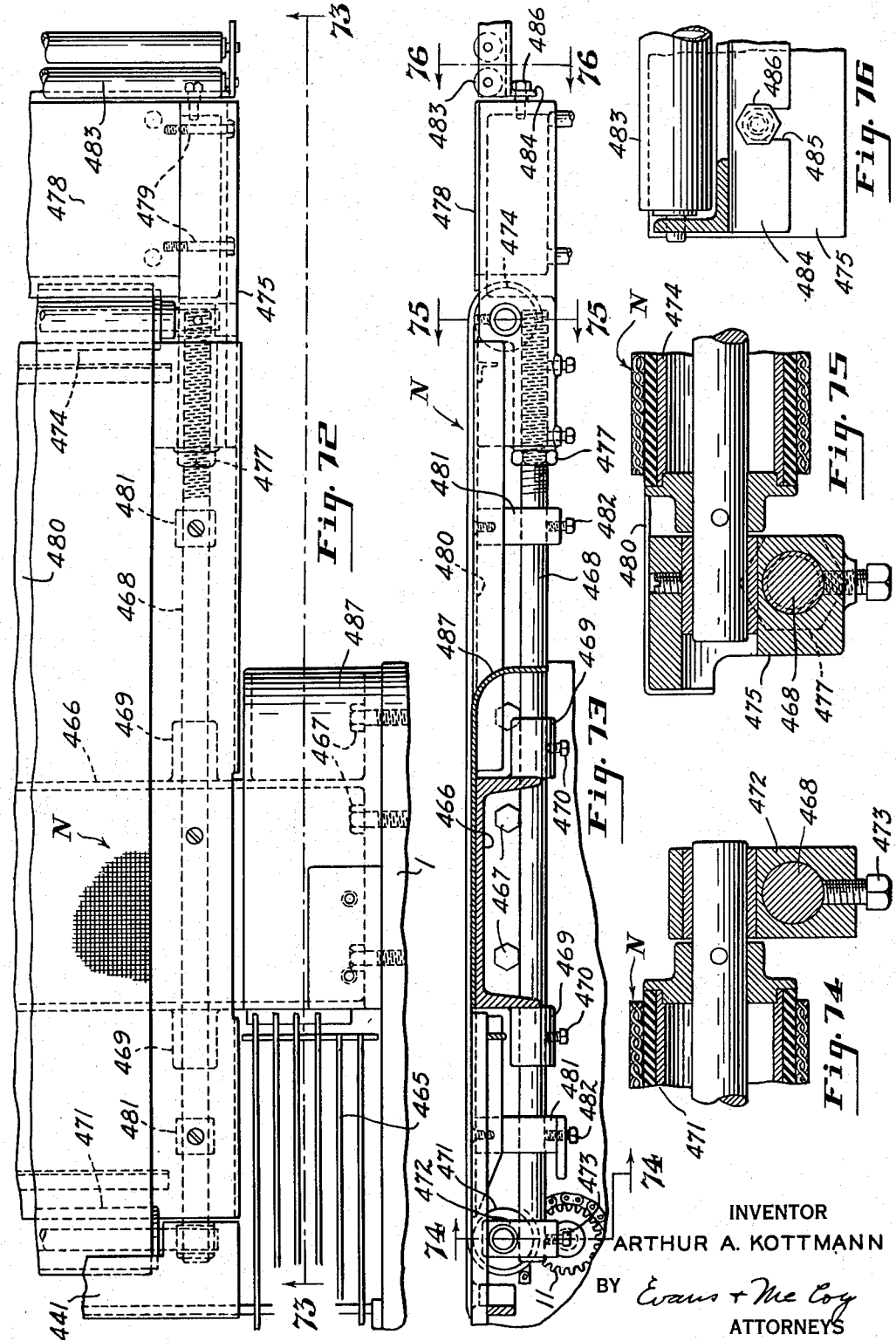

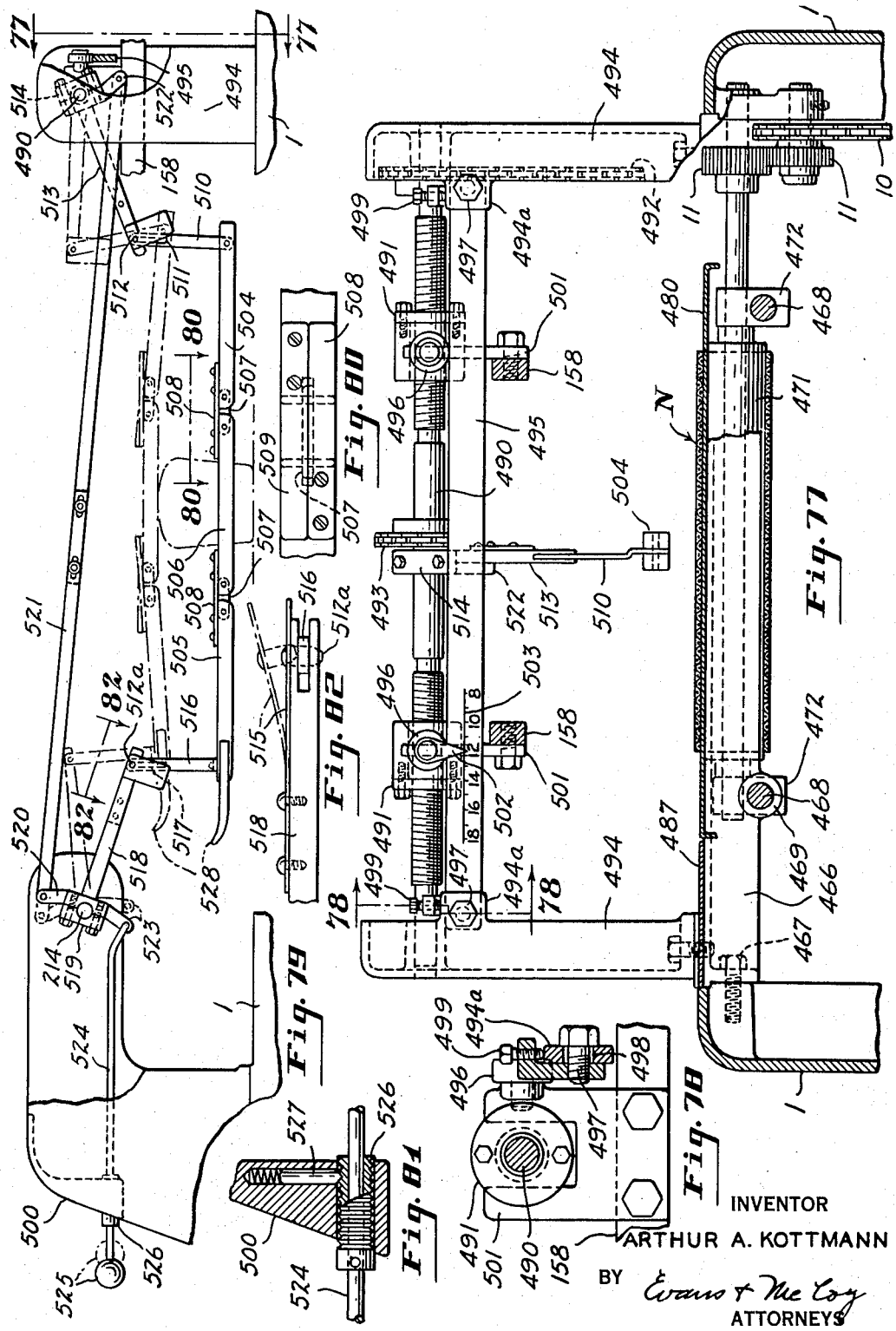

United States Patent Office 2,747,349
Patented May 29, 1956

2,747,349

WRAPPING MACHINE

Arthur A. Kottmann, Davenport, Iowa, assignor, by mesne assignments, to American Machine & Foundry Company, New York, N. Y., a corporation of New Jersey Application October 6, 1950, Serial No. 188,686

30 Claims. (Cl. 53—111)

This invention relates to wrapping machines of the type in which the leading end of a web of wrapping material is applied to an article to be wrapped as the article is moved from a feed runway onto an elevator, and in which the web is wound about the article and folded against the ends of the article during movement of the elevator, transfer of the articles from the elevator to a discharge runway, and movement along the said discharge runway.

In the machine of the present invention the web feed is controlled by tension applied to the end of the web being wrapped about the article and, in order to prevent the formation of objectionable slack between the article being wrapped and the web feed mechanism which would tend to produce an uneven wrap, a web guiding means in the form of a draping table is provided above the feed runway and below the discharge runway, and this web guiding means is adjustable so that a small clearance may be provided between the web guide and the articles fed into engagement with the web.

To further reduce slack and improve the web feed control, the elevator is retracted away from the delivery end of the feed runway and the web guides during its upward travel. This retraction of the elevator during its upward movement not only serves to maintain tension on the web and to provide a more uniform feed of the web, but also provides a greater clearance between the articles being wrapped during their transfer from the feed runway to the discharge runway and the web guides and article feeding mechanism, thus avoiding damage to articles being wrapped and to the machine. The retraction of the elevator is particularly advantageous in wrapping articles such as heavily overproofed loaves of bread which have portions projecting past the receiving edge of the elevator platform.

The invention also has for further objects to provide adjustments for varying the tightness of the wrap, to provide means for varying the underlap of the wrapper with respect to the article being wrapped, and to provide conveniently located handwheels on the front of the machine frame for operating the various adjusting devices.

Additional objects are to provide a simple and highly sensitive control for the web feed, and to so mount the web feeding and control elements that they can be readily positioned to provide a clear path for threading the web of wrapping material through the feed mechanism and over the drape table.

It is also an object of the invention to provide a mechanism that can be readily assembled or disassembled, and in which all parts of the wrapping mechanism are easily accessible for inspection or repair.

Reference should be had to the accompanying drawings forming a part of this specification in which:

Figure 1 is a side elevation of a wrapping machine embodying the invention;

Fig. 2 is a top plan view of the machine;

Fig. 3 is a side elevation showing the wrapping machine of the present invention in tandem with a bread slicing machine;

Fig. 5 is a rear elevation of the machine;

Fig. 6 is a side elevation on an enlarged scale of the feed conveyor driving mechanism;

Fig. 7 is a section taken on the line indicated at 7—7 in Fig. 6;

Fig. 8 is a section taken on the line indicated at 8—8 in Fig. 6;

Fig. 9 is a fragmentary side elevation of the clutch controlling the operation of the feed conveyor;

Fig. 10 is a fragmentary side elevation of the receiving end of the article feed conveyor and the delivery end of the slicing machine conveyor, together with the article transfer or shuttle mechanism interposed between the two conveyors;

Fig. 11 is a fragmentary vertical section showing the shuttle plate in an intermediate position;

Fig. 12 is a fragmentary top plan view of the shuttle operating mechanism viewed as indicated at 12—12 in Fig. 10;

Fig. 13 is a fragmentary vertical section taken on the line indicated at 13—13 in Fig. 10;

Fig. 14 is a fragmentary transverse section taken on the line indicated at 14—14 in Fig. 1;

Fig. 15 is a fragmentary section taken on the line indicated at 15—15 in Fig. 14;

Fig. 16 is a fragmentary view showing the elevator and elevator operating mechanism in side elevation with the elevator in its lowermost position in alinement with the feed conveyor;

Fig. 17 is a fragmentary sectional view showing a flight of the feed conveyor in the position in which it is stopped after transfer of the article to the elevator platform, and also showing the article retainer in position between the flight and the article on the elevator platform;

Fig. 18 is a fragmentary side elevation of the elevator and the overhead discharge conveyor with the elevator in its uppermost position in alinement with the discharge runway;

Fig. 19 is a fragmentary detail view showing the adjustable abutment on the elevator retracting arm;

Fig. 20 is a top plan view of the elevator;

Fig. 21 is a fragmentary section taken on the line indicated at 21—21 in Fig. 20;

Fig. 22 is a fragmentary section on an enlarged scale taken on the line indicated at 22—22 in Fig. 20;

Fig. 23 is a fragmentary side elevation showing the elevator in an intermediate position;

Fig. 24 is a fragmentary section taken on the line indicated at 24—24 in Fig. 23;

Fig. 25 is a fragmentary sectional view showing the yieldable retainer actuating connection, together with the device for locking the retainer in retracted position;

Fig. 26 is a fragmentary horizontal section taken on the line indicated at 26—26 in Fig. 25;

Fig. 27 is a fragmentary view showing the web cut-off mechanism in side elevation;

Fig. 28 is a side elevation on an enlarged scale of the web clamping device associated with the cut-off mechanism;

Fig. 29 is a section taken on the line indicated at 29—29 in Fig. 28;

Fig. 30 is a fragmentary side elevation of the web pull-out or underlap control mechanism which is operable prior to each web cut-off to draw out enough of the web for engagement with the next article to be wrapped;

Fig. 31 is a fragmentary side elevation on an enlarged scale of the underlap adjusting mechanism;

Fig. 32 is a front elevation of the adjusting mechanism shown in Fig. 31;

Fig. 33 is a horizontal section taken on the line indicated at 33—33 in Fig. 32;

Fig. 34 is a side elevation of the mechanism for regulating the tightness of the wrap;

Fig. 35 is a side elevation on an enlarged scale of the tight and loose wrap adjusting means;

Fig. 36 is a sectional view taken substantially on the line indicated at 36—36 in Figs. 34 and 37;

Fig. 37 is a section taken on the line indicated at 37—37 in Fig. 36;

Fig. 38 is a fragmentary sectional view showing the mounting of the rear end of the wrap regulating roller;

Fig. 39 is a fragmentary rear elevation showing the cam assembly;

Fig. 40 is a section taken on the line indicated at 40—40 in Fig. 39;

Fig. 41 is a section taken on the line indicated at 41—41 in Fig. 39;

Fig. 42 is a side elevation of the drape table;

Fig. 43 is a fragmentary section taken on the line indicated at 43—43 in Fig. 42;

Fig. 44 is a fragmentary side elevation on an enlarged scale showing the drape table adjusting mechanism;

Fig. 47 is a side elevation on an enlarged scale showing the web feed mechanism as viewed from the front side of the machine;

Fig. 48 is a section taken on the line indicated at 48—48 in Fig. 47;

Fig. 49 is a fragmentary section on an enlarged scale taken on the line indicated at 49—49 in Fig. 47 and showing the latch for releasably holding certain of the web engaging rollers in positions clear of the web to facilitate threading of the web through the feed mechanism;

Fig. 50 is a fragmentary sectional view showing the quick detachable mounting of the slack take-up roller;

Fig. 51 is a side elevation of the web feed mechanism viewed from the back of the machine;

Fig. 52 is a horizontal section taken on the line indicated at 52—52 in Fig. 51;

Fig. 53 is a section taken on the line indicated at 53—53 in Fig. 51;

Fig. 54 is a section taken on the line indicated at 54—54 in Fig. 51;

Fig. 55 is a fragmentary side elevation of the rear end of the overhead flight conveyor which discharges articles from the elevator onto the discharge runway and advances articles along the runway;

Fig. 56 is a detailed view on an enlarged scale showing a flight arm and pusher plate on an enlarged scale;

Fig. 57 is a rear elevation of the arm and plate shown in Fig. 56;

Fig. 58 is a fragmentary top plan view of one side of the discharge conveyor;

Fig. 59 is a side elevation of the discharge conveyor;

Fig. 59a is a transverse section taken on the line indicated at 59a—59a in Fig. 59;

Fig. 60 is a transverse vertical section taken on the line indicated at 60—60 in Fig. 59;

Fig. 61 is a transverse vertical section taken on the line indicated at 61—61 in Fig. 1;

Fig. 62 is a top plan view of the folder plates at one side of the discharge runway;

Fig. 63 is a side elevation of the folder plates shown in Fig. 62;

Fig. 64 is a section taken on the line indicated at 64—64 in Fig. 63;

Fig. 65 is a section taken on the line indicated at 65—65 in Fig. 63;

Fig. 66 is a sectional view showing the manner in which the top folder plate acts upon the wrapper web;

Fig. 72 is a fragmentary plan view of the front half of the bed portion of the cooling section of the discharge runway;

Fig. 73 is a fragmentary longitudinal vertical section taken on the line indicated at 73—73 in Fig. 72;

Fig. 74 is a fragmentary transverse vertical section taken on the line indicated at 74—74 in Fig. 73;

Fig. 75 is a fragmentary transverse vertical section taken on the line indicated at 75—75 in Fig. 73;

Fig. 76 is a fragmentary vertical transverse section taken on the line indicated at 76—76 in Fig. 73;

Fig. 77 is a vertical transverse section through the top portion of the machine taken on the line indicated at 77—77 in Figs. 1 and 79, and showing the side rail adjusting mechanism in front elevation;

Fig. 78 is a section taken on the line indicated at 78—78 in Fig. 77;

Fig. 79 is a side elevation of the article hold-down;

Fig. 80 is a fragmentary plan view showing one of the joints of the hold-down bar viewed as indicated at 80—80 in Fig. 79;

Fig. 81 is a sectional view showing the yielding lock for the hold-down actuator; and Fig. 82 is a fragmentary plan view showing the detachable spring latch by which the hold-down is attached to its supporting arms viewed as indicated at 82—82 in Fig. 79.

Figure 4:
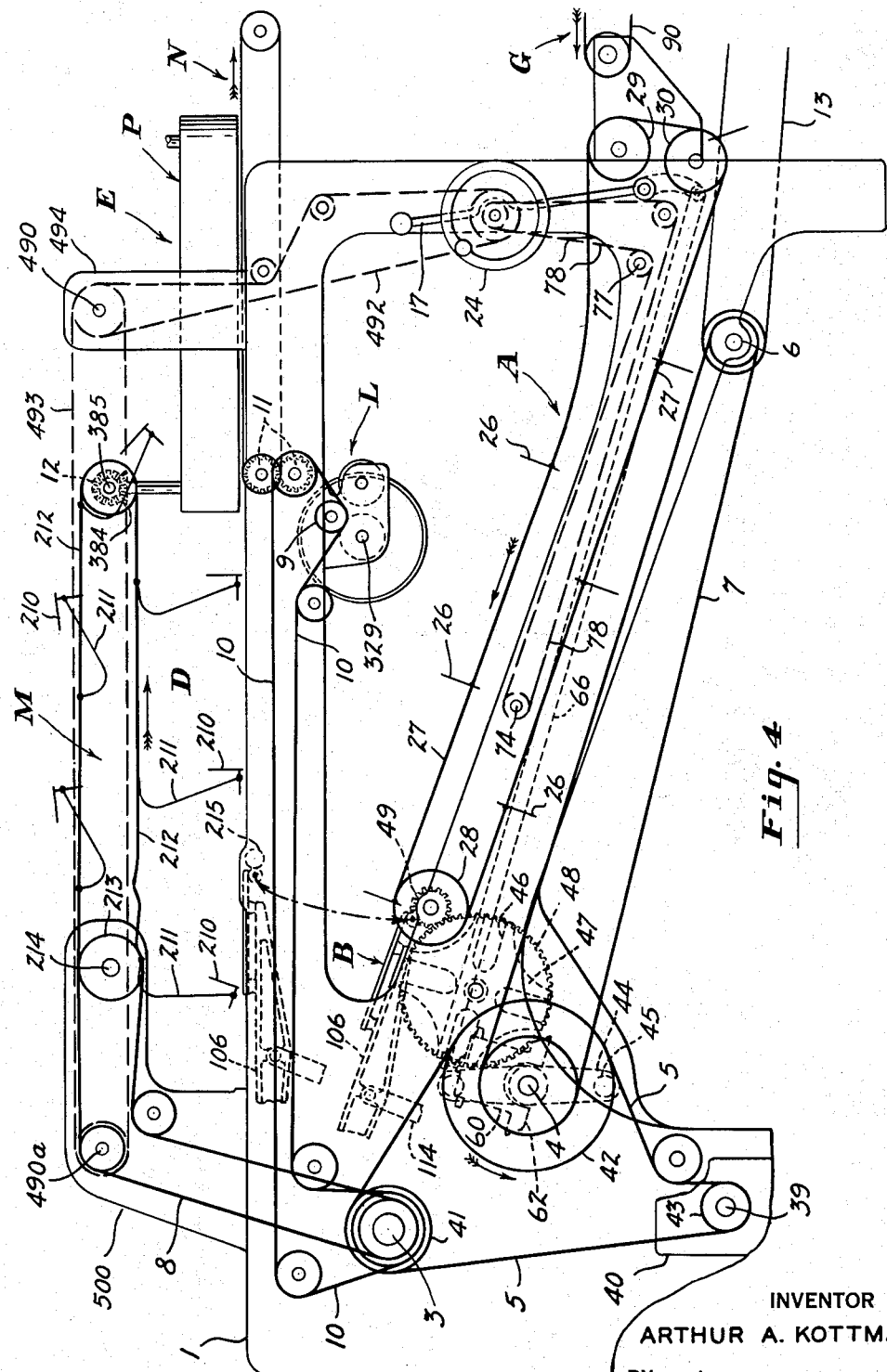
Fig. 4 is a diagrammatic side elevation showing the article moving conveyors and the driving mechanism therefor.

*General description of operation*
*(Figs. 1, 2, 3 and 4)*

In the wrapping machine of the present invention the articles to be wrapped are delivered to the wrapping mechanism by means of an endless pusher flight conveyor A which delivers to a vertically swinging elevator or transfer platform B. The infeed conveyor A delivers the articles to be wrapped onto the elevator B and in passing from the conveyor A to the elevator B the articles engage with the leading end of a web of wrapping material which is suspended from a drape table C over which the wrapping material is fed.

The feed conveyor A is mounted in an inclined position and delivers the articles from its upper end to the elevator B which moves from an inclined receiving position in alinement with the conveyor A to an upper horizontal position in alinement with a discharge runway which includes the usual folding and heating section D and cooling section E to complete the wrapping of the article and seal the folds of the wrapper.

The wrapping machine may be conveniently operated in tandem with a bread slicing machine such as the bread slicing machine F shown diagrammatically in Fig. 3, the slicing machine having a delivery conveyor G which delivers the sliced loaves to the infeed conveyor A of the wrapping machine by means of a suitable shuttle mechanism H interposed between the conveyors G and A.

A web of wrapping material is fed to the drape table C from a reel rack K through a tension controlled web feed mechanism L. During each wrapping cycle the leading end of the web of wrapping material is suspended between the delivery end of the feed conveyor A and the elevator B where it is engaged by the article to be wrapped and clamped between the article and elevator so that a pull is exerted on the web to create tension therein and cause actuation of the feed mechanism to supply the length of web needed for wrapping the article.

The article being wrapped is discharged from the elevator and moved through the folding and sealing sections of the discharge runway by means of an overhead endless pusher conveyor M. The bottom of the cooling section E is formed by an endless belt N and the sides by two endless belts P which grip and travel with the wrapped article during cooling so that lapping portions of the wrapper are held against relative movement while the wax or other adhesive is setting.

The feed conveyor A is intermittently driven with a dwell during upward movement of the elevator B and the elevator is reciprocated with a dwell at its upper and lower limits of movement. The overhead pusher conveyor M and conveyors N and P are continuously driven.

The machine has a frame 1, the top of which is horizontal to provide a support for the article discharge runway.

The machine is dirven by an electric motor 2 which continuously drives a main cam shaft 3 and a feed conveyor driving shaft 4 through a sprocket chain 5. A shaft 6 which drives the shuttle mechanism H is driven from the shaft 4 through a sprocket chain 7. The overhead pusher conveyor M is driven from the shaft 3 through a sprocket chain 8 and a sprocket 9 that operates the web feed mechanism L is driven from the shaft 3 through a sprocket chain 10. The belt N is driven by the sprocket chain 10 through gears 11 and the belts P are driven by the endless pusher conveyor M through bevel gears 12. When the wrapping machine is operated in tandem with the slicing machine F the slicing machine and its discharge conveyor G are driven from the shaft 6 by a sprocket chain 13.

In order to avoid slack between the article being wrapped and the web feed mechanism and in order to reduce slack and obtain more uniform control of the web feed to articles varying in height, the drape table C is adjustably mounted so that its upper end can be positioned at different distances above the discharge end of the infeed conveyor A so as to obtain a more direct pull on the paper and a better regulation of the web feed and also to avoid delivery of an excess amount of wrapping material to low articles.

The table C, which is mounted directly above the conveyor A, is pivotally and slidably supported at its lower end on a bracket 15 carried by the frame of the machine, and is adjustably supported intermediate its ends upon brackets 16 attached to the top portions of the frame 1, the table adjusting mechanism being so designed that an operating connection between the web cutoff mechanism carried by the main frame and paper clamping mechanism carried by the table C is not disturbed by the adjustment.

The machine is so designed that all manually operable adjusting and controlling elements are mounted on the front side of the machine in positions conveniently accessible to an operator standing at the front of the machine. A hand lever 17 mounted on the front end of the frame controls the operation of the feed conveyor A and the slicing machine F and conveyor G when the slicer is mounted in tandem with the wrapping machine. A handwheel 18 adjacent the rear end of the machine controls the speed of operation of the machine. A handwheel 19 associated with a dial 20 may be adjusted to control the amount of wrapper web drawn out from the drape table prior to the web cutoff to vary the length of the end of the web depending from the upper end of the drape table C and vary the amount of underlap of the paper at the bottom of the article being wrapped. A handwheel 21 associated with a dial 22 may be adjusted to control the tightness with which the paper is wrapped about an article. Heater control elements 23 are mounted on the top portion of the frame forwardly of the tight-loose wrap control. Adjacent the rear end of the machine a handwheel 24 is provided which operates adjusting screws for adjusting the width of the discharge channel of the machine and simultaneously adjusting other parts of the machine for accommodating articles of different widths.

The feed conveyor A is provided with a transversely flat bed 25 over which the articles to be wrapped are pushed by flights 26 which are carried by endless sprocket chains 27 that run over pairs of sprockets 28 and 29 at the delivery and receiving ends of the bed 25. The pairs of sprockets 28 and 29 are preferably mounted in fixed positions and the chains 27 are tensioned by means of adjustable sprockets 30 below the sprockets 29 at the forward end of the frame.

The conveyor A is driven intermittently and the chains 27 are moved a distance corresponding to the space between successive flights 26 on each actuation, the driving mechanism being so adjusted that the conveyor stops with a flight 26 in substantially vertical position at the discharge end of the conveyor, in which position the article being pushed by the flight at the discharge end of the conveyor has been transferred from the bed 25 to the elevator B, and the flight 26 at the discharge end of the conveyor remain stationary during the initial upward movement of the elevator and does not interfere with the movement of the article with the elevator.

*The main driving mechanism (Figs. 1 and 5)*

The rear end of the frame 1 preferably provides side and end walls housing the mechanism associated with the motor 2 and cam shaft 3. The motor 2 drives the machine through a suitable change speed mechanism so that the speed of the machine may be changed at will without changing the relative timing of the various operations. As herein shown, the change speed mechanism is of the Reeves type in which the speed ratio is adjusted by shifting the motor bodily with respect to a fixed pulley.

The motor 2 is mounted upon the top of a frame 31 that is supported to swing transversely of the machine on a longitudinally extending horizontal pivot pin 32 mounted on the base of the frame. The motor 2 drives a fixed pulley 33 through a V-belt 34 that runs between two yieldingly mounted cone pulleys 35 on the motor shaft. Adjustment of the motor 2 away from the pulley 33 causes the belt 34 to crowd the pulleys 35 apart so that the belt is driven by portions of the pulleys of smaller radius, and the speed of the belt 34 is correspondingly reduced. The frame 31 is adjusted by means of a horizontally disposed screw 36 mounted in the front wall of the frame 1 and having the handwheel 18 attached to its outer end. The frame 31 carries a pointer 37 which moves over a horizontally disposed graduated scale 38 which is visible through a slot in the rear wall of the frame to indicate the position of the motor 2 with respect to the pulley 33 and thereby indicates the speed ratio between the motor shaft and the driven pulley 33. The pulley 33 drives a transversely disposed shaft 39 through suitable reducing gears in a housing 40 and through a suitable overload release mechanism in a housing 40a. The shaft 39 drives the shafts 3 and 4 through the sprocket chain 5 that runs over sprockets 41, 42 and 43 on the shafts 3, 4 and 39.

*The feed conveyor drive mechanism (Figs. 6 to 9)*

The infeed conveyor A is intermittently driven from the shaft 4 through a Geneva type gearing which includes a drive wheel 44 fixed to the shaft 4 and having two driving pins in the form of rollers 45 which are diametrically opposite each other and at equal distances from the axis of the shaft 4. The rollers 45 engage in radial slots 46 in a Geneva gear 47 to which is attached a spur gear 48 which meshes with a gear 49 on the shaft of the sprockets 28. The gear 47 is provided with four radial slots 46 and is given a quarter turn upon each half revolution of the shaft 4. The gear 47 is provided with peripheral recesses 50 intermediate the slots 46 which are of arcuate contour to receive cylindrical locking segments 51 carried by the drive wheel 44 to lock the gear 47 against turning movements during intervals between actuations thereof by the pins 45.

The sprocket 42 on the shaft 4 is twice the diameter of the sprocket 41 on the shaft 3 so that the shaft 4 rotates at half the speed of the shaft 3. The shaft 3 rotates once during each cycle of operation of the machine and the shaft 4 makes a one-half revolution during each cycle of operation.

The gears 48 and 49 are so proportioned that a movement is imparted to the infeed conveyor A to move the flights a distance exactly equal to the length of the space between them upon each actuation of the conveyor, and the infeed conveyor has one movement during each wrapping cycle to deliver an article to the elevator B each time that the elevator is lowered to a position in alinement with the conveyor.

In order to regulate the position at which the conveyor flights stop adjacent the elevator during the dwell of the conveyor, a suitable adjustment is provided in the driving mechanism such as an adjustable connection between the gears 47 and 48. As herein shown, the gear 48 is attached to the gear 47 by bolts 52 extending through arcuate slots 53 in the gear 48 so that the gear 48 may be angularly adjusted to advance or retard the conveyor flight. The gearing above described connecting the drive shaft 4 with the conveyor A is enclosed in a suitable housing 54 which may be filled with oil to lubricate the gearing.

Since the wrapping machine includes heating elements engaging the wrapped package to seal the overlapping ends of the waxed paper or cellophane wrapper it is desirable that the feed mechanism be so controlled that it can be stopped independently of the wrapping mechanism, so that the wrapping of articles fed into the wrapping mechanism may be completed and the wrapped articles be discharged from the machine after the feed of articles to the wrapping mechanism has been discontinued.

Since the feed conveyor is intermittently operated in timed relation to the wrapping mechanism, it is desirable that the means for starting and stopping the feed conveyor be so designed that when the feed conveyor is restarted it will operate in time with the elevator and other parts of the wrapping mechanism. To this end a clutch is provided for connecting or disconnecting the Geneva gearing to the drive shaft 4, which will insure the operation of the conveyor in proper timed relation to the cams on the shaft 3 which control movements of the elevator and other wrapping elements.

The sprocket 42 is rotatably mounted on the shaft 4 and drives the shaft 4 through a clutch mechanism which includes a ratchet 55 attached to the sprocket 42 and provided with two diametrically opposed teeth 56. An arm 57 attached to the shaft 4 carries a spring pressed pawl 58 which engages with the ratchet 55. The engaging end of the pawl 58 presses against the periphery of the ratchet 55 for driving engagement with either of the teeth 56. The pawl 58 has a roller 59 adjacent the engaging end thereof which is engageable with a forked cam 60 that is movable into and out of the path of the roller. The cam 60 is connected to the inner wall of the housing 54 by pivot pins 61 which are coaxial and disposed at right angles to the shaft 4. The cam 60 has a pair of arms 62 that straddle the shaft 4 and these arms have inclined cam faces 63 and 64 with which the roller 59 can engage when the cam 60 is swung into engagement with the outer face of the ratchet 55.

The sprocket 42 and ratchet 55 rotate in a clockwise direction as viewed in Figs. 6 and 9, and normally drive the shaft 4 in the same direction when the pawl 58 is in engagement with one of the two diametrically opposite teeth 56. The inclined faces 63 and 64 of the cam 60 are inclined in the same direction and either serves to cam the pawl 58 out of ratchet engaging position and to hold the same out of engagement with the ratchet as long as the cam 60 remains alongside the face of the ratchet 55. When the cam 60 is swung outwardly away from the face of the ratchet 55 the pawl 58 is released and engages the periphery of the ratchet 55 which guides the pawl into engagement with one or the other of the shoulders 56. The shoulders 56, being diametrically opposed, the timing of the feed conveyor with respect to the cam shaft 3 is the same regardless of which shoulder is engaged by the pawl.

The cam 60, which normally hangs in a substantially vertical position, has a roller 65 above its pivot that is in the path of an actuating bar 66 which is slidably mounted on the housing 54 and which is actuated by the hand lever 17. The bar 66 has a tapered end 66a which cams the roller 65 inwardly away from the face of the inner wall of the housing 54 and moves the lower end of the cam 60 outwardly away from the outer face of the ratchet 55 and out of the path of the roller 59, to permit the cam 60 to move to its normal position so that the shaft 4 is clutched to the sprocket 42 and driven through the Geneva gearing in the housing 54. The bar 66 may be made in two sections and provided with an adjustable connection 66b by means of which the tapered end 66a may be adjusted with respect to the roller 65.

It is desirable that the conveyor mechanism be adjustable not only to advance or retard the stopping position of the flights, but also to provide small changes in the timing of the operating and dwell periods with respect to movements of other parts of the machine. The timing of the conveyor may be adjusted by a relative adjustment of the shaft 4 that is geared to the conveyor and the sprocket 42 that is geared to the cam shaft 3. As herein shown, the sprocket 42 is adjustably attached to the ratchet 55 by means of bolts 67 that pass through arcuate slots 68 in the ratchet 55 and timing adjustments are made by angularly adjusting the position of the ratchet with respect to the sprocket 42.

*The feed conveyor (Figs. 1, 10 and 14)*

As shown in Fig. 14, the flight carrying chains 27 are guided along their upper run between upper and lower longitudinal bars 69 and 70 that are disposed parallel to the bed plate 25. In order to insure proper feed of articles to the wrapping mechanism, the pusher flights 26 are in the form of relatively high central portions of transverse bars 71 connected to the chains 27, and overlying the end portions of the bars 71 are flat top guide rails 72 which are mounted for adjustment laterally toward and away from the central flights 26.

As shown in Fig. 13, the upper ends of the guide rails 72 are detachably secured to nuts 73 that are carried by a transverse screw shaft 74. As shown in Fig. 14, the lower ends of the rails 72 are detachably secured to curved arms 75 that are attached to nuts 76 which are carried by a transverse screw shaft 77. The screw shafts 74 and 77 are journaled in the sides of the machine frame and each has a right and left-hand screw for simultaneously adjusting the guide rails toward and away from the center line of the conveyor. The handwheel 24 drives the shaft 77 and the shaft 74 through a sprocket chain 78 (see Fig. 4).

The bed 25 of the conveyor A is supported at intervals by crossbars 79 and may be provided with openings 80 through which loose material such as crumbs may pass. The forward receiving end of the conveyor is substantially horizontal and the horizontal forward portion of the bed 25 terminates between the sprockets 29 where it is supported on blocks 81 on a cross shaft 82 upon which the sprockets 29 are mounted. The tightening sprockets 30 are carried by arms 83 connected to move together and pivoted to the shaft 82. The arms 83 are secured in adjusted positions to the frame 1 by bolts 84 which extend through arcuate slots 85 in one of the arms 83. The arms 83 carry guide shoes 86 that engage with the conveyor chains to hold them straight between the sprockets 29 and 30. As shown in Fig. 15, the bar 71 is provided with recesses 87 in its front face adjacent the ends of the pusher flights 26 to accommodate article retaining fingers carried by the elevator, as will be hereinafter explained.

*The shuttle mechanism (Figs. 10–13)*

The conveyor G is of the endless flight pusher type and has a bed 88 over which the sliced loaves are pushed by flights 89 extending transversely between endless sprocket chains 90. At the discharge end of the conveyor G the chains 90 run over sprockets 91 and the bed 88 extends into the space between the sprockets 91 substantially to the point where the flights 89 begin their downward movement. The sliced loaves are transferred one at a time from the continuously moving conveyor G to the intermittently driven infeed conveyor A by means of a shuttle plate 92 that is mounted for horizontal movement from a position in which its forward end is substantially beneath the bed 88, to a position in which it is entirely over the bed 25 of the conveyor A. The plate 92 has a short flange 93 at its forward end which serves to prevent the plate from being pulled out from under the loaf or other article being transferred to the feed conveyor, and may be provided with spaced holes 94 through which crumbs may drop.

The shuttle plate 92 is somewhat wider than the forward end portion of the bed 25 and has longitudinal slots 95 at its side edges which receive bolts 96 which attach it to bars 97 that slide in horizontal guides 98 at the front and back that are attached to the shaft 82 and to the frame 1. By means of the bolt and slot connection the plate 92 may be adjusted on the bars 97 to provide the desired forward dwell position of the plate 92 and to provide the desired clearance between the plate 92 and flights 89 during the article transferring operation. The shuttle plate 92 is reciprocated in timed relation to the operation of the conveyors A and G by means of actuating levers 99 attached at their lower ends to a horizontal cross shaft 100 journaled in the machine frame and connected at their upper ends to the forward ends of the bars 97 by means of links 101. One of the levers 99 has a rearwardly projecting arm 102 carrying a roller 103 that is received in the groove of an operating cam 104 that is attached to the shaft 6. The cam 104 is so formed that the shuttle plate 92 is moved forwardly to a position immediately adjacent the delivery end of the bed 88 of the conveyor G as shown in Fig. 10 during the dwell of the conveyor A and just before the loaf or other article to be transferred reaches the end of the bed 88. When the loaf is completely transferred from the bed 88 to the plate 92 as shown in Fig. 10, the shuttle plate begins its rearward movement at a speed sufficient to move out of the path of the adjacent flight 89 as shown in Fig. 11 of the drawings. The plate 92 completes its transfer movement before the conveyor A moves sufficiently to bring a flight into engagement with the transferred loaf, and begins its return movement after the loaf has been pushed off the plate 92 onto the bed 25. The shaft 6 makes two revolutions during one revolution of the shaft 4 so that the movement of the shuttle plate 92 is timed with respect to the movement of the flights 26, and the conveyor G is driven at a speed such that the movement of its flights 89 is timed with respect to the movements of the shuttle plate, the flights 89 being advanced a distance corresponding to their spacing during each reciprocation of the shuttle plate.

In the forward position of the shuttle plate 92 the flange 93 underlies the bed plate 88 so that there is no gap between the bed and plate and delivery of the article onto the shuttle plate ahead of the flange 93 is insured. The initial speed of movement of the shuttle plate is such that the forward edge thereof is moved out of the path of the adjacent flight 89 before the flight 89 crosses the path of the shuttle plate so that there can be no pinching of the article between the flight and shuttle plate.

The shuttle mechanism is claimed per se in my copending application Serial No. 273,943, filed February 28, 1952, upon which Patent No. 2,676,690 was granted April 27, 1954.

*Elevator (Figs. 16 to 23)*

The sliced loaves of bread or other articles to be wrapped are delivered from the feed conveyor A to a platform 105 on the elevator B, the platform 105 being attached to the forward ends of elongated supporting arms 106 that are connected at their rear ends by pivots 107 to the rocker arms 14 which provide a movable support to which the elevator is pivoted. The arms 106 are connected to the upper ends of the rocker arms 14 and the lower ends of the arms 14 are attached to a horizontal rock shaft 108 journaled in the side members of the frame. During operation of the machine the elevator platform moves from a lower inclined position in alinement with the bed 25 of the infeed conveyor to an upper horizontal position in alinement with the discharge runway. The elevator dwells in its lowermost position until an article is transferred thereto by the infeed conveyor, and moves upwardly during the dwell of the infeed conveyor to deliver the loaf to the discharge runway. The elevator has intermittent oscillating movement timed with respect to the movement of the infeed conveyor flights 26 so that the elevator is positioned to receive articles pushed by the flights 26 upon each advancing movement of the feed conveyor.

During the upward movement of the elevator the arms 14 are rocked rearwardly to cause the forward end of the elevator on which the article being wrapped is supported to be moved away from the infeed conveyor flight and away from the end of the drape table C so that tension is maintained on the wrapper web and engagement of articles being wrapped with parts of the paper supporting members and with the discharge runway is prevented. Springs 109 attached at their rear ends to the rocker arms 14 and at their forward ends to the frame of the machine serve to yieldably urge the elevator toward its forward position.

The machine frame has a horizontal crossbar 110 at the rear end thereof upon which is mounted a bearing bracket 111 which is located substantially midway between the ends of the bar 110. The bracket 111 supports a pivot 112 upon which is mounted a lever 113 which extends forwardly from the pivot 112. The forward end of the lever 113 is pivotally connected to the lower ends of upwardly diverging links 114, and the upper ends of the links 114 are pivotally connected to a horizontal cross rod 115 connecting the elevator arms 106.

An actuating cam 116 fixed to the cam shaft 3 receives a roller 117 attached to the lever 113, the cam 116 being provided with a groove 118 in which the roller 117 travels. The cam groove 118 is formed to oscillate the elevator with an appropriate dwell at its upper and lower limits of movement.

Between the bracket 111 and the back of the machine frame there is mounted a bearing bracket 119 in which the lower end of an elevator retracting lever 120 is pivoted. The lever 120 carries a roller 121 that bears upon the periphery of a cam 122 attached to the shaft 3, and a spring 123 acting on the lever 120 holds the roller 121 in engagement with the cam 122. The lever 120 has a roller 124 at its upper end which engages with an arm 125 attached to the rock shaft 108.

The elevator retracting mechanism is positively actuated by the lever 120 to move the elevator rearwardly, but the elevator is moved forwardly by the springs 109 which normally press the arm 125 against the roller 124 but which permit separation of the roller 124 and arm 125 when the forward movement of the elevator is impeded. The springs 109 also yieldingly press the elevator toward the discharge runway during discharge of articles to the runway to maintain yielding engagement between rigidly mounted web feed rollers on the elevator and the discharge runway as will be hereinafter more fully explained.

In order to properly position the elevator in its loading and unloading positions, the arm 125 is provided as shown in Fig. 19 with an adjustable abutment in the form of a screw 126 which is engaged by the roller 124. By means of the adjustable abutment 126 the position of the platform 105 when alined with the feed conveyor bed 25 may be regulated and sufficient lost motion may be provided between the arm 125 and lever 120 to provide yielding pressure for the web feed rollers.

In order to enable the elevator platform to be leveled and to provide accurate alinement of the elevator platform 105 with the infeed conveyor and the discharge runway in the dwell positions of the elevator, the elevator supporting links 114 are adjustably connected to the elevator so that either end of the elevator platform can be raised or lowered slightly with respect to the supporting links. As best shown in Figs. 23 and 24, the links 114 are adjustably connected at their upper ends to collars 127 that turn on the cross rod 115. Each collar 127 has an integral arm 128 to which the upper end of a link 114 is attached by means of bolts 129 which extend through vertical slots 130 in the arm 128. The adjustment of the links 114 with respect to the collars 127 is effected by means of screws 131 each of which is threaded in a projection 132 on the link 114 that underlies the lower end of the arm 128. The screws engage with the lower ends of the arms 128 to adjust the same vertically when the bolts 129 are loosened and are held in adjusted positions by lock nuts 133.

As shown in Fig. 16, the drape table C is provided with a pair of web guiding rollers 134 and 135 at the rear end thereof. The leading end of the web is fed over the lower roller 134 to a position where it hangs across the upper end of the bed 25 of the infeed conveyor while the elevator is in its uppermost position, so that the end of the wrapping paper strip will hang in the space between the elevator platform and bed 25 of the infeed conveyor when the elevator platform is returned to its lowermost position. As the infeed conveyor moves the article to be wrapped across the gap between the bed 25 and the platform 105 the article is pushed into the depending end of the wrapper web and the portion of the web depending below the elevator platform is drawn onto the platform between the bottom of the article and the surface of the platform.

In order to clamp the leading end of the web to the article being wrapped, a follower 136 is provided on the elevator platform which is mounted to move forwardly and rearwardly on the platform. The forward article engaging end of the follower 136 extends transversely across the elevator platform and slides rearwardly on the platform as an article is pushed onto the platform by a flight 26. The follower has a rearwardly extending guide bar 137 that is slidably mounted in a guide 138 mounted on a rearwardly extending centrally disposed bracket 139 attached to the platform 105. It is desirable that the follower be so mounted that it will stay in any position to which it has been moved, and to this end an adjustable friction shoe 140 may be provided on the guide 138 to engage the bar 137 and offer a slight resistance to movement thereof. As herein shown the shoe 140 is mounted on a spring arm 141 and is pressed against the bar 137 by a thumb nut 142.

For some articles being wrapped a hold-down is desirable and means is provided for detachably mounting a hold-down in the guide 138. An upwardly facing socket member 143 is attached to the guide 138 and is adapted to receive a post 144 which may be secured to the socket member by means of a set screw 145. A hold-down plate 146 of conventional form may be secured at the desired position of vertical adjustment on the post 144 by means of a thumb screw 147. The engagement of the clamping follower 136 with the portion of the web extending over the rear side of the article being wrapped serves to clamp the web and permit a pull to be exerted on the web without causing the web to slip with respect to the article. The web feed mechanism is of the tension controlled type so that a slight pull on the wrapper web causes the feed mechanism to operate, supplying the length of web required for wrapping the article without the exertion of objectionable tension on the web during the wrapping operation.

Tuckers (Figs. 16 to 20)

As the article to be wrapped is transferred to the elevator platform from the bed 25 the wrapper web is folded against the ends of the article by means of tucker plates 148 which engage with the opposite edge portions of the web to fold the web over the ends of the article during movement of the article onto the elevator. The tucker plates 148 are mounted for lateral swinging movements and are so operated that they close upon the ends of the article being wrapped during movement of the article onto the elevator. In order to accommodate articles of different heights the plates 148 are detachable so that they can be replaced with wider or narrower plates. The tucker plates 148 are detachably secured at their rear ends to standards 149 that are bolted to the forward ends of arms 150 that are connected to swing on pivots 151 that are disposed at right angles to the plane of the elevator platform. The pivots 151 are mounted on slides 152 that are supported on a horizontal cross rod 153 and which have integral arms 154 extending downwardly and forwardly to the cross rod 115 upon which they slide, the arms 154 serving to hold the slides 152 against rocking movements on the cross rod 153. The slides 152 are provided with vertical slots 156 which are elongated horizontally in a direction at right angles to the rod 153 and which receive vertical bars 157 that are rigidly attached at their upper ends to adjustable side rails 158 that support the side members of the discharge runway. The side rails of the discharge runway, like the guide rails of the infeed conveyor, are mounted for adjustment toward and away from the median plane of the machine to accommodate articles of various widths, and the vertically sliding connection between the horizontally movable slides 152 on the elevator and the vertical bars 157 causes lateral adjustment of the tuckers with the side rails 158.

As best shown in Fig. 20, the arms 150 extend rearwardly past the pivots 151 and their rear ends extend inwardly from the pivots 151 toward the center plane of the machine and carry rollers 159 that bear against a transverse bar 160 attached to the upper ends of rocker arms 161 that are connected by pivots 162 to the elevator carrying arms 106. One of the arms 161 is part of a lever 163 that carries a roller 164 that is engaged by the periphery of a cam 165 on the shaft 3 to spread the tucker plates 148 to receive an article between them. Springs 166 interposed between the slides 152 and the arms 150 act to normally swing the arms toward one another and these springs serve to press the rollers 159 against the cross bar 160. The actuation of the tuckers in an outward direction is positive while the movement toward the article being wrapped is due to the action of the springs 166 so that the article cannot be subjected to excessive clamping pressure.

As best shown in Fig. 22, the arms 150 are normally held by the springs 166 against adjustable stops in the form of screws 167 and the springs 166 are backed by screws 168 which may be adjusted to vary the tension of the springs 166.

The limits of inward movement of the arms 150 may be independently adjusted by adjusting the screw stops 167.

The rearward movement of the actuating bar 160 is limited by an adjustable stop in the form of a screw 169 mounted in a lateral extension 170 of the lever 163 that overlies one of the platform supporting arms 106. The stops 167 and 169 are preferably so adjusted that the rollers 159 are maintained in engagement with the bar 160 and the arms 150 are held by the bar 160 in positions close to but out of contact with the stops 167 which serve as safety stops which function if the stop 169 is out of adjustment.

In order to vary the extent of outward movement of the tucker plates and to maintain proper engagement of both rollers 159 for various adjustments of the stops 167, each of the rollers 159 is mounted on its arm 150 for adjustment toward or away from the bar 160. Each of the rollers 159 is mounted on a bolt 171 that extends through an arm 150 and that is held in place by nuts 172 and 173 at its opposite ends. The nut 173 is provided with a cylindrical bearing portion 174 to receive a roller 159 and with a head portion 175 to retain the roller. The bearing portion 174 is eccentric with respect to its bolt receiving opening and may be adjusted angularly when the nut 172 is loosened to advance or retract the roller 159 with respect to the bar 160.

*Article retainer (Figs. 16 to 26)*

As best shown in Fig. 20, a pair of spaced web engaging rollers 176 are detachably mounted in brackets 177 carried by the elevator platform 105 beneath its forward edge. A shear bar 178 attached to the platform 105 underlies both rollers 176 and is provided with a slot 179 that alines with the space between the rollers 176. Centrally of the elevator platform between the rollers 159 there is mounted a retractable article retainer that extends through the slot 179 and that has a portion that is adapted to be positioned above the forward edge of the platform 105 in front of an article on the platform. As herein shown the retainer has spaced forwardly extending arms 181 provided with upwardly extending article retaining fingers 182 which are positioned in front of an article on the platform to retain it on the elevator during upward movement of the elevator. The retainer 180 is provided with axially alined trunnions 183 that slide in channels 184 in brackets 185 attached to the under side of the elevator platform 105. The retainer 180 has a centrally disposed rearwardly projecting arm 186 that is operably connected to a transverse rock shaft 187 mounted on brackets 188 and 189 attached to the under side of the platform 105. The arm 186 is pivotally connected to the upper end of an arm 190 that is mounted for turning movement on the rock shaft 187. At the end thereof adjacent the front of the machine the shaft 187 has a crank arm 191 that is connected to a lever 192 that is pivotally supported intermediate its ends on the lower end of a link 193 that is pivoted at its upper end to the cross rod 115 to which the elevator lifting links 114 are connected. The link 193 is connected to the lever 192 by a pivot 194 and the free end of the lever 192 carries a roller 195 that is positioned to engage with a segment cam 196 when the elevator is in its lowermost position. The pivot 194 carries a roller 197 that engages with a trip plate 198 (see Figs. 16 and 18) attached to the front side member of the frame 1 and positioned to engage with the roller 197 as the elevator approaches its uppermost position.

The engagement of the segment cam 196 with the roller 195 when the elevator is in alinement with the feed conveyor causes the arm 190 to be rocked forwardly, moving the trunnions 183 forwardly in the guide channels 184 to advance the retaining fingers 182 beyond the forward end of the elevator platform and rock the forward end of the retainer 180 upwardly to position the fingers 182 in front of the article that has been pushed onto the elevator by the conveyor flight 26. When the roller 197 strikes the trip plate 198 the arm 190 is swung rearwardly, rocking the retaining fingers downwardly to a position below the elevator platform and sliding the trunnions 183 rearwardly in the channels 184 to bring the retainer entirely beneath the elevator paltform.

It is desirable that the retraction of the retaining fingers be positive in order to insure release of the article in the uppermost position of the elevator. It is also desirable that the mechanism moving the retaining fingers into their retaining position be yieldable so that the mechanism will not be damaged if the movement of the retaining fingers to locking position is impeded, for example, by an improper adjustment of the elevator with respect to the conveyor flights.

The arm 190 is actuated by a disk 199 fixed to the rock shaft 187 (see Figs. 25 and 26). The disk has a laterally projecting pin 200 which projects in front of the arm 190 to provide positive actuation of the arm in a rearward direction to retract the retaining fingers. The supporting bracket 188 carries a spring pressed ball detent 201 that is engageable with either one of two angularly spaced recesses 202 and 203 in the adjacent face of the disk 199. The detent 201 engages in the recess 202 when the retainer is in article engaging position and with the recess 203 when the retainer is in retracted position. The detent 201 and recesses 202 and 203 provide yieldable locking means for holding the retainer in adjusted position during vertical movements of the elevator while the rollers 195 and 197 are out of engagement with the segment cam 196 and trip plate 198.

The arm 190 carries a spring pressed ball detent 204 that is engageable in a recess 205 in the disk 199 to normally cause the arm 190 to move forwardly with the disk 199 to move the retainer to article engaging position. If, however, there is resistance to movement of the retainer to article engaging position such as might be caused by engagement of the fingers 182 with the conveyor flight, the detent 204 will yield and allow the disk to move independently of the arm 190.

It is desirable that the infeed conveyor drive be so adjusted that each flight 26 will stop in a position in which the article to be wrapped rests entirely upon the elevator platform. The flights in this position would normally be in the path of the retaining fingers 182 but the fingers are received in the recesses 87 in the bars 71 at the lower portion of their front faces which are of a width and depth to permit entry of the article retaining fingers therein when the retainer is actuated. It is also desirable that the retainer be positively locked in its retracted position during the downward movement of the elevator so that it will be impossible for the retaining fingers to be accidentally moved to a position where they would block the entry of an article onto the conveyor platform. To this end the arm 190 is provided with a rearwardly extending projection 206 which is substantially parallel with the elevator platform, when the retainer 180 is retracted.

The guide bar 137 of the article clamping follower 136 has a downwardly projecting stop member 207 attached to the under side thereof. The stop member 207 has a forwardly extending flange 208 which is parallel to the elevator platform and which directly overlies the projection 206 when the follower is in its forward position. Upon discharge of the article from the elevator onto the discharge runway, the follower 136 is moved to its forward position and remains in this position until it is again moved rearwardly by an article pushed onto the elevator platform. The member 207 provides a positive lock which prevents actuation of the retainer during the lowering movement of the elevator and until the follower 136 is moved rearwardly by an article pushed onto the elevator the flange 208 making the lock effective even though the forward position of the follower may not always be the same.

If there should be a skip in the delivery of articles by the feed conveyor to the elevator, the follower 136 will remain in its forward position locking the retainer against movement and actuation of the lever 192 by the cam 196 will cause the detent 204 to slip, thereby permitting the actuation of the lever 192 by the cam without causing actuation of the retainer. The article retainer is claimed per se in the copending application of Paul C. Bauer, Serial No. 189,847, filed October 12, 1950, upon which Patent No. 2,676,692 was granted April 27, 1954.

*Web cut off mechanism*
*(Figs. 18 and 26 to 29)*

As shown in Fig. 18, the elevator platform 105 is alined with the discharge runway D when the elevator is in its uppermost position, and the article on the elevator is moved from the elevator platform onto the discharge runway by means of the endless conveyor M which has pusher plates 210 carried by arms 211 that are suspended from endless sprocket chains 212 mounted above and parallel to the discharge runway. The sprocket chains 212 run over rear sprockets 213 that are positioned directly above the elevator, the sprockets 213 being attached to a horizontal cross shaft 214 that is driven from the cam shaft 3 by the sprocket chain 8. The endless pusher conveyor M above the discharge runway is thus continuously driven during the operation of the machine and the movement of the pushers is timed with respect to the operation of the elevator so as to discharge each article from the elevator to the discharge runway during the dwell of the elevator in its uppermost position.

At the end of the discharge runway, immediately adjacent the elevator, a paper feed roller 215 is provided against which the rollers 176 on the elevator are pressed by the springs 109 and which may be driven during a portion of the movement of the article from the elevator to the discharge runway to regulate the tightness of the wrapper. The abutment screw 126 is adjusted to allow a forward movement of the elevator slightly greater than that required to permit the rollers 176 to engage the roller 215. As the elevator approaches its uppermost position it is cammed rearwardly by the engagement of the rollers 176 with the roller 215 and during the dwell of the elevator in its uppermost position, the springs 109 yieldingly press the idler rollers 176 against the roller 215 so that the wrapper web can be advanced by rotation of the roller 215.

During the transfer of the article to be wrapped from the feed conveyor to the elevator platform and during upward movement of the elevator, a tension is exerted upon the wrapper web, which after the slack is taken up starts the web feed mechanism to feed the web to the wrapping mechanism and relieve the tension on the web.

During the upward movement of the elevator the web is pulled over the top of the article while the paper is guided by the upper guide roller 135 at the delivery end of the drape table C. While the article is being transferred from the elevator platform to the discharge runway, the paper web is severed below the roller 215 and the free end of the severed wrapper is folded against the bottom of the article during passage of the article over the roller 215.

The paper cut off mechanism includes the shear bar 178 fixed to the under side of the elevator platform against which the rear face of the paper web engages when the elevator is moved to its uppermost position, and a rearwardly movable knife blade 216 that engages with the front face of the paper web moves across the top edge of the bar 178 to sever the web. The blade 216 is carried at the upper ends of a pair of swinging arms 217 pivoted to the machine frame. A heater 218 and drip trough 219 may be attached to the bed of the discharge runway and positioned so that the heater is over the trough and beneath the blade 216 when the blade is in retracted position to melt any wax sticking to the blade, the trough 219 serving to catch any melted wax dripping from the blade.

As shown in Fig. 27 the cutter blade 216 is actuated to sever the web by a segment cam 220 that is attached to the rear face of the elevator cam 116. A lever 221 pivoted to the bearing bracket 119 on the frame cross bar 110 (Fig. 5) has an arm 222 carrying a roller 223 that is engaged by the cam 220 during a portion of the revolution of the cam shaft 3. The lever 221 has a second arm 224 which actuates the blade 216 through a connecting rod 225. A spring 226 connected to the lever arm 222 and to the frame of the machine exerts a thrust on the rod 225 to move the blade forwardly and forward movement of the blade is limited by a fixed rubber snubbing block 227. The rod 225 is extensible to vary the throw of the blade 216, the rod having sections joined by an adjustable threaded joint 228.

In order to enable the blade 216 to have effective cutting action, means is provided for automatically clamping the web to the drape table C during the cutting operation. The web clamping device comprises a transversely extending shoe or pad 229 carried by a longitudinally extending arm 230 mounted on a transverse shaft 231 journaled in brackets 232 attached to opposite sides of the drape table C. One of the blade supporting arms 217 is connected to the shaft 231 to impart an oscillating movement thereto as the blade 216 is reciprocated by means of a connecting rod 233 acting on an arm 234 attached to the shaft 231. In order to permit satisfactory operation of the web clamp by the movable knife in various positions of vertical adjustment of the drape table, yielding connections are provided between the rod 233 and arm 234 and between the shaft 231 and the clamp arm 230.

The rod 233 slidably fits in a pivot block 235 rotatably mounted in the arm 234 and has a stop nut 236 at its forward end that engages with the block 235 during the rearward cutting stroke of the blade to turn the shaft 231 in a direction to apply the clamp. A coil spring 237 on the rod 233 and interposed between the pivot block 235 and a stop collar 238 adjustably mounted on the rod 233 applies pressure to the arm 234 to release the clamp when the knife 216 is moved to its forward position.

The clamping arm 230 is moved to clamping position and clamping pressure is applied thereto by means of an arm 239 fixed to the shaft 231 overlying the arm 230. An arcuate tie rod 240 connects the arms 230 and 239 and the relative angular movement of the arms is limited by a nut 241 on the rod 240. Downward clamping pressure is applied to the arm 230 through a coil spring 242 on the rod 240. The spring 242 permits considerable variation in the angular movement of the shaft 231 in applying clamping pressure and the yielding connection between the rod 233 and arm 234 maintains an operating connection between the cutter and clamp in the various positions of vertical adjustment of the table.

Because of the close clearance between the forward edge of the elevator and the drape table it has been found to be advantageous to clamp the wrapper web during the lowering movement of the elevator so as to prevent operation of the web feed mechanism L by tension applied to the paper by the descending elevator. When relatively stiff wrapping material such as heavy wax paper is employed the suspended end of the web is apt to project into the path of the shear bar 178 which may exert enough pull on the web to start the feed mechanism. To prevent this undesired web feeding, a second segment cam 243 is attached to the cam 116 in a position to engage the roller 223 while the elevator is moving downwardly past the rear end of the drape table. The cam 243 imparts a rearward movement to the arms 217 sufficient to actuate the web clamp but not sufficient to cause the blade 216 to engage with any part of the downwardly moving elevator.

In order to insure smooth and quiet operation of the clamping mechanism in various positions of adjustment of the drape table C, means is provided for adjustably connecting the arm 234 to the shaft 231 and an adjustable stop is provided for limiting the turning movement of the shaft in a direction to lift the clamp. The adjustment of the arm 234 is effected by means of two alined screws 244 and 245 which are threaded in parallel flanges 246 and 247 on a collar 248 that is fixed to the shaft 231. The flanges 246 and 247 straddle a pin 249 projecting centrally from the arm 234 and the screws 244 and 245 engage opposite sides of the pin 249. The arm 234 which is pivoted on the shaft 231 may be adjusted angularly by adjusting the screws 244 and 245.

The rearward swinging movement of the shaft 231 is limited by a stop screw 250 threaded in a laterally projecting flange 251 on the arm 234 and engaging with the top edge of the adjacent bracket 232.

*Underlap control mechanism (Figs. 30 to 33)*

In order to feed enough of the wrapper web past the drape table C prior to severance of the web to cause the leading end of the web to be draped across the upper end of the bed 25 of the feed conveyor and to regulate the feed to cause the web to extend below the bed the distance required to provide the desired underlap beneath the article when the web is clamped thereto on the elevator, means is provided for automatically causing the desired length of paper to be fed past the upper end of the drape table prior to severing the web. The web feed is controlled to supply the drape by means of a tension applying roller 254 that is supported in horizontal position between the upper ends of two curved arms 255 which are positioned immediately within the side members of the machine frame 1 in the space between the side members and the conveyor A, elevator B and drape table C. The roller 254 is normally supported forwardly of the rear edge of the discharge runway so as to be clear of the paper web when it is drawn upwardly to the position shown in full lines in Fig. 30. The lower ends of the arms 255 are fixed to a transverse rock shaft 256 that is journaled in the side frame members. At the end thereof adjacent the front of the machine, the shaft 256 has a downwardly projecting arm 257 that is connected by a link 258 to an adjustable lever arm 259 that is slidably mountedd in a lever body 260 that is attached to a horizontal shaft 261.

As best shown in Figs. 32 and 33, the shaft 261 is rotatably mounted within a tubular shaft 262 that is journaled in a boss 263 in the front wall of the frame 1. The lever body 260 is provided with a guide portion 264 in which the extension 259 is slidably mounted, and the lever is oscillated once during each cycle of the machine by means of a cam 265 on the shaft 3 that has a groove 266 to receive a roller 267 mounted at the upper end of the lever 260. The lever extension 259 is provided with rack teeth 268 that engage with a pinion 269 that is attached to the tubular shaft 262. The cam 265 actuates the lever 260 to swing the arm 267 rearwardly and move the tension applying roller 254 rearwardly and downwardly prior to the severance of the web. The pull exerted by the roller 254 on the web actuates the tension sensitive control of the feed mechanism L to cause the web to be fed toward the wrapping mechanism to supply the length of web necessary to form the drape for the next article to be wrapped. The length of web so advanced is regulated by adjustment of the lever arm 259, which can be extended or retracted by means of the pinion 269 to increase or decrease the throw of the roller 254.

The underlap control handwheel 19 is attached to the outer end of the tubular shaft 262 and the graduated dial 20 is attached to the outer end of the shaft 261. Turning of the handwheel 19 with respect to the shaft 261 increases or decreases the throw of the drape pulling roller 254 to regulate the amount of underlap of the paper on the article being wrapped. The shaft 261 oscillates with the lever 260 once during each wrapping cycle and the shaft 262, pinion 269 and handwheel 19 are preferably connected to the shaft 261 to normally move with the shaft. This connection is provided by a gear 270 fixed to the shaft 261 and a spring detent 271 carried by the handwheel and engaging the recesses between the teeth of the gear 270. The detent 271 has a rounded point so that it will permit the handwheel 19 to be turned relative to the shaft 261 but will normally hold the handwheel against movement with respect to the shaft 261.

The handwheel 19 has a pointer 272 that indicates the position of the handwheel with respect to the graduated dial 20. The graduations on the dial 20 indicate units of adjustment which effect a predetermined variation in the length of the drape so that proper adjustments can be quickly and easily made for articles of various sizes.

The cam groove 266 is shaped to cause the drape regulating roller 254 to move to a dwell position where it is held while the web is clamped and then severed by the cutter blade 216 and to impart a slight additional rearward movement to the roller to cause the leading end of the web to be draped across the delivery end of the feed conveyor.

*Wrap tightening and loosening mechanism (Figs. 34 to 38)*

During the passage of the article from the elevator platform over the roller 215 onto the discharge runway the wrapper is drawn between the rollers 176 and 215 and is normally pulled quite tightly about the article. In wrapping soft articles such as sliced bread loaves, cakes or the like, it is desirable to provide a looser wrap. In order to relax tension on the wrapper and to cause the wrapper to more loosely engage the article a mechanism is provided by which the roller 215 may be turned in a direction to feed the wrapper web forwardly with the article during the transferring movement of the article from the elevator to the discharge runway. The roller 215 may be driven to feed the web during a portion of the movement of the article from the elevator, during the entire time of the transfer and if desired the feed may be started before the article begins to move off the elevator.

For intermittently imparting turning movements to the roller 215 a small gear 274 is attached to one end of the roller 215 and meshes with a large gear 275 that is rotatably mounted on a shaft 276 and attached to a ratchet 277 that is intermittently actuated in a counterclockwise direction as viewed in Fig. 37 by means of a spring pressed pawl 278 mounted on an oscillating arm 279 mounted on the shaft 276. The arm 279 is oscillated by a connecting rod 280 that is attached at its forward end to the arm 279 and at its rear end to a lever arm 281 attached to a rock shaft 282 journaled in a bracket 283 on the frame crossbar 110 at the rear end of the machine. The rock shaft 282 has a second lever arm 284 attached thereto and carrying a roller 285 that bears against the periphery of a cam 286 on the cam shaft 3, the roller 285 being held in engagement with the periphery of the cam by a spring 287 connected at its lower end to the arm 284 and anchored at its upper end to the rock shaft 108.

The movement of the article from the elevator platform 105 over the roller 215 tends to turn the roller in a clockwise direction as viewed in Fig. 35, and such rotation will turn the ratchet 277 in a counter-clockwise direction, which movement is not resisted by the pawl 278. Thus, if the ratchet is not positively actuated in the counter-clockwise direction by the pawl during the movement of the article from the elevator to the discharge runway, the article being wrapped will draw the wrapper web between the rollers 215 and 176 and the tension on the web may cause the main web feed mechanism to operate to advance the web somewhat prior to the cut off. In any event, the paper will be drawn quite tightly around the article. When it is desired to more loosely wrap the article, the ratchet 277 may be actuated during the portion of the movement of the article by the cam 286 to positively drive the roller 215 and advance the wrapper web. For a loose wrap the rotation of the roller 215 by the ratchet mechanism starts before the transfer movement of the article being wrapped and before the web cut off in such manner that the excess paper is fed to the article and the wrapper and article are then moved simultaneously over the roller 215. Since the article is moved quite rapidly from the elevator to the discharge runway, it is desirable to retard rotation of the roller 215 in order to prevent its overrunning and to provide more positive control of the paper feed. The retarding effect is produced by means of a friction brake 288 which may be adjusted by means of a screw 289.

In order to provide the desired tightness or looseness in the wrap, means is provided for varying the extent of the positive turning movement imparted to the roller 215 during the transfer of the article from the elevator to the discharge runway. The pawl 278 is somewhat wider than the ratchet 277 and overlies the periphery of a guard disk 290 which has a segment 291 of slightly greater diameter than the ratchet 277 which provides a peripheral surface for holding the pawl 278 clear of the ratchet teeth. The disk 290 is angularly adjustable about the axis of the ratchet to change the position of the segment 291, so that the pawl 278 may be caused to ride on the segment 291 during a portion of its travel with the arm 279 or during its entire travel. The segment 291 of the guard disk can be positioned to hold the pawl out of ratchet engaging position when the arm 279 is in its rearmost or retracted position and may be adjusted to hold the ratchet out during as much of its forward stroke as desired. During the forward movement of the arm 279 the pawl rides off the end of the projecting portion 291 of the guard disk and engages a tooth of the ratchet imparting a turning movement to the ratchet during the final portion of the stroke of the arm 279. By adjusting the disk 290 the extent of angular movement imparted to the ratchet and to the roller 215 upon each stroke of the arm 279 may be varied. By increasing the turning movement of the ratchet during each cycle more of the wrapper web is advanced by the roller 215 and a looser wrap is produced, the looseness of the wrap being regulated by the adjustment of the guard disk 290.

If the guard disk is adjusted to a position to prevent actuation of the roller 215 by the cam 296, the rollers 176 and 215 will impose a drag on the wrapper due to the action of the brake 288 to tighten the wrap. By adjustment of the handwheel 21 the desired tightness or looseness may be obtained.

The shaft 276 on which the gear 275 and ratchet 277 are mounted projects through the front of the frame 1 and has a disk 293 rigidly attached thereto and engaging the outer face of the frame member 1. The disk 293 is fixed to the frame member 1 and has an arcuate slot 294 which receives a pin 295 that is attached to the handwheel 21. The pin 295 engages a socket member 296 attached to the disk 290 so that the disk 290 turns with the handwheel 21. The handwheel 21 has a pointer 297 that moves over the dial 22 to indicate the adjustment of the pawl guard 290 for tight, medium and loose wraps. The handwheel 21 is secured in adjusted positions by means of a lock nut 298 threaded on the outer end of the ratchet shaft 276. A washer 299 keyed to the shaft 276 is interposed between the lock nut and the handwheel 21.

The roller 215 is journaled in ball bearings 300 at the rear of the machine which are mounted in a removable block 301 which permits the roller to be withdrawn through the rear side of the frame.

In order to obtain accurate control of the web feed to obtain the desired tightness of wrap, the feed roller 215 is so actuated that it has a peripheral speed which substantially equals the linear speed of the article being wrapped during its passage over the roller. The pushers 210 are actuated in such manner as to move the articles off the elevator onto the discharge runway at a speed which is accelerated and decelerated during movement of the article over the roller 215, the cam 286 being shaped to move the ratchet arm 279 at speeds such that in every portion of the forward stroke in which it is connected to the roller 215 it will move the roller at the linear speed of an article passing over it and, since the stroke of the arm 279 is such that the article has passed over the roller 215 before the roller stops, there is substantially no slip between the wrapper web and the roller 215. As much excess wrapper web may be fed as desired before the article reaches the roller 215 and during passage of the article over the roller 215 the excess web is retained because of the fact that the portion of the web between the article and the roller does not slip with respect to the roller.

The web tightening and loosening mechanism is claimed per se in my co-pending application Serial No. 273,941, filed February 28, 1952.

Cam assembly (Figs. 5 and 39 to 41)

The cam shaft 3 is mounted adjacent the rear end of the frame 1 and is conveniently accessible from the rear end of the machine. The sprocket chain 5 driving the shaft 3 and the sprocket chains 8 and 10 driving the overhead conveyor M and paper feed mechanism L from the shaft 3 are adjacent the back of the machine and the cams are distributed along the length of the shaft between the sprockets and the front wall of the frame.

Four cams are attached directly to the cam shaft. These cams are the elevator actuating cam 116, the elevator retracting cam 122, the paper pull out cam 266 and the cam 286 operating the tight and loose wrap roller 215. The cams 220 and 243 operating the web severing knife and the web clamp are attached to the cam 116 and the cams 165 and 196 operating the end tuckers and the article retainer are attached to the cam 265.

All of the cams except the cam 265 adjacent the front wall of the frame and the cams 165 and 196, operate levers that are pivotally in the bearing brackets 111, 119 and 283 that are detachably mounted on the frame cross bar 110 at the rear end of the frame. The cam 265 operates the lever 260 that is pivoted to the front wall of the frame and the cams 165 and 196 operate levers mounted in the elevator B. In assembling, the shaft 3 with the cams and sprockets thereon is mounted in the frame. The lever 260 is then assembled with the cam 265, the brackets 111, 119 and 283 are mounted on the cross bar 110 and the levers thereon are engaged with their operating cams.

It is desirable that means be provided for varying the timing of certain of the cam controlled operations such as the movements of the end tuckers and the operation of the web severing and web clamping devices with respect to the movements of the elevator. To provide for such timing adjustments the cams 165, 220 and 243 are mounted on the cams 265 and 116 for angular adjustment about the axis of the shaft 3. The cam 165 has an arcuate slot 302 that receives attaching bolts 303 for securing the cam in adjusted position. The cam 220 has spaced arcuate slots 304 each receiving an attaching bolt 303 and the cam 243 has similar arcuate slots 306 that receive nuts 307.

Figures 45, 46, 46A:
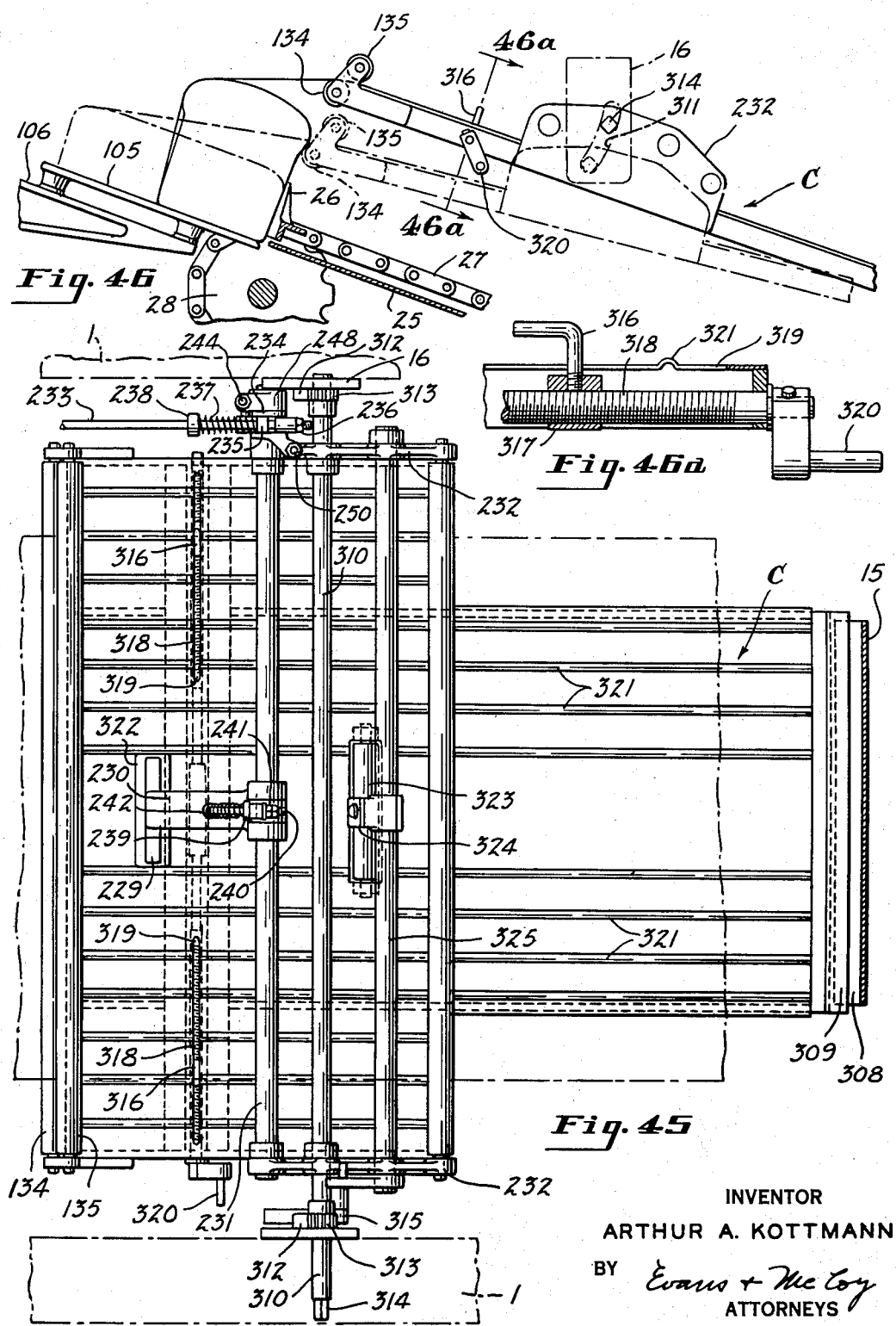
Fig. 45 is a top plan view of the drape table viewed as indicated at 45—45 in Fig. 42.
Fig. 46 is a diagrammatic side elevation showing adjustments of the drape table.
Fig. 46a is a section taken on the line indicated at 46a—46a in Fig. 46.

Drape table (Figs. 42 to 46)

The bracket 15 supporting the forward end of the drape table is provided with a rearwardly projecting flange 398 which engages in a forwardly facing channel formed by a flanged plate 309 extending transversely across the forward edge of the table C. The brackets 232 on the table C are positioned between the supporting brackets 16 and in the brackets 232 there is journaled a horizontal transverse shaft 310 that projects at its ends past the brackets 232 and engages in curved slots 311 formed in the brackets 16. Each of the brackets 16 carries a curved rack 312 disposed alongside and parallel to the slot 311.

The cross shaft 310 has pinions 313 attached thereto which mesh with the racks 312. At the front of the machine the shaft 310 has a squared end 314 adapted to receive a crank by which the shaft may be turned to cause the pinions 313 to travel up or down the racks 312 and raise or lower the rear end of the drape table. A manually operable pawl 315 engages the pinion 313 at the front of the machine to lock the shaft 310 against turning movement and hold the drape table C in adjusted position. The forward portion of the drape table is of a width to receive the widest web of wrapping paper that is used in the machine and, to keep the paper web properly centered at the delivery end of the drape table, web guide pins 316 are provided near the delivery end of the table and these pins are carried by nuts 317 that travel on right and left hand screws carried by a transverse shaft 318. The pins 316 travel in slots 319 in the table C and the screw shaft 318 can be turned to adjust the pins 316 by means of a hand crank 320 at the edge of the drape table that is disposed at the front of the machine.

In order to reduce the friction between the drape table and the web of wrapping material that is fed over it, the top face of the table, except along the central portion which is flat, is provided with longitudinal supporting ribs 321. The portion of table against which the web is clamped by the shoe 229 may have a plate 322 attached thereto to provide a clamping surface of the same height as the ribs 321.

A roller 323 is mounted in the table with its top flush with the ribs 321 and directly over the roller 323 there is a swinging brake shoe 324 loosely pivoted on a cross rod 325. The brake shoe 324 is supported in a forwardly inclined position with its lower end resting upon the top of the roller 323. The brake shoe 324 permits the paper to pass freely over the roller toward the upper delivery end of the drape table, but is drawn into clamping engagement with the roller 323 upon reverse movement of the paper web, the brake 324 thus serving to prevent reverse movement of the paper web.

The curved slots 311 and curved racks 312 cause the drape table to be moved in such a manner that the vertical adjustment thereof does not materially alter the spacing of the clamp actuating arm 230 with respect to the knife supporting arm 217 so that adjustments of the drape table do not interfere with the automatic clamping of the paper web during the paper cut-off and during descent of the elevator. Also the rear end of the drape table C is guided by the slots 311 so that it moves rearwardly as the table is moved upwardly so that the guide roller 134 is near the vertical plane of the discharge end of the feed conveyor in all positions of adjustment of the drape table.

The machine of the present invention is particularly designed for use in wrapping bakery products of various kinds, and such articles vary considerably in height. For example, a box of doughnuts may be only a small fraction of the height of a large loaf of bread. Also, the weight of the articles being wrapped varies greatly, and in the wrapping of lighter articles it is very important that the pull exerted on the paper web by the article in moving from the bed of the feed conveyor onto the elevator platform be exerted in such manner that the position of the article being wrapped on the elevator is not disturbed.

The drape table C is adjusted so that the guide roller 134 is positioned close to the top of the articles being wrapped so that the portion of the paper web extending from the roller 134 to the article after it is transferred onto the elevator platform has only a slight angle of inclination to the portion of the paper web on the drape table. By so disposing the drape table a more direct pull is exerted by the article being wrapped on the paper web and more paper is drawn from the drape table by the upward movement of the article with the elevator. Because of the short length of paper between the article being wrapped and the drape table, there is little slackening of the tension of the wrapping web during the upward movement of the elevator, and a more snug engagement between the article being wrapped and the web of wrapping paper is maintained during the wrapping operation, which results in more accurate folding and better sealing. Also the feed of the paper which is controlled by the tension on the web is more uniform and is more accurately regulated.

*Web feed mechanism (Figs. 47 to 54)*

The web of paper or other wrapping material is fed from the reel rack K as shown in Fig. 47 over a pair of feed rollers 326 and 327 which are driven in a direction to advance the paper toward the wrapping mechanism under the control of the paper tension, as will be explained. The feed rollers 326 and 327 are spaced a short distance apart and mounted on parallel transverse shafts 328 and 329 that are journaled in brackets 330 that are attached to the front and back of the machine frame 1 by bolts 331. A gravity web gripping roller 332 is supported in the bight of the rollers 326 and 327 and presses the paper web against the peripheries of the rollers 326 and 327 to create friction between the web and the rollers 326 and 327 sufficient to cause the web to be fed by the feed rollers. The gravity roller 332 is supported on arms 333 that swing about alined pivots 334 attached to the brackets 330. The paper web passes over the tops of the rollers 326 and 327 and then under a slack roller 335 that is carried by the lower ends of arms 336 that are attached at their upper ends to a rock shaft 337 journaled in the front and back members of the frame 1.

As shown in Fig. 47, a spring 338 attached to one of the arms 336 and to the frame 1 exerts a rearward pull on the arms 336. A series of spaced holes 339 are provided in the arms 336 in which the spring 338 may be engaged to provide the desired leverage. Forward movement of the slack roller supporting arms 336 is limited by a snubber stop plate 340 which has frictional engagement with the arm with which it engages to cushion the impact of the arm.

The front bracket 330 has a spring actuated detent 341 that projects into the path of the front arm 336 to support the arms in the position shown in full lines in Fig. 47 where the roller 335 is to the rear of and above the tops of the rollers 326 and 327 to permit a paper web to be pulled from the rack K directly across the tops of the rollers 326 and 327 and over the drape table C to position the web for the wrapping of the first article to be wrapped.

The front arm 333 has a downwardly projecting arm 342 attached thereto. This arm has a laterally projecting pin 343 in the path of the front slack roller supporting arm 336. When the slack roller is swung to the position shown in full lines in Fig. 47, the front slack roller supporting arm engages the pin 343, swings the arm 342 rearwardly and lifts the gravity roller 332 to a position clear of the rollers 326 and 327 so that a space is provided above the rollers 326 and 327 for threading the paper web whenever a new roll of wrapping material is placed in the rack K.

A slack take-up is preferably provided between the rack K and the feed roller 326. The paper from the rack K passes over a guide roller 344 carried by a supporting bracket 345 and under a take-up roller 346 mounted in slide bearings 347 that are mounted on vertical posts 348 attached to the bracket 345 and over a roller 349 that is mounted on brackets 350 attached to the feed roll supporting brackets 330. The take-up roller 346 is pressed downwardly by springs 351 on the posts 348 that act upon the slide bearings 347. The take-up roller is so mounted in the slide bearings 347 that it can be quickly and easily detached while the leading end of a wrapper web is being threaded through the feed rollers and over the drape table. As shown in Fig. 50 the slide bearings 347 have open top slots 352 which receive the projecting ends 353 of the take-up roller shaft and are provided with screws 354 that can be readily turned to retain or release the shaft ends 353. After the web threading operation, the take-up roller can be placed upon the web and lowered into engagement with the bearings 347.

The paper feed rollers 326 and 327 are driven by the sprocket chain 10 that is continuously driven from the cam shaft 3. The sprocket chain 10 underruns the web feed driving sprocket 9 which is mounted on a stub shaft 355 in the back bracket 330. A gear 356 attached to the sprocket 9 meshes with an idler gear 357 which drives a gear 358 attached to a cone clutch member 359 that is rotatably mounted on the shaft 329 of the rear paper feed roller. A mating cone clutch member 360 is slidably keyed to the shaft 329 and is engageable with the cone clutch member 359 to establish a driving connection between the sprocket chain 10 and the shaft 329. A gear 361 attached to the shaft 329 at the front end of the feed roller 327 drives an idler gear 362 which meshes with a gear 363 fixed to the shaft 328 of the forward feed roller. The paper feed rollers 326 and 327 are fixed to the shafts 328 and 329 and are rotated in the same direction at equal speeds through the clutch members 359 and 360 and the gears 361, 362, and 363 when the clutch members are engaged.

The shaft 329 has a brake drum 364 attached to its front end and this brake drum is engaged by a brake shoe 365 that is pressed lightly toward the drum 364 by a spring 366. The brake shoe 365 exerts sufficient friction on the drum 364 to prevent excessive overrun when the feed rollers are disconnected from the driving means by separation of the clutch members 359 and 360. The spring 366 is backed by a tension adjusting screw 367 so that the pressure exerted by the spring on the brake shoe 365 can be regulated. If desired, the pressure on the shoe 365 may be adjusted to permit a slight overrun due to the momentum of the driving rollers and to the tension applied to the web by the slack roller 335. The amount of overrun permitted can be quite accurately regulated by adjusting the tension adjusting screw 367.

The axially movable clutch member 360 has an outwardly projecting hub 368 the outer end of which is closed by an abutment plug 369. A spring 370 is interposed between the shaft 329 and the plug 369 to normally exert a pressure on the clutch member 359 tending to move the same to its disengaged position. Means is provided for actuating the clutch member 360 that is controlled by the slack roller 335 when the slack roller is moved rearwardly by tention applied to the paper web during the wrapping operation. The clutch actuating mechanism includes a lever 371 pivoted intermediate its ends to swing about a pivot 372 mounted in a bracket 373 attached to the frame 1. The lever 371 extends upwardly and forwardly at an inclination, its lower end being opposite the end of the hub 368 and its upper end adjacent the rock shaft 337 to which the slack roller supporting arms 336 are attached. At its lower end the lever 371 carries an adjustable abutment member in the form of a screw 374 that engages the abutment plug 369 at the outer end of the hub 368 of the clutch member 360.

Above the pivot 372 the lever 371 is engaged by a spring 375 that exerts an outward pressure on the lever 371 sufficient to move the clutch member 360 into engagement with the clutch member 359 against the action of the spring 370. The spring 375 is backed by a tension adjusting screw 376 by means of which the pressure exerted by the spring on the lever 371 may be varied. At its upper end the lever 371 carries a roller 377 which is positioned for engagement with an arm 378 attached to the shaft 337 to which the slack roller supporting arms are fixed. The arm 378 has a cam face 379 that engages with the roller 377 to move the same inwardly and swing the lower end of the lever outwardly to permit the spring 370 to disengage the clutch member 360. In the forward position of the arms 336 the roller 377 engages the arm 378 and the clutch member 360 is held out of engagement with the clutch member 359. When the slack roller 335 is moved rearwardly by tension exerted on the paper web the roller 377 rides off the arm 318 and the spring 375 shifts the clutch member 360 into engaging position.

When the end of the paper web hanging across the delivery end of the feed conveyor is engaged between the article being wrapped and the follower 136 on the elevator, a pull is exerted on the paper web which pulls the slack roller 335 rearwardly, releasing the lever 371 which is then actuated by the spring 375 to engage the friction clutch members 359 and 360. A slackening of the wrapping paper web will permit the arms 336 to be swung rearwardly by the spring 338 to move the arm 378 into engagement with the roller 377 and disengage the paper feed clutch. The forward feed of the paper web by the feed rollers 326 and 327 being controlled by the tension of the web, the tension exerted upon the web during the wrapping operation can be held to a predetermined maximum so that there is no danger of damage to soft products being wrapped due to excessive pull on the wrapping paper and the delivery of an excessive amount of paper to the wrapping mechanism is avoided.

The drape table C underlies the paper feed mechanism and slack roller 335 as shown in Fig. 42, so that any excess slack is supported on the drape table and is prevented from falling into the path of articles on the feed conveyor.

The web feed mechanism is claimed per se in my copending application Serial No. 317,462, filed October 29, 1952.

*Overhead transfer mechanism (Figs. 18 and 55 to 61)*

In order to enable the articles to be transferred from the elevator to the discharge runway by means of the continuously driven overhead conveyor M which moves the articles at the desired speed through the folding and sealing channels, means is provided for accelerating the movement of the pushers 210 during their travel across the elevator platform and then decelerating their movement in order to discharge the article on the platform during the small portion of the wrapping cycle in which the platform is alined with the discharge runway, and then moving the articles below normal speed during a portion of their travel through the folding channel. These accelerating and decelerating movements are caused by imparting a forward swinging movement to the pusher supporting arms 211 past their normal position during their engagement with the article on the elevator platform followed by a rearward swinging movement back to normal position. The arms 211 have short end portions 380 adjacent the chains 212 that extend at substantially right angles thereto, the end portions 380 being connected to the chains 212 by pivots 381. The arms 211 are arranged in pairs which are transversely alined, the transversely alined arms 211 being attached to the front and rear chains 212 and being disposed upon the inner sides of the chains 212.

As shown in Fig. 60, each of the sprockets 213 has an elongated hub 382 that is slidably keyed to the driven cross shaft 214. The elongated hubs 382 provide support for collars 383 which are attached to the side rails 158 of the discharge runway. As shown in Figs. 58 and 59, the chains 212 run over front sprockets 384 on alined stub shafts 385 that are mounted on the guide rails 158.

The lower run of each of the sprocket chains 212 is guided in a slot between superposed bars 386 and 387 attached to the inner face of a longitudinal supporting bar 388 that is attached to a side rail 158 and that has a groove 389 along its inner face to provide clearance for the chains. Spaced inwardly from each of the chain guide bars 386 and 387 there is a cam rail 390 that has an outwardly facing groove 391 that receives rollers 392 mounted on the pusher arms at the bends thereof. The cam rail has an enlarged rear end portion 393 that is supported on the shaft 214. The forward ends of the cam rails 390 are supported by brackets 394 attached to the bars 388 and the rear ends of the rails are connected to the bars 388 by bolts 395 passing through spacer sleeves 396 interposed between the bars 388 and rails 390. The cam rails 390 terminate near the front sprockets 384 allowing the arms 211 to hang freely from the sprocket chains during their passage from the lower run to the upper so that they are swung by gravity into engagement with pins 398 projecting inwardly from the sprocket chains 212. During their passage along the upper run of the conveyor, the chains 212 are supported on the guide rails 399. Hold-down bars 400 suitably attached to the side rails 158 overlie the chains 212 adjacent the rear sprockets 213. At the rear end of the cam rails the grooves 391 extend upwardly around the rear side of the drive shaft 214 to guide the pusher arms during their downward movement toward article engaging position, the rear end portion of the cam rail having an inclined portion 397 to guide the rollers upwardly into the groove 391.

As best shown in Fig. 56, the pusher plates 210 are connected to the arms 211 by horizontal pivots 401 and are normally held by springs 402 against stop lugs 403 projecting from the arms 211 which serve to position the pusher plates 210 in substantially upright position during their passage along the discharge runway. The pushers 210 have rearwardly extending arms 404 which limit forward swinging movement of the pushers. The arms 404 carry shoes 405 that are engageable with the elevator platform.

The portion of the cam groove 391 below and to the rear of the shaft 214 is deflected upwardly at 406 towards the shaft 214 to swing the pusher arms 211 rearwardly and bring them to substantially vertical position over the rear edge of the elevator platform as shown in Fig. 55. During movement of the pusher plates 210 across the elevator platform the arms 211 are swung forwardly past their normal position to increase the speed of the pusher plates and effect a rapid transfer of the article being wrapped to the discharge runway after which the arms are swung rearwardly to their normal position which results in a reduction of speed of the article in the entrance end of the folding section. The pusher arms 211 are first swung rearwardly by the shifting of the arm supporting rollers 392 to positions above the chains 212 in upwardly deflected portions 406 of the cam grooves 391. The forward swinging movement of the arms is accomplished by shifting the rollers 392 to positions below the chain and the rearward swinging movements of the arms is effected by returning the rollers 392 to positions in horizontal alinement with the sprocket chains 212, the rates of acceleration and deceleration being dependent upon the relative inclinations of the chain guides and cam grooves. During the pivotal movements of the pusher arms 211 the sprocket chains 212 and arm supporting rollers 392 are so guided that the lower ends of the arms 211 travel substantially horizontally. The lower chain guide bars 387 have beveled rear ends 407 that underlie the sprockets 213 and deflect the chains upwardly at the beginning of the forward swinging movement of the pusher arms to offset the downward movement of the pusher plates with respect to the point of attachment of the arms 211 to the chains 212. Forwardly of the beveled portion 407 of the chain guide the cam grooves 391 have portions 408 deflected downwardly to cause the arms 211 to swing forwardly past their normal positions. The conveyor chains 212 are driven at a speed such that they move a distance corresponding to the distance between successive pusher arms 211 during each wrapping cycle. By means of the cam grooves and chain guides pushers 210 are caused to move across the elevator platform at a speed greater than the speed of the conveyor chains to transfer the article from the elevator during the small portion of the wrapping cycle that the platform dwells in alinement with the discharge runway. The accelerated movement of the arms 211 is followed by a decelerated movement which causes the article to move relatively slowly in the discharge runway until the arms 211 resume their normal position. This slow movement is advantageous in that it insures proper engagement of the bottom fold of the wrapping paper with the slots in the folding channel and causes the folds of the wrapper to be effectively heated and sealed in the folding channel. The overhead transfer mechanism is claimed per se in the copending application of Edward G. Schrage, Serial No. 188,791, filed October 6, 1950, upon which Patent No. 2,649,675 was granted August 25, 1953.

Figure 67:
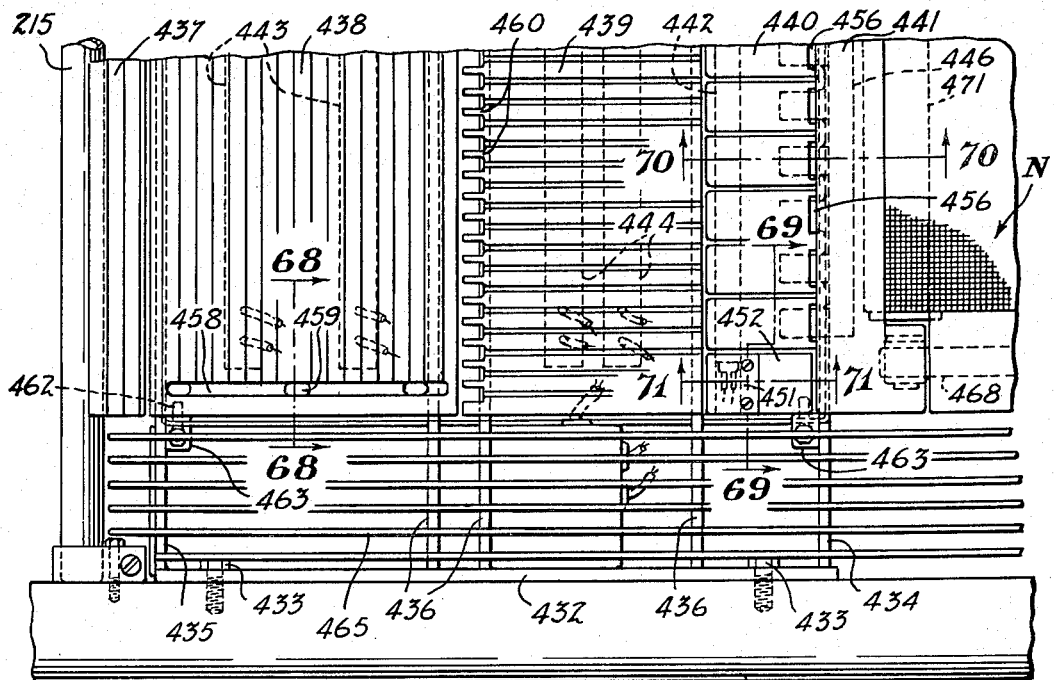
Fig. 67 is a fragmentary plan view showing the front half of the bed of the folding and sealing section of the discharge runway.
Figures 68, 70:
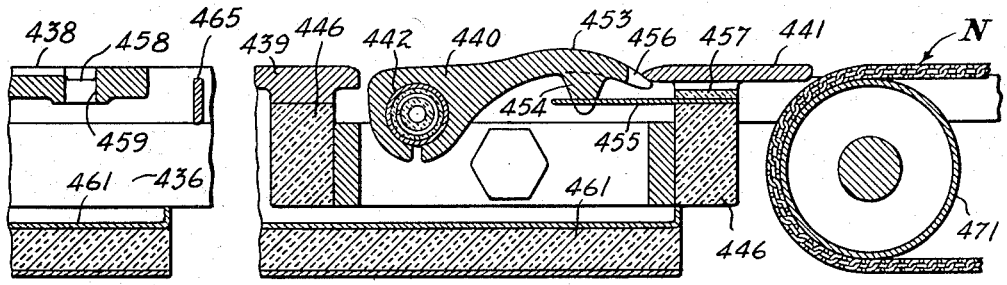
Fig. 68 is a fragmentary transverse vertical section taken on the line indicated at 68—68 in Fig. 67.
Fig. 70 is a fragmentary longitudinal vertical section on the line indicated at 70—70 in Fig. 67.
Figures 69, 71:
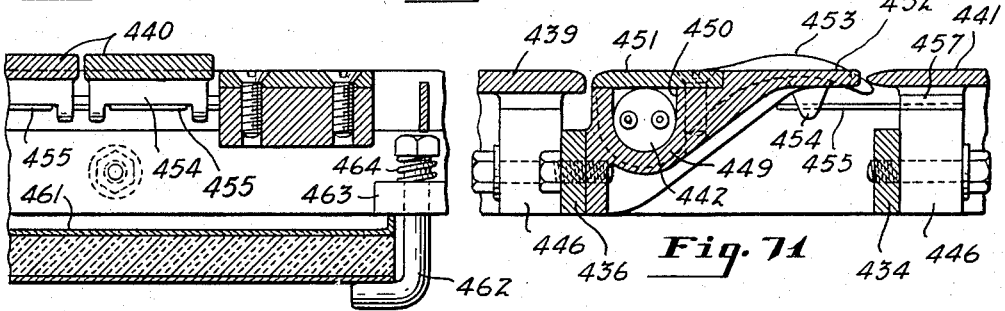
Fig. 69 is a fragmentary transverse vertical section taken on the line indicated at 69—69 in Fig. 67.
Fig. 71 is a fragmentary longitudinal vertical section taken on the line indicated at 71—71 in Fig. 67.

*Final folding and sealing devices (Figs. 59 to 71)*

As the elevator moves upwardly the wrapper web is wound over the top of the article and projects horizontally past the ends of the article. As the elevator approaches its uppermost position the ends of the wrapper projecting past the article at the top thereof are engaged by vertical folder plates 410 that fold these projecting ends down against the ends of the article as shown in Fig. 66.

The top end folder plates 410 are preferably provided with outwardly projecting flanges 411 along their lower edges to provide rounded corners for engagement with the wrapper web. Above the flanges 411 the folder plates may be provided with windows 412 which enable the operator to more quickly detect wrinkles or other defects in the wrap. Forwardly of the top end folder plate 410 and in alinement therewith are bottom end folder plates 413 that engage with the portions of the web projecting past opposite ends of the article at the bottom thereof to fold these portions upwardly against the ends of the article, each of the folder plates 413 being provided with an inclined slot 414 extending upwardly and rearwardly from its bottom edge to receive the folds of the wrapper that project outwardly from the ends of the article at its bottom and to guide the same upwardly and against the ends of the article.

The top end folder plates 410 are supported by longitudinal bars 415 that are attached at their forward ends by bolts 416 to the folder plates 413 and to the bars 415 by bolts 417. The folder plates 410 are adjustable on the longitudinal bars 415 by means of transversely extending slots 418 in top flanges 419 of the plates through which the attaching bolts 417 extend. Each of the folder plates 413 is connected at its forward end by a vertical hinge 420 to a bracket 421 attached to the side rails 158. The hinges 420 permit the folder plates to be swung outwardly to afford access to the elevator and to the entrance end of the discharge runway.

To detachably lock the folder plates in their operative position, a lock plate 422 is attached to the rear end of the bar 415 and projects rearwardly therefrom, being provided at its rear end with a horizontal slot 423 which receives a locking member in the form of an eye bolt 424 that is pivoted to a bracket 425 attached to the side rail 158.

A thumb nut 426 on the bolt 424 engages with the outer face of the lock plate 422 to retain the folder plates in operative position. The lock plate 422 engages with an adjustable abutment in the form of a screw 427 which is threaded in the bracket 425 and which may be adjusted to increase or decrease the width of the space between the rear ends of the top folder plates and between the rear ends of the folder plates 413. The folder plates 410 can be adjusted by means of the bolts 417 and slots 418 to position them in parallel relation after angular adjustment of the plates about the hinges 420.

The screws 427 are preferably so adjusted that the space between the folder plates 413 at their rear ends is slightly greater than at their forward ends so that pressure on the ends of the article is gradually increased as the article is moved from the elevator into the discharge runway. The folder plates 413 have outwardly curved rear edges 428 which provide a bell mouth for engagement with the forward corners of the article being wrapped as the article is being pushed onto the discharge runway. The adjustments of the nut 426 and abutment screw 427 determine the amount of rearward flare of the folder plates 413. Since some clearance is necessary between the top folder plates 410 and the tucker plates 148, there is a slight relaxation of pressure on the end of articles being wrapped when the tucker plates are withdrawn. The angular disposition of the folder plates 413 serves to re-establish a pressure corresponding to that applied by the tucker plates and the adjustment regulates the amount of pressure exerted on the ends of the article in the folding and sealing channel.

A pin 429 may be provided on the bracket 425 for engagement in the slot 423 to take the weight of the hinged folder plate off the eye bolts 424. Heaters 430 attached to the folder plates 410 and 413 supply heat to the wrapper folds to cause them to adhere together.

The bed of the folding and sealing section D is in the form of a detachably mounted unit and is carried by a frame having side bars 432 attached by bolts 433 to the side members of the frame 1, front and rear crossbars 434 and 435 and intermediate crossbars 436. A narrow ribbed bed plate 437 is positioned with its rear edge closely overlying the roller 215 so that it serves as a wax scraper. Forwardly of the plate 437 a transversely ribbed bed plate 438 is mounted and forwardly of the plate 438 there is a longitudinally grooved bed plate 439. Forwardly of the plate 439 a row of pivoted bottom sealing fingers 440 are provided for engagement with the bottom of the wrapped articles. Forwardly of the fingers 440 a bridging plate 441 overlies the rear end of the bottom belt N of the cooling section E. The pivoted sealing fingers 440 are pivoted upon a transverse tubular heater 442 for independent pivotal movements.

Electrical heaters 443 are attached in a suitable manner to the underside of the bed plate 438. Similar heaters 444 are attached to the underside of the bed plate 439. The bed plates 438 and 439, together with the sealing fingers 440 and bridging plate 441, are supported on bars of heat insulating material 446 attached to the frame crossbars 434, 435 and 436. The narrow rear bed plate 437 has a flange 447 attached to the rear crossbar 435 of the bed supporting frame and, in order to minimize the transfer of heat to the roller 215, a strip of insulating material 448 is interposed between the flange 447 and the crossbar 435.

The tubular heater 442 is supported at its ends upon brackets 449 attached to one of the intermediate crossbars 436. The brackets 449 have upwardly opening bearing recesses 450 which receive the ends of the heater 442, which are held in place by retaining plates 451 which are flush with end portions of the bed plate 439. The brackets 449 bridge the space between the bed plate 439 and the plate 441 at the opposite side edges of the bed, the brackets having top portions 452 extending to adjacent the plate 441 and flush therewith.

The sealing fingers 440 have convex top faces 453 that are engageable with the undersides of articles such as bread loaves to press the overlapping edges of the wrapper against the bottom of the article, while applying heat thereto, to seal the same. Adjacent their forward ends the fingers 440 have downwardly projecting lugs 454 which bear upon the free end portions of leaf springs 455 that are attached to the insulating bar 446 that is attached to the forward crossbar 434 of the bed supporting frame. Downward pressure of articles passing over the convex faces 453 of the fingers causes the fingers to be moved downwardly, deflecting the springs 455. The downwardly curved forward ends of the fingers 440 underlie the rear edge of the bridging plate 441 against which the forward ends of the fingers are normally held by the spring 455. The forward ends of the fingers 440 have notches 456 to receive the springs 455 when the fingers are moved downwardly.

In order to minimize the transfer of heat from the sealing section to the conveyor belt N forming the bed of the cooling section E, a strip 457 of insulating material is interposed between the top of the springs 455 and the underside of the plate 441.

Adjacent opposite side edges thereof the bed plate 438 has longitudinal grooves 458 into which wax melted from wrappers is drained and the grooves 458 are provided with openings 459 to discharge the melted wax. The bed plates 438 and 439 are spaced apart to provide an air gap and reduce heat conduction when the heaters of one of the plates are disconnected, the plate 439 having spaced fingers 460 bridging the gap.

Beneath the sealing bed a drip tray 461 is provided to catch any wax dripping from the bed plates so as to prevent the wax from dripping onto the drape table. The drip tray is detachably supported upon L-shaped studs 462 that are slidably mounted in brackets 463 attached to the front and rear crossbars 434 and 435 of the bed supporting frame. Springs 464 acting upon the studs 462 yieldingly clamp the corners of the tray 461 against the bottom of the brackets 463. The tray can be readily removed for emptying and cleaning by turning the studs 462 at one side of the frame out of engagement with the undersides of the tray.

In order to further limit the heating of the frame and the parts of the mechanism below the discharge runway, the bed sections are narrower than the space between the frames and between the bed sections and the side frame members, grills 465 are mounted on the crossbars of the bed supporting frame, the spaces between the bed and side frame members provide ventilation between the bed and drape table to prevent heating of the wrapper web being fed over the drape table, which may be adjusted to a position fairly close to the discharge runway and the grill provids a convenient support onto which articles can be moved from the folding and sealing section when the folder plates are swung to open position to permit removal of an improperly wrapped article.

The final folding and sealing devices are claimed in my copending application Serial No. 273,942, filed February 28, 1952, upon which Patent No. 2,676,445 was granted April 27, 1954.

*Cooling section (Figs. 72 to 76)*

The bed of the cooling section E which is formed by the belt conveyor N, which is preferably in the form of a woven wire belt, is also detachably mounted on the frame, being supported by a cross frame member 466 that is in the form of a wide downwardly facing channel and that is attached to the side members of the frame 1 by bolts 467. The conveyor N is supported upon longitudinal rods 468 that extend through blocks 469 that are suitably attached by welding, or the like, to the cross member 466. The rods 468 pass through the blocks 469 and are held against endwise movement in the blocks by screws 470. The belt N has a drive pulley 471 at its rear end that is driven through the gears 11 and that is supported by bearing blocks 472 that are secured to the rear ends of the rods 468 by screws 473.

The conveyor N has a front idler pulley 474 that is journaled in bearing members 475 that are slidable on the forward ends of the supporting rods 468. The forward ends of the rods 468 are threaded and receive nuts 477 that bear against the rear faces of the bearing members 475 and which may be turned to move the pulley 474 forwardly to tighten the belt N. The bearing members 475 project beyond the end of the belt N and support a hollow refrigerated bed plate 478 that is attached to the members 475 by screws 479. The belt conveyor N has a bed plate 480 beneath the top run of the belt, that is supported upon blocks 481 that are mounted on the rods 468, the blocks 481 being secured in adjusted position on the rods 468 by means of screws 482. The refrigerated plate 478 is level with the top run of the belt N and wrapped articles are moved across the plate 478 onto a roller bed 483 detachably supported on the bed plate 478. The roller bed has an angle bar 484 extending across its rear end that is provided with vertical slots 485 in its depending vertical flange which engage with bolts 486 attached to the bed plate 478. The bolt and slot connection between the roller bed 483 and the bed plate 478 permits the roller bed to be removed by lifting it off the bolts. The grill 465 extends past the sealing section and terminates at the rear side of the cross member 466. Forwardly of the grills the spaces between the belt N and side members of the frame 1 are bridged by aprons 487 that overlie the ends of the cross member 466 and are attached thereto.

*Mounting of side guide members (Figs. 2, 77 and 78)*

The side folding and heating plates, together with the side belts P, are attached to and movable laterally with the side rails 158 which are supported upon the frame 1 adjacent the front and rear ends thereof. Shafts 490 and 490a adjacent the front and rear ends of the frame 1 are provided with right and left screws and serve to simultaneously adjust the side rails and attached parts toward and away from the center line of the machine. The forward ends of the side rails 158 travel with nuts 491 on the front screw shaft and the rear ends thereof travel with nuts 491a on the rear screw shaft 490a. The handwheel 24 drives the shaft 490 through a sprocket chain 492 and the shaft 490a is driven by a sprocket chain 493 connecting it to the shaft 490. As shown in Fig. 77, the front shaft 490 is journaled in standards 494 detachably secured to the cross frame member 466 and alongside the screw shaft 490 there is mounted a weight supporting crossbar 495 having a horizontal top edge upon which rollers 496 attached to the bars 158 travel. As best shown in Fig. 78, the bar 495 is attached to flanges 494a of the standards 494 by bolts 497 which extend through vertical slots 498 in the flange 494a. The opposite ends of the bar 495 can be independently adjusted to level the bar by loosening the bolts 497 and adjusting screws 499 carried by the bar 495 which bear against the top edges of the flanges 494a. The rear screw shaft 490a is journaled in a standard 500 detachably mounted upon the rear end of the frame 1 and a weight supporting crossbar 495a forming a track for rollers 496a on the nuts 491a is mounted on the standards 500 in a manner similar to the mounting of the bar 495 on the standards 494.

The side rails 158 are detachably connected to the nuts 491 by means of slotted plates 501 and to the nuts 491a in a similar manner. One of the nuts 491 may be provided with a pointer 502 which travels over a graduated scale 503 on the bar 495 to indicate the adjustment of the side rails 158. All of the weight of the side rails 158, and of the parts mounted thereon is imposed upon the crossbars 495 and 495a independently of the screw shafts 490 and 490a so that sagging of the shafts and difficulty in turning the same to adjust the side members is avoided.

By detaching the standards 494 and 500 from the frame, the overhead pusher conveyor M, together with the folder plates 410 and 413 and side belts P carried on the side frame members 158, may be removed as a unit. Also, these parts may be assembled on the standards 494 and 500 before mounting on the frame 1.

*Hold down (Figs. 79 to 82)*

In order to prevent the articles from being lifted off of the bed of the discharge runway by the engagement of the end folder with the slots of the folding plates, and to insure sufficient pressure against the heated bottom plates to effect sealing of the overlapping portions of the wrapper across the bottom of the package, it is desirable to provide a light pressure on the tops of the articles during their passage through the folding and heating channel. This pressure is exerted through a jointed hold-down bar that extends longitudinally of the runway centrally thereof. This bar comprises front, rear and intermediate sections 504, 505 and 506 which are flexibly connected by means of short links 507. It is desirable that the hold-down bar be normally supported in substantially horizontal position and that the pivoted joints connecting the sections permit upward movement of the jointed ends but not downward movement below a horizontal position. To this end, the adjoining ends of sections at each of the joints are provided with two stop plates 508 and 509 each of which is attached at one end to the top of one of the sections and extends across the joint between the sections, having its opposite end overlying the adjoining section but free from attachment to the said adjoining section. The plates 508 and 509 permit the hold-down to yield in an upward direction at the joints during passage of an article beneath the bar, and normally hold the sections in alinement in horizontal position as shown in Fig. 79.

A link 510 is connected to the forward end of the forward section 504 and has an elongated vertical slot 511 in its upper end which receives a pin 512 on an arm 513 attached to a collar 514 that is pivotally supported upon the forward screw shaft 490. The pins 512 and 512a are identical latch pins providing a quick detachable connection for opposite ends of the sectional hold-down. As shown in Fig. 82 these pins are carried by the free ends of leaf springs 515 attached to the hold-down supporting arms. The rear section 505 has a standard 516 rigidly attached thereto and provided with a vertical slot 517 at its upper end which receives the pin 512a carried at the forward end of an arm 518 attached to a collar 519 that is rockably mounted on the cross shaft 214. The collar 519 has an upwardly extending arm 520 which is connected by an extensible link 521 with a downwardly extending arm 522 on the collar 514. The collar 519 has a downwardly extending arm 523 to which is pivotally connected a horizontal rod 524 that is slidably mounted in the standard 500. To the rear of the standard 500 the rod 524 is provided with a handle 525 which can be gripped to move the rod 524 forwardly or rearwardly to raise or lower the hold-down. In order to releasably hold the adjusting rod 524 in adjusted positions, the rod 524 has a notched sleeve 526 that is slidable in the standard 500 and that is engaged with a spring pressed detent 527 which serves to releasably hold the rod 524 in adjusted position.

The rear end of the section 505 of the hold down is curved upwardly as indicated at 528 to guide the article being wrapped into engagement with the under side of the bar. By reason of the rigid connection of the standard 516 to the section 505, thrust of the article on the curved end 528 tends to swing the entire hold down as a unit in the direction of movement of the article which is crowded under the curved entrance portion 528 into engagement with the under side of the hold down. The movement of the hold down due to engagement of the article with the end portion 528 acts to raise the section 505 bodily, swinging the arm 518 upwardly, which causes the forward supporting arm 513 to be moved simultaneously in an upward direction, lifting the hold down bodily. After the article has passed the rear section 505 the hold down may drop by gravity as shown in dotted lines in Fig. 79. By adjusting the length of the link 521 the inclination of the jointed bar to the runway may be changed.

Operation of the machine

The wrapping machine may be connected in tandem with a slicing machine and the sliced loaves to be wrapped may be transferred one at a time in front of each flight of the feed conveyor by the shuttle mechanism H. When desired, articles to be wrapped may be placed on the feed conveyor either at its forward end or intermediate the ends thereof. Since there is no feed of the wrapping paper except when pull is exerted upon the wrapping paper web by an article delivered to the elevator B, the feed conveyor elevator and discharge runway can operate with or without the delivery of articles to the wrapping mechanism, and any article delivered to the wrapping mechanism will be wrapped, sealed and delivered from the discharge end of the machine regardless of whether any other articles are being fed to the machine.

The infeed conveyor is intermittently operated so that during each dwell a flight is positioned at the discharge end of the conveyor immediately adjacent the elevator. The elevator is operated by the cam 116 to dwell in alinement with the bed 25 of the feed conveyor during the final movement of the article pusher flight to a stopped position, so that when the feed conveyor is stopped the article is positioned on the elevator platform 105.

By reason of the rearward movement of the elevator during its upward movement, the high flights 26 of the infeed conveyor may be stopped in a position very close to the front edge of the elevator platform, so that a complete transfer of the article to be wrapped one the elevator platform is insured.

While the article is being pushed by the flight onto the elevator platform 105 the draped end of the wrapper web is clamped between the article being wrapped and the follower 136 so that a pull is exerted on the web which acts on the slack roller 335 to pull it rearwardly to clutch the feed rollers 326 and 327 to the driving mechanism to positively advance the web in the direction in which it is being pulled by the article as it moves onto the elevator.

As soon as the transfer of the article to the elevator is completed the loaf retaining fingers 182 are moved to loaf retaining position, entering the recesses 87 in the flight cross bar 71 to positively hold the article in proper position on the elevator during the upward movement of the elevator.

In order to avoid wrinkling of the wrapper it is desirable that a light tension be maintained on the web throughout the portion of the wrapping operation that is performed during the transfer of the article onto the elevator and during movement of the elevator to its uppermost position in alinement with the discharge runway. The retraction of the elevator during its upward movement reduces the slackening of the web due to movement of the elevator, but in order to obtain more complete control of the web tension and to decrease the tendency to slacken the web as it is being wrapped about the article, the drape table C is supported for adjustment so that the drape roller 134 may be positioned at a height such that there is small clearance between the top of the article being wrapped and the roller 134. This positioning of the drape table insures a more direct pull on the web due to the fact that the roller 134 is initially very close to the top of the article so that as the article moves onto the elevator, the portion of the web above the top of the article is deflected at a small angle to the portion of the web on the drape table C. The retraction of the elevator during its upward movement, together with the positioning of the drape table close to the top of the article being wrapped, causes the wrapper web to be held under tension substantially throughout the wrapping operation. The drape table C and its rear supporting bracket 15 provide a pocket beneath the wrapper feed mechanism in which the wrapper web will accumulate if the control clutch of the feed mechanism should fail to release, preventing the wrapper web from contacting the feed conveyor or other moving parts of the machine and so supporting the excess wrapping material that it can be drawn back to the paper roll by reversely winding the roll. By lifting the pressure roller 332 on the slack roller 334 to the elevated position shown in Fig. 47 and removing the take-up roller 346 an unobstructed passage is provided from the paper roll to the drape table for rewinding the web as well as threading the same through the feed mechanism.

During the upward movement of the elevator a sufficient length of web must be fed out to cover the front of the article being wrapped. The amount of web so fed out varies with the height of the article being wrapped but by reason of the fact that the top of the article moves upwardly close to the roller 135 and begins immediately to exert a pull on the web extending from the roller 135 to the top rear edge of the article, there is a continuous exertion of tension on the paper during the upward movement of the elevator.

As the elevator approaches its uppermost position the elevator is moved forwardly to bring the rollers 176 on the elevator into engagement with the roller 215 at the entrance end of the discharge runway in which position the rollers 176 are yieldingly pressed toward the roller 215 by the springs 109.

During the final portion of the upward movement of the elevator the drape control roller 254 is moved rearwardly a predetermined distance to exert a tension on the wrapping paper and to cause a sufficient amount of wrapping paper to be fed by the tension controlled feed mechanism to supply the amount of drape required for the next package to be wrapped. The drape control roller has a short dwell while the cutoff knife 216 is actuated by the cam 220 to sever the paper web, after which it has a slight additional stripping movement to free the leading edge of the web and drape it in the path of an article to be wrapped. Just prior to the severing of the paper web the follower 136 on the elevator is engaged by the pusher plate 210 of the conveyor M to begin the transfer of the article from the elevator to the discharge runway.

In some instances it is desirable to provide a wrap which is somewhat looser than will be provided by the tension required to actuate the paper feed mechanism, and this is accomplished by imparting a positive movement to the roller 215 during a portion of the movement of the article being wrapped over the roller 215 onto the discharge runway. This forward feed of the paper by the roller 215 causes the paper to be delivered somewhat faster than it would be by the pull of the article on the paper and, by varying the extent of movement of the roller 215 during the transfer of the article, the tightness or looseness of the wrap may be controlled.

By adjusting the handwheel 21 the amount of turning movement imparted to the roller 215 during the transfer of the article to the discharge runway may be varied to regulate the tightness or looseness of the wrap, the handwheel 21 serving to adjust the guard disk 290 to vary the amount of angular movement imparted to the ratchet 277 upon each oscillation of the pawl arm 279 by the cam 286.

As the elevator approaches its uppermost position the side portions of the paper web overlying the top of the article are engaged by the top folder plates 410 directly above the elevator and as the article is moved between the folder plates 413 the projecting bottom folds are engaged in the lower ends of the slots 414 and deflected into the sealing channel and against the ends of the article during forward movement of the article.

A quick discharge of the articles from the elevator is effected by accelerating the pushers 210 as they travel over the elevator platform, and the final folding action is improved by the deceleration of the pushers over the entrance end of the folding and sealing channel.

The acceleration and deceleration of the endless flight pushers 210 makes possible a considerable increase in the speed of operation of the machine for the reason that it permits the elevator to have a relatively short dwell in its uppermost position and it also provides slow travel during the entry of the projecting bottom fold of the wrapper into the folding slots 414.

The hinged mounting of the folder plates 413 and the top folder plates 410 carried thereby provides a very convenient means of access to the entrance end of the discharge runway and also to the elevator so that articles can be quickly removed from the discharge runway when desired if such articles should become displaced in such runway, and it also permits convenient access to the tuckers and tucker actuating mechanism on the elevator. The grills 465 provide ventilation and prevent excess heating of the elevator, the feed conveyor and the wrapper feed mechanism which is immediately beneath the discharge runway.

It is to be understood that in accordance with the provisions of the patent statutes, variations and modifications of the specific devices herein shown and described may be made without departing from the spirit of the invention.

What I claim is:

1. A wrapping machine comprising superposed article runways, an elevator for receiving articles from the lower runway and transferring the same to the upper runway, means for supporting a web of wrapping material for movement toward said elevator with the end thereof adjacent the elevator draped between the lower runway and the elevator, means for moving an article on the lower runway against the draped end of said web and onto said elevator, means on the elevator for clamping the web to the article, power driven means controlled by tension exerted on the article engaging end of the web for feeding said web toward the elevator when tension is exerted on said end of the web, and a continuously driven elevator actuating mechanism comprising means for moving the elevator up and down with a dwell in alinement with each runway, and means for imparting a bodily movement to the elevator in the direction of the paper feed during its upward movement.

2. A wrapping machine having an upper discharge runway, a lower article feed runway, an elevator disposed rearwardly of said runways and movable from a receiving position in alinement with the feed runway to a discharge position in alinement with the discharge runway, a web feeding mechanism, a horizontal draping roller intermediate said runways over which said web passes from which an end of the web may be suspended between the elevator and the article feed runway, means on the elevator for clamping said web to an article, means controlled by tension applied to said web for driving said web feeding means when tension is applied to said web, a forwardly and rearwardly movable support for said elevator, means for raising and lowering the elevator, and means for moving said support rearwardly and forwardly during the upward movement of the elevator.

3. A wrapping machine comprising upper and lower runways having their rear ends substantially in vertical alinement, an elevator movable from a position in alinement with the lower runway to a position in alinement with the upper runway, means for slidably supporting a web of wrapping material with an end draped between said lower runway and said elevator including a drape table between said runways and having its rear end substantially in vertical alinement with the rear end of the lower runway, means for advancing an article on the lower runway into engagement with the draped end of said web and onto said elevator, means on the elevator for clamping said web to an article, means for raising and lowering the elevator, and means for moving the elevator rearwardly away from the lower runway during the initial portion of its upper movement and then forwardly toward the upper runway during the final portion of its upward movement.

4. In a wrapping machine having an upper article discharge runway and a lower article feed runway, a web feeding and draping means including a drape table intermediate said runways for slidably supporting the web, said table having its rear end substantially in vertical alinement with the rear ends of said article feed runways, a wrapping mechanism including an elevator for transferring articles from the feed runway to the discharge runway, two continuously driven cams, means connecting one of said cams to the elevator to raise and lower the same with a dwell in alinement with each of said runways, and means connecting the other of the cams to said elevator to move the same rearwardly away from the feed runway during the initial portion of the upward movement of the elevator.

5. In a wrapping machine having an upper article discharge runway and a lower article feed runway, a web feeding and draping means including a drape table intermediate said runways for slidably supporting the web, said table having its rear end substantially in vertical alinement with the rear end of said article feed runway, a wrapping mechanism including an elevator for transferring articles from the feed runway to the discharge runway, said elevator having an article receiving platform, a movable support for said elevator, means pivotally connecting said elevator to said support to swing about a horizontal axis disposed rearwardly of said platform, cam operated means for oscillating said elevator about its pivot with dwells in its positions of alinement with said runways, and cam operated means for actuating said support to move said platform rearwardly away from the feed runway during the initial portion of its upward movement and forwardly toward the discharge runway as the elevator approaches a position in alinement with the discharge runway.

6. A wrapping machine having an upper article discharge runway, a lower article feed runway and a web feeding and draping means including a drape table intermediate said runways over which said web passes, said table having its rear end substantially in vertical alinement with the feed runway, a wrapping mechanism including an elevator disposed rearwardly of said runways and movable past the rear end of said drape table from a position in alinement with the feed runway to a position in alinement with the discharge runway, means for raising and lowering the elevator, and means for shifting said elevator rearwardly during its movement past said drape table.

7. In a wrapping machine upper and lower article runways, a drape table disposed between said runways, said runways and table having their rear ends substantially in vertical alinement, an elevator having an article receiving platform disposed rearwardly of said runways and movable from a position in which said platform alines with the article feed runway to a position in which said platform alines with the discharge runway, means for feeding a web of wrapping material rearwardly over said drape table toward said elevator to position an end thereof in the path of an article moving from said feed runway to said elevator platform, means for clamping said web to an article on the elevator, means for raising and lowering said elevator, and means for moving said elevator rearwardly as it passes said drape table.

8. In a wrapping machine a frame, an elevator having an article receiving platform, a horizontal rock shaft journaled in said frame rearwardly of said platform and having upwardly extending arms, alined pivots connecting said elevator to said arms, superposed article feed and discharge runways, means for oscillating said elevator about said pivots with dwells in upper and lower positions where said platform is alined with the rear ends of said runways, and means operating in timed relation to said elevator oscillating means to oscillate said rock shaft to move the elevator platform rearwardly away from the feed runway as the elevator platform moves from its position in alinement therewith and forwardly toward the discharge runway as the elevator approaches its position in alinement therewith.

9. In a wrapping machine a frame, an elevator having an article receiving platform, a horizontal rock shaft journaled in said frame rearwardly of said platform and having upwardly extending arms, alined pivots connecting said elevator to said arms, superposed article feed and discharge runways disposed forwardly of said platform, means for oscillating said elevator about said pivots with dwells in upper and lower positions where said platform is alined with the rear ends of said runways, a spring acting on said rock shaft in a direction to move said elevator forwardly, and cam actuated means for turning said rock shaft in opposition to said spring during vertical movements of the elevator.

10. In a wrapping machine a frame, an elevator having an article receiving platform, a horizontal rock shaft journaled in said frame rearwardly of said platform and having upwardly extending arms, alined pivots connecting said elevator to said arms, superposed article feed and discharge runways disposed forwardly of said platform, means for oscillating said elevator about said pivots with dwells in upper and lower positions where said platform is alined with the rear ends of said runways, a web feed roller at the rear end of the discharge runway, an idler roller on the elevator for holding a web of wrapping material against said feed roller, a spring acting on said rock shaft in a direction to move said elevator forwardly, actuating means including a cam actuated member for turning the rock shaft in opposition to the spring during upward movement of the elevator said member being disengaged during the upper dwell of the elevator to permit the said idle roller to be held against said feed roller by said spring.

11. A wrapping machine having an upper article discharge runway, a lower article feed runway, an elevator disposed rearwardly of said runways and movable from a receiving position in alinement with the feed runway to a discharging position in alinement with the discharge runway, a horizontal draping roller between said runways and substantially in vertical alinement with the rear end of the article feed runway, mechanism feeding a web of wrapping material over said draping roller and for disposing an end of the web between said article feed runway and the elevator, means for moving an article along said feed runway against the end of said web to apply tension thereto, means controlled by tension applied to said web for driving said feed mechanism when tension is applied to said web, means for adjusting said drape roller vertically to provide a minimum clearance between said drape roller and the tops of articles of different heights, and means for moving said elevator rearwardly during its upward movement.

12. A wrapping machine having an upper article discharge runway, a lower article feed runway, an elevator disposed rearwardly of said runways and movable from a position in alinement with the rear end of the feed runway to a position in alinement with the rear end of the discharge runway, a draping table intermediate said runways and having its rear end substantially in vertical alinement with the rear end of said article feed runway, means for feeding a web of wrapping material rearwardly over said drape table and for suspending an end thereof between said article feed runway and said elevator, means for moving an article on the feed runway into engagement with the web and onto the elevator, means for adjusting the rear end of said drape table vertically to regulate the clearance between the drape table and article being wrapped, and means for moving the elevator rearwardly away from said drape table during its upward movement.

13. A wrapping machine comprising upper and lower runways having their rear ends substantially in vertical alinement, an elevator disposed rearwardly of said runways and movable from a position in alinement with the lower runway to a position in alinement with the upper runway, means for supporting a web of wrapping material with an end draped between said lower runway and said elevator including a drape table between said runways and having its rear end substantially in vertical alinement with the rear end of the lower runway, means for advancing an article on the lower runway into engagement with the draped end of said web and onto said elevator, means on the elevator for clamping said web to an article, power driven means controlled by tension applied to the web for feeding said web toward said elevator when tension is applied to said web, means for actuating said elevator, means for adjusting the rear end of said drape table vertically to regulate the clearance between the rear end of said table and the articles being wrapped, and means to move said elevator rearwardly during its upward movement.

14. A wrapping machine having an upper discharge runway, a lower article feed runway, an elevator disposed rearwardly of said runways and movable from a receiving position in alinement with the feed runway to a discharge position in alinement with the discharge runway, a web feeding mechanism, a horizontal draping roller intermediate said runways from which an end of the web may be suspended between the elevator and article feed runway, means on the elevator for clamping said web to an article, means controlled by tension applied to said web for driving said web feeding means when tension is applied to said web, means for raising and lowering the elevator, means for moving said elevator rearwardly and forwardly during the upward movement of the elevator, and means for adjusting said drape roller toward and away from the feed runway to provide close clearance between said roller and articles of different heights.

15. A wrapping machine comprising upper and lower runways having their rear ends substantially in vertical alinement, an elevator movable from a position in alinement with the lower runway to a position in alinement with the upper runway, means for supporting a web of wrapping material with an end draped between said lower runway and said elevator including a drape table between said runways and having its rear end substantially in vertical alinement with the rear end of the lower runway, means for advancing an article on the lower runway into engagement with the draped end of said web and onto said elevator, means on the elevator for clamping said web to an article, means for raising and lowering the elevator, means for moving the elevator rearwardly away from said lower runway and said drape table at the beginning of its upward movement and toward said upper runway as it approaches the same, means for adjusting the rear end of said drape table toward and away from said feed runway to provide close clearance between said table and articles of different heights, and power driven means controlled by tension applied to said web for feeding said web toward said elevator when tension is applied to said web.

16. A wrapping machine comprising superposed article runways, an elevator for receiving articles from the lower runway and transferring the same to the upper runway, means including a horizontal supporting member above the discharge end of the lower runway for supporting a web of wrapping material and draping an end thereof between the lower runway and elevator, means for holding said supporting member in different positions of vertical adjustment that provide close clearance between said supporting member and the tops of articles of different heights passing beneath the same on said lower runway, means for moving an article on the lower runway across the space between said supporting member and said lower runway, against the draped end of said web and onto the elevator, means on the elevator for clamping the web to the article, power driven means controlled by tension exerted on the article engaging end of the web for feeding said web toward the elevator when tension is exerted on said article engaging end of said web, and means for actuating the elevator.

17. A wrapping machine comprising superposed article runways, an elevator for receiving articles from the lower runway and transferring the same to the upper runway, means including a horizontal supporting member above the discharge end of the lower runway for supporting a web of wrapping material and draping an end thereof between the lower runway and elevator, means for holding said supporting member in different positions of vertical adjustment that provide close clearance between said supporting member and the tops of articles of different heights passing beneath the same on said lower runway, means for moving an article on the lower runway across the space between said supporting member and said lower runway, against the draped end of said web and onto the elevator, means on the elevator for clamping the web to the article, power driven means controlled by tension exerted on the article engaging end of the web for feeding said web toward the elevator when tension is exerted on said article engaging end of said web, means for actuating the elevator, means for discharging articles from the elevator to the discharge runway, and means associated with said elevator for wrapping the web about the article and folding edge portions of the web against the ends of the article.

18. A wrapping machine comprising upper and lower runways having their rear ends substantially in vertical alinement, an elevator movable from a position in alinement with the lower runway to a position in alinement with the upper runway, means for supporting a web of wrapping material with an end draped between said lower runway and said elevator including a drape table between said runways and having its rear end substantially in vertical alinement with the rear end of the lower runway, means for advancing an article on the lower runway across the space between the rear end of said drape table and said lower runway into engagement with the draped end of said web and onto said elevator, means on the elevator for clamping said web to an article, power driven means controlled by tension applied to the web for feeding said web toward said elevator when tension is applied to said web, means for actuating said elevator, and means for holding the rear end of said drape table in different positions of vertical adjustment that provide close clearance between the rear end of said table and the tops of articles of different heights passing beneath the same on the feed runway.

19. A wrapping machine having an upper article discharge runway, a lower article feed runway, an elevator movable from a receiving position in alinement with the feed runway to a discharging position in alinement with the discharge runway, a horizontal draping roller between said runways and substantially in vertical alinement with the rear end of the article feed runway, mechanism for feeding a web of wrapping material over said draping roller and for disposing an end of the web between said article feed runway and the elevator, means for moving an article along said feed runway across the space between said roller and said roller runway and against the end of said web to apply tension thereto, means controlled by tension applied to said web for driving said feed mechanism when tension is applied to said web, and means for holding said drape roller in different positions of vertical adjustment that provide a minimum clearance between said drape roller and the tops of articles of different heights passing between the same on said feed runway.

20. A wrapping machine having an upper article discharge runway, a lower article feed runway, an elevator movable from a position in alinement with the rear end of the feed runway to a position in alinement with the rear end of the discharge runway, a draping table intermediate said runways and having its rear end substantially in vertical alinement with the rear end of said article feed runway, means for feeding a web of wrapping material rearwardly over said drape table and for suspending an end thereof between said article feed runway and said elevator, means for moving an article on the feed runway across the space between the rear end of said table and said lower runway into engagement with the web and onto the elevator, and means for holding the rear end of said drape table in different positions of vertical adjustment that provide close clearance between said table and articles of different heights passing beneath the same on the feed runway.

21. In a wrapping machine a feed runway, an elevator having an article receiving platform movable into and out of a position alined with said runway, a retainer movably mounted on said elevator and having article retaining fingers, said retainer being movable from a position below the platform to a position in which said fingers project above the edge of said platform adjacent said runway, an endless conveyor having a flight for pushing articles along said runway and onto said platform, said flights having recesses in their article engaging faces to receive said fingers, means for intermittently driving said conveyor and for stopping the same with the flight adjacent an edge of said elevator platform, and means for shifting said retainer to move said fingers into retaining position while said flight engages the article.

22. A wrapping machine having an upper article discharge runway, an article feed runway beneath the discharge runway, a drape table between said runways, an elevator movable from a lower position in alinement with the rear end of the feed runway past the rear end of the drape table to a position in alinement with the rear end of the discharge runway, a web feed mechanism disposed between the discharge runway and the drape table for advancing a wrapper web toward the rear end of the drape table, and a slack roller engaging the web and movable forwardly and rearwardly between said feed mechanism and drape table to form a slack loop in the web, the rearmost position of said roller being above said table whereby the underside of the slack loop may be supported on the drape table.

23. A wrapping machine comprising an upper article discharge runway, a drape table beneath the discharge runway, an article feed runway beneath the drape table, an elevator adjacent the rear ends of said runway and table, means for reciprocating the elevator with dwells in alinement with said runways, means for feeding a web of wrapping material rearwardly over said drape table, means for moving an article from the feed runway to the elevator, means for clamping the wrapping web to the article, means for transferring the article from the elevator to the discharge runway, web severing means below the discharge runway, means for clamping the web to said drape table, means for operating said severing means and said drape table clamping means simultaneously during the upper dwell of the elevator, and means for operating said drape table clamping means to clamp the web to said drape table during the downward movement of the elevator past said drape table.

24. A wrapping machine comprising an upper article discharge runway, a drape table beneath the discharge runway, an article feed runway beneath the drape table, an elevator adjacent the rear ends of said runway and table, means for reciprocating the elevator with dwells in alinement with said runways, means for feeding a web of wrapping material rearwardly over said drape table, means for moving an article from the feed runway to the elevator, means for clamping the wrapping web to the article, means for transferring the article from the elevator to the discharge runway, web severing means including a movable knife below the discharge runway, a clamping member on the drape table for clamping the web to the table, a yielding connection between said knife and clamping member to clamp the web upon actuation of the knife, and cam operated means for actuating the knife and clamping member during the upper dwell of the elevator and again during downward movement of the elevator to hold the web during passage of the elevator past the drape table.

25. In a wrapping machine, an article discharge runway, a drape table beneath said runway, means for feeding a web of wrapping material rearwardly over said table and for suspending an end portion of the web from the rear end of said table, a wrapping mechanism including means for clamping an article to be wrapped to said web and moving said article upwardly past said drape table into alinement with said discharge runway to wind said web about the article, means including a movable knife below the discharge runway for severing said web, a clamping member above said drape table and pivoted thereto for movement into engagement with the web on said table, cam operated means for actuating said knife, and a link attached to said knife and yieldably connected to said clamping member to move the same to clamping position as said knife is moved toward said web to sever the same.

26. In a wrapping machine an article discharge runway, a drape table beneath said runway, means for feeding a web of wrapping material rearwardly over said table and for suspending an end portion of the web from the rear end of said table, a wrapping mechanism including means for clamping an article to be wrapped to said web and moving said article upwardly past said drape table into alinement with said discharge runway to wind said web about the article, means including a movable knife below the discharge runway for severing said web, a clamping member above said drape table and pivoted thereto for movement into engagement with the web on said table, cam operated means for actuating said knife, a link attached to said knife and yieldably connected to said clamping member to move the same to clamping position as said knife is moved toward said web to sever the same, a horizontal fulcrum member upon which the forward end of said table is slidably and pivotally supported, means for raising and lowering the rear end of said table, and a guide for imparting endwise movements to said table as it is raised and lowered to maintain a substantially constant distance between said knife and said clamp.

27. A wrapping machine comprising an elevator having an article supporting platform movable from a lower article receiving position to an upper discharging position, means for draping a paper web in front of the elevator in its lower position, means for feeding an article to be wrapped against the draped web and onto the elevator, transversely movable slides on said elevator, tuckers carried by said slides for clamping portions of the web to ends of an article, pivots substantially perpendicular to said platform connecting said tuckers to said slides, springs carried by said slides and acting on said tuckers to hold the same in web clamping position, arms attached to the rear ends of said tuckers and projecting rearwardly from said pivots and inwardly toward the center of the platform, a bar extending horizontally across said elevator and movable forwardly and rearwardly thereon into and out of engagement with the rear ends of said arms, and cams for actuating said bar to spread said tuckers.

28. A wrapping machine comprising a discharge runway having laterally adjustable side rails, an elevator movable from a lower article receiving position to an upper discharging position in alinement with said runway, means for draping a paper web in front of the elevator in its lower position, means for feeding an article to be wrapped against the draped web and onto the elevator, transversely movable slides on said elevator each having a vertical slot, tuckers pivoted to said slides for clamping portions of the web to ends of an article, and vertically disposed bars rigidly attached one to each of said side rails and extending through said slots in said slides to cause said slides to move laterally with said rails.

29. In a wrapping machine of the type in which the leading end of a web is fed to an article and wrapped about the article upon advance of the article, a frame, a web pull out mechanism mounted in said frame and comprising a roller extending across the web and movable against the web to apply tension thereto, means for actuating said roller and varying the extent of movement thereof comprising a lever having an arm operably connected to said roller and mounted for longitudinal sliding movement on said lever, said arm having rack teeth, a tubular shaft journaled in said frame, a lever pivot comprising a shaft attached to said lever and journaled in said tubular shaft, a pinion attached to said tubular shaft and meshing with the rack teeth of said arm, a handwheel attached to said tubular member, and a cam for actuating said lever.

30. In a wrapping machine of the type in which the leading end of a web is fed to an article and wrapped about the article upon advance of the article, a frame, a web pull out mechanism mounted in said frame and comprising a roller extending across the web and movable against the web to apply tension thereto, means for actuating said roller and varying the extent of movement thereof comprising a lever having an arm operably connected to said roller and mounted for longitudinal sliding movement on said lever, said arm having rack teeth, a tubular shaft journaled in said frame, a shaft journaled in said tubular shaft and projecting past the ends thereof, the inner end of said shaft being fixed to said lever, a pinion on said tubular shaft and meshing with said rack teeth, a handwheel attached to said tubular shaft, a graduated dial disk of less diameter than the handwheel attached to the outer end of said shaft and disposed adjacent the outer face of said handwheel, and a cam for actuating said lever.

References Cited in the file of this patent

UNITED STATES PATENTS

| | | |
|---|---|---|
| 1,182,393 | Luttrop | May 9, 1916 |
| 1,639,758 | Webb | Aug. 23, 1925 |
| 1,669,046 | Gangler | May 8, 1928 |
| 1,805,677 | Schmitt | May 19, 1931 |
| 1,853,091 | Smith | Apr. 12, 1932 |
| 1,854,075 | Smith et al. | Apr. 12, 1932 |
| 1,915,550 | Schmitt | June 27, 1933 |
| 1,964,070 | Mertis | June 26, 1934 |
| 1,977,307 | Hayssen | Oct. 16, 1934 |
| 1,979,207 | Milmoe | Oct. 30, 1934 |
| 2,009,197 | Mertis | July 23, 1935 |
| 2,082,945 | Ferenci | June 8, 1937 |
| 2,088,157 | Petskeyes | July 27, 1937 |
| 2,118,513 | Jensen | May 24, 1938 |
| 2,156,460 | Plass | May 2, 1939 |
| 2,243,633 | Jones | May 27, 1941 |
| 2,260,324 | Kottmann | Oct. 28, 1941 |
| 2,299,504 | Sergent | Oct. 20, 1942 |
| 2,304,399 | Clark | Dec. 8, 1942 |
| 2,342,584 | Hoppe | Feb. 22, 1944 |
| 2,356,644 | Arelt | Aug. 22, 1944 |
| 2,374,148 | Whipple | Apr. 17, 1945 |
| 2,385,706 | Jensen | Sept. 25, 1945 |
| 2,407,313 | Malhoit | Sept. 10, 1946 |
| 2,434,616 | Hoppe | Jan. 13, 1948 |
| 2,434,772 | Sandberg | Jan. 20, 1948 |
| 2,600,833 | Beutel | June 17, 1952 |
| 2,611,224 | Jensen | Sept. 23, 1952 |